(12) United States Patent
Munekuni et al.

(10) Patent No.: US 8,069,173 B2
(45) Date of Patent: Nov. 29, 2011

(54) INFORMATION PROCESSING APPARATUS AND METHOD OF CONTROLLING THE SAME, INFORMATION PROCESSING METHOD, AND COMPUTER PROGRAM

(75) Inventors: Masaji Munekuni, Kawasaki (JP); Tsunekazu Arai, Tama (JP); Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/266,253

(22) Filed: Nov. 6, 2008

(65) Prior Publication Data

US 2009/0125560 A1 May 14, 2009

(30) Foreign Application Priority Data

Nov. 12, 2007 (JP) ................ 2007-293745
Dec. 7, 2007 (JP) ................ 2007-317334

(51) Int. Cl.
*G06F 17/30* (2006.01)
*G06F 17/00* (2006.01)

(52) U.S. Cl. ........ 707/736; 707/791; 715/230; 382/190; 348/158

(58) Field of Classification Search ........ 707/736, 707/791; 382/190, 198, 306, 321; 715/230–231, 715/243, 273; 348/158
See application file for complete search history.

(56) References Cited

U.S. PATENT DOCUMENTS

| 7,528,868 | B2 * | 5/2009 | Perotti et al. | 348/231.3 |
| 7,831,598 | B2 * | 11/2010 | Ko | 707/736 |
| 7,840,892 | B2 * | 11/2010 | Pyhalammi et al. | 715/230 |
| 7,844,115 | B2 * | 11/2010 | Ohwa et al. | 382/190 |
| 2005/0278379 | A1 | 12/2005 | Nakazawa | |

FOREIGN PATENT DOCUMENTS

| JP | 2002-330432 | 11/2002 |
| JP | 2003-228569 | 8/2003 |
| JP | 2005-352782 | 12/2005 |
| JP | 2006-099268 | 4/2006 |
| JP | 2006-209516 | 8/2006 |

\* cited by examiner

*Primary Examiner* — Yicun Wu

(74) *Attorney, Agent, or Firm* — Cowan, Liebowitz & Latman, P.C.

(57) ABSTRACT

An information processing apparatus comprises, a storage unit configured to store image data and metadata of the image data, a reception unit configured to receive designation of at least two of the image data stored in the storage unit and designation of metadata to be newly added to the designated image data, a first selection unit configured to select, from the image data stored in the storage unit, other image data which has the same metadata as all metadata common to the designated image data, and a control unit configured to add the metadata to be newly added to the metadata of each of the designated image data and the selected other image data and storing the image data in the storage unit.

5 Claims, 47 Drawing Sheets

FIG. 5

| IMAGE DATA | METADATA ADDED IN ADVANCE | METADATA TO BE NEWLY ADDED | METADATA TO BE AUTOMATICALLY ADDED |
|---|---|---|---|
| PHOTO A | DATE 2005/10/09, MODEL EQS 20D, EXPOSURE F5.6, RYOMA | ATHLETIC MEETING | |
| PHOTO B | DATE 2005/10/09, MODEL XYZ400, EXPOSURE F5.6, TOMOKO | | |
| PHOTO C | DATE 2005/10/09, MODEL EQS 20D, EXPOSURE F5.6, MASAKO, RYOMA | ATHLETIC MEETING | |
| PHOTO D | DATE 2005/10/09, MODEL EQS 20D, EXPOSURE F5.6, RYOMA | | ATHLETIC MEETING |

F I G. 12

| IMAGE DATA | METADATA ADDED IN ADVANCE | METADATA TO BE NEWLY ADDED | METADATA TO BE AUTOMATICALLY ADDED |
|---|---|---|---|
| PHOTO A | DATE 2005/10/09, MODEL EQS 20D, EXPOSURE F5.6 | | ATHLETIC MEETING |
| PHOTO B | DATE 2005/10/09, MODEL EQS 20D, EXPOSURE F5.6 | ATHLETIC MEETING | |
| PHOTO C | DATE 2005/10/10, MODEL EQS 20D, EXPOSURE F5.6 | EXCURSION | |
| PHOTO D | DATE 2005/10/11, MODEL EQS 20D, EXPOSURE F5.6 | | EXCURSION |

| IMAGE DATA | OBJECT RECOGNITION RESULT | METADATA TO BE NEWLY ADDED | METADATA TO BE AUTOMATICALLY ADDED |
|---|---|---|---|
| PHOTO1501 | PERSON, BUILDING | ATHLETIC MEETING | |
| PHOTO1502 | PERSON | | |
| PHOTO1503 | PERSON, BUILDING | ATHLETIC MEETING | |
| PHOTO1504 | PERSON, BUILDING | | ATHLETIC MEETING |

| IMAGE DATA | METADATA ADDED IN ADVANCE | METADATA TO BE NEWLY ADDED | METADATA TO BE AUTOMATICALLY ADDED |
|---|---|---|---|
| PHOTO A | DATE 2005/10/09<br>LAT. 35°41'N<br>LONG. 139°20'E | EXCURSION | |
| PHOTO B | DATE 2005/10/09<br>LAT. 34°40'N<br>LONG. 136°20'E | | |
| PHOTO C | DATE 2005/10/09<br>LAT. 35°38'N<br>LONG. 139°22'E | EXCURSION | |
| PHOTO D | DATE 2005/10/09<br>LAT. 35°43'N<br>LONG. 139°23'E | | EXCURSION |

FIG. 30

| 10403 10401 | | | | |
|---|---|---|---|---|
| DATE: 2001/01/01 NEW YEAR | DATE: 2001/08/10 CHINATSU BIRTHDAY | DATE: 2001/12/25 CHRISTMAS | DATE: 2002/01/01 NEW YEAR | DATE: 2002/3/03 FIRST SEASONAL FESTIVAL | DATE: 2002/05/25 TRAVEL |
| DATE: 2002/08/10 BIRTHDAY | DATE: 2002/10/10 ATHLETIC MEETING | DATE: 2002/12/25 CHRISTMAS | DATE: 2003/01/01 NEW YEAR | DATE: 2003/03/03 DOLL'S FESTIVAL | DATE: 2003/06/18 TRAVEL |
| DATE: 2003/08/12 BIRTHDAY | DATE: 2003/10/08 ATHLETIC MEETING | DATE: 2003/12/25 | DATE: 2004/01/01 NEW YEAR | DATE: 2004/03/03 DOLL'S FESTIVAL | DATE: 2004/08/10 CHINATSU BIRTHDAY |
| DATE: 2004/11/22 KYOTO | DATE: 2004/11/22 KYOTO | DATE: 2004/11/22 NARA | DATE: 2004/11/22 NARA | DATE: 2004/11/22 NARA | DATE: 2004/12/25 |
| DATE: 2005/01/01 NEW YEAR | DATE: 2005/03/03 DOLL'S FESTIVAL | DATE: 2005/05/02 | DATE: 2005/05/05 FIRST SEASONAL FESTIVAL | DATE: 2005/8/10 | DATE: 2005/10/12 ATHLETIC MEETING |

| 10402 / NEW YEAR / DATE : 2001/01/01 | 10403 / CHINATSU BIRTHDAY / DATE : 2001/08/10 | DATE : 2001/12/25 / CHRISTMAS | | DATE : 2002/3/03 / FIRST SEASONAL FESTIVAL | DATE : 2002/05/25 / TRAVEL |
| --- | --- | --- | --- | --- | --- |
| 10504 / BIRTHDAY / DATE : 2002/08/10 | DATE : 2002/10/10 / ATHLETIC MEETING | DATE : 2002/12/25 / CHRISTMAS | DATE : 2002/01/01 / NEW YEAR | DATE : 2003/03/03 / DOLL'S FESTIVAL | DATE : 2003/06/18 / TRAVEL |
| DATE : 2003/08/12 / BIRTHDAY | DATE : 2003/10/08 / ATHLETIC MEETING | DATE : 2003/12/25 | DATE : 2003/01/01 / NEW YEAR | DATE : 2004/03/03 / DOLL'S FESTIVAL | DATE : 2004/08/10 / CHINATSU BIRTHDAY |
| DATE : 2004/11/22 / KYOTO | DATE : 2004/11/22 / KYOTO | DATE : 2004/11/22 / NARA | DATE : 2004/11/22 / NARA | DATE : 2004/11/22 / NARA | DATE : 2004/12/25 |
| 10505 / NEW YEAR / DATE : 2005/01/01 | DATE : 2005/03/03 / DOLL'S FESTIVAL | DATE : 2005/05/02 | DATE : 2005/05/05 / FIRST SEASONAL FESTIVAL | DATE : 2005/8/10 | DATE : 2005/10/12 / ATHLETIC MEETING / 10507 |

10401, 10506

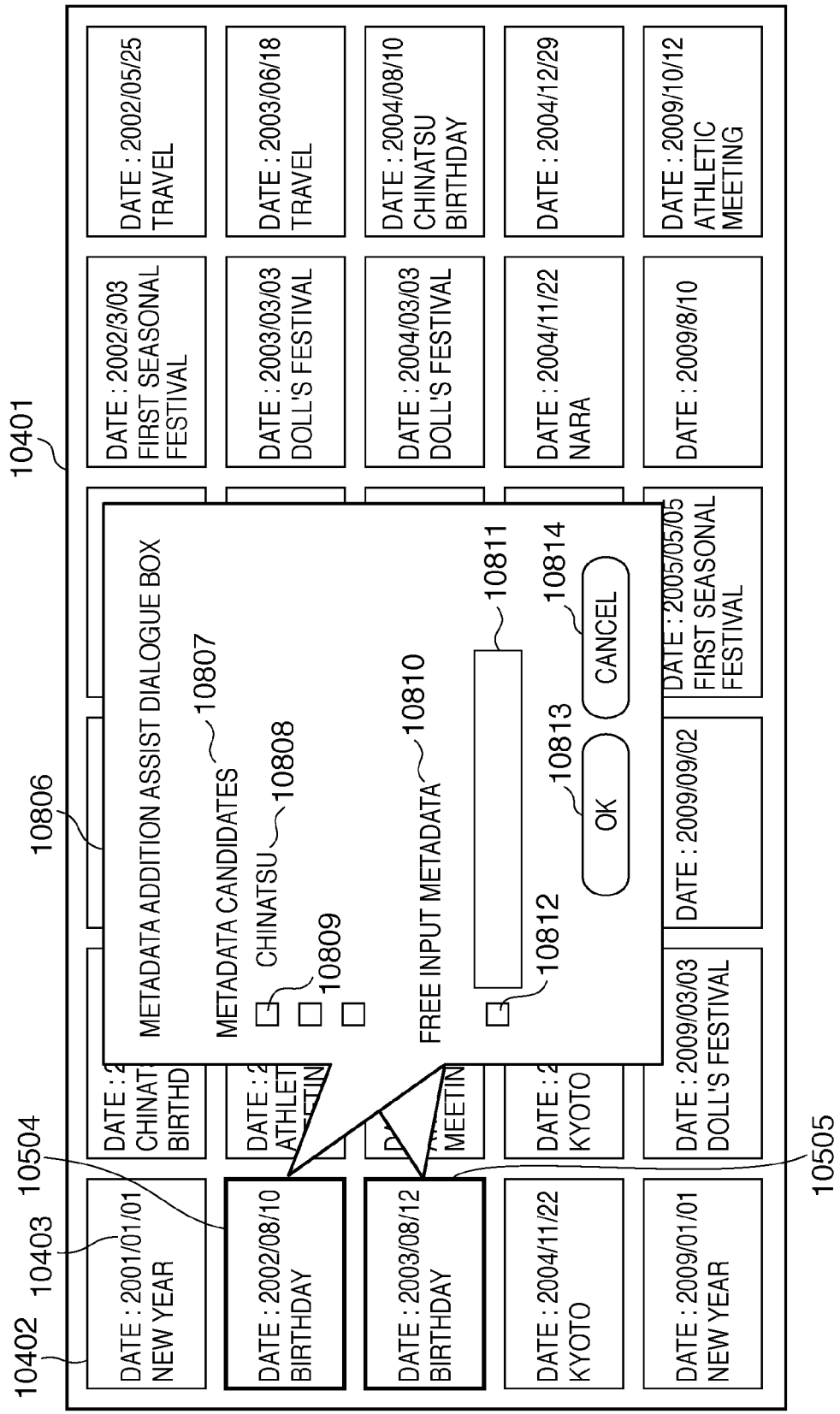

FIG. 35

| DATE : 2001/01/01<br>NEW YEAR | DATE : 2001/08/10<br>CHINATSU<br>BIRTHDAY | DATE : 2001/12/29<br>CHRISTMAS | | DATE : 2002/01/01<br>NEW YEAR | DATE : 2002/3/03<br>FIRST SEASONAL<br>FESTIVAL | DATE : 2002/09/29<br>TRAVEL |
| --- | --- | --- | --- | --- | --- | --- |
| DATE : 2002/08/10<br>BIRTHDAY<br>CHINATSU | DATE : 2002/10/10<br>ATHLETIC<br>MEETING | DATE : 2002/12/25<br>CHRISTMAS | | DATE : 2003/01/01<br>NEW YEAR | DATE : 2003/03/03<br>DOLL'S FESTIVAL | DATE : 2003/06/18<br>TRAVEL |
| DATE : 2003/08/12<br>BIRTHDAY<br>CHINATSU | DATE : 2003/10/08<br>ATHLETIC<br>MEETING | DATE : 2003/12/25 | | DATE : 2004/01/01<br>NEW YEAR | DATE : 2004/03/03<br>DOLL'S FESTIVAL | DATE : 2004/08/10<br>CHINATSU<br>BIRTHDAY |
| DATE : 2004/11/22<br>KYOTO | DATE : 2004/11/22<br>KYOTO | DATE : 2004/11/22<br>NARA | | DATE : 2004/11/22<br>NARA | DATE : 2004/11/22<br>NARA | DATE : 2004/12/29 |
| DATE : 2009/01/01<br>NEW YEAR | DATE : 2009/03/03<br>DOLL'S FESTIVAL | DATE : 2009/09/02 | | DATE : 2005/09/09<br>FIRST SEASONAL<br>FESTIVAL | DATE : 2009/8/10 | DATE : 2009/10/12<br>ATHLETIC<br>MEETING |

| 11102 11103 | | | | |
|---|---|---|---|---|
| DATE : 2001/01/01 NEW YEAR | DATE : 2001/08/10 CHINATSU BIRTHDAY | DATE : 2001/12/25 CHRISTMAS | DATE : 2002/01/01 NEW YEAR | DATE : 2002/3/03 FIRST SEASONAL FESTIVAL |
| DATE : 2002/10/10 ATHLETIC MEETING | DATE : 2002/12/25 CHRISTMAS | DATE : 2003/01/01 NEW YEAR | DATE : 2003/03/03 DOLL'S FESTIVAL | DATE : 2002/08/10 BIRTHDAY |
| DATE : 2003/08/10 BIRTHDAY | DATE : 2003/10/08 ATHLETIC MEETING | DATE : 2003/12/25 | DATE : 2004/01/01 NEW YEAR | DATE : 2003/06/18 KYOTO |
| DATE : 2004/11/21 | DATE : 2004/11/22 | DATE : 2004/11/23 NARA | DATE : 2004/11/23 KYOTO | DATE : 2004/03/03 DOLL'S FESTIVAL |
| DATE : 2005/01/01 NEW YEAR | DATE : 2005/03/03 DOLL'S FESTIVAL | DATE : 2005/05/02 | DATE : 2005/05/05 FIRST SEASONAL FESTIVAL | DATE : 2004/08/10 CHINATSU BIRTHDAY |
| | | | DATE : 2005/8/10 | DATE : 2004/12/25 |
| | | | | DATE : 2005/10/12 ATHLETIC MEETING |

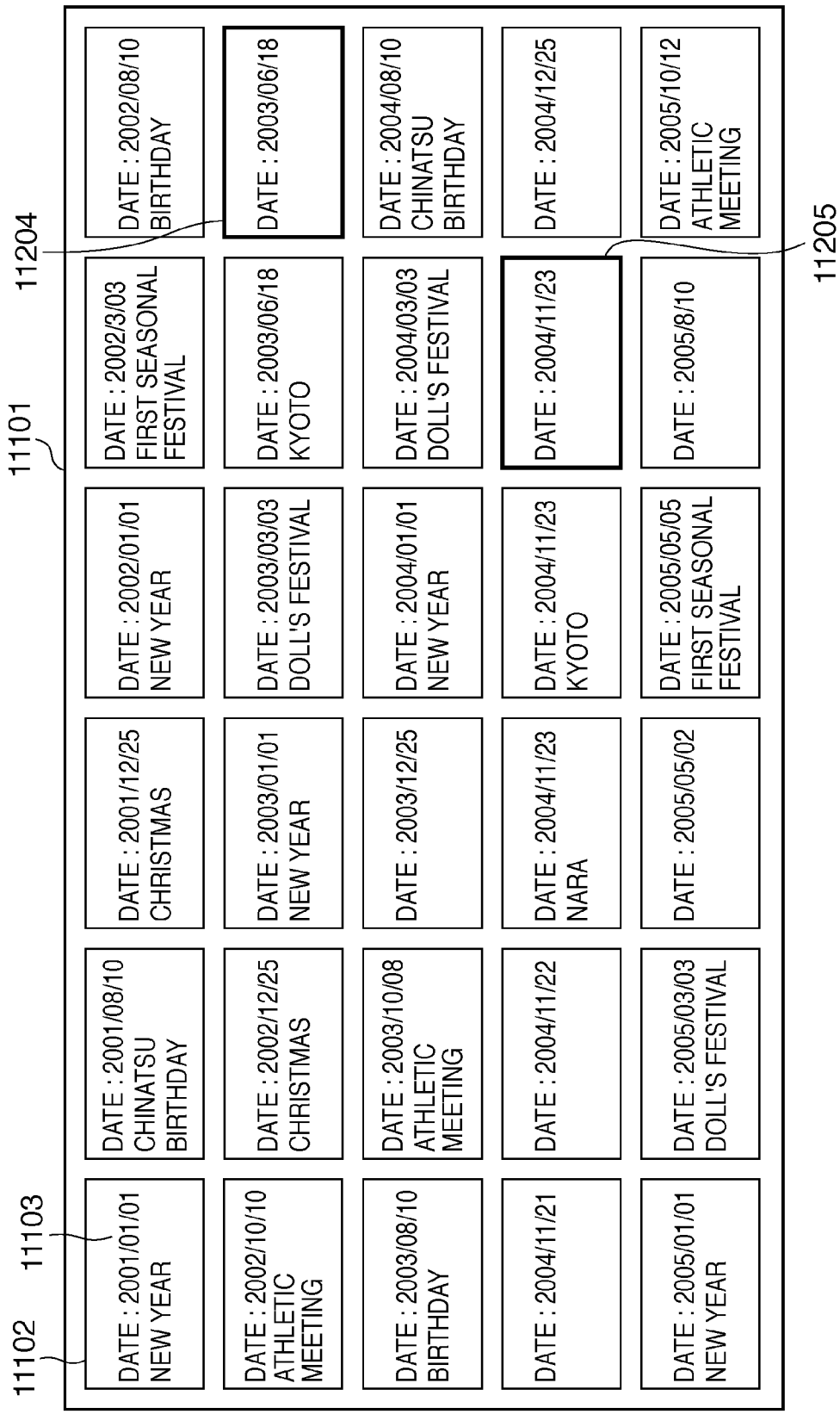

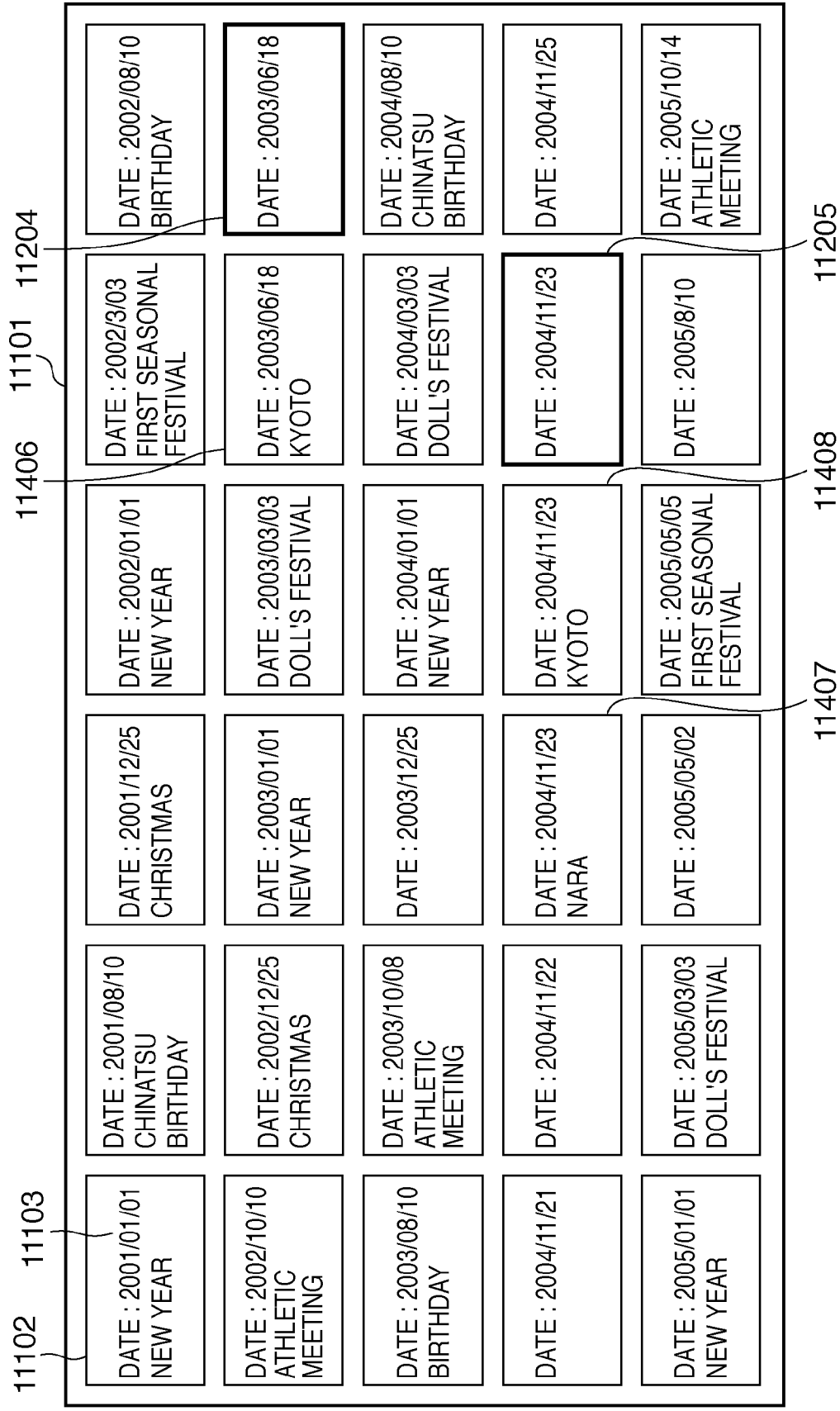

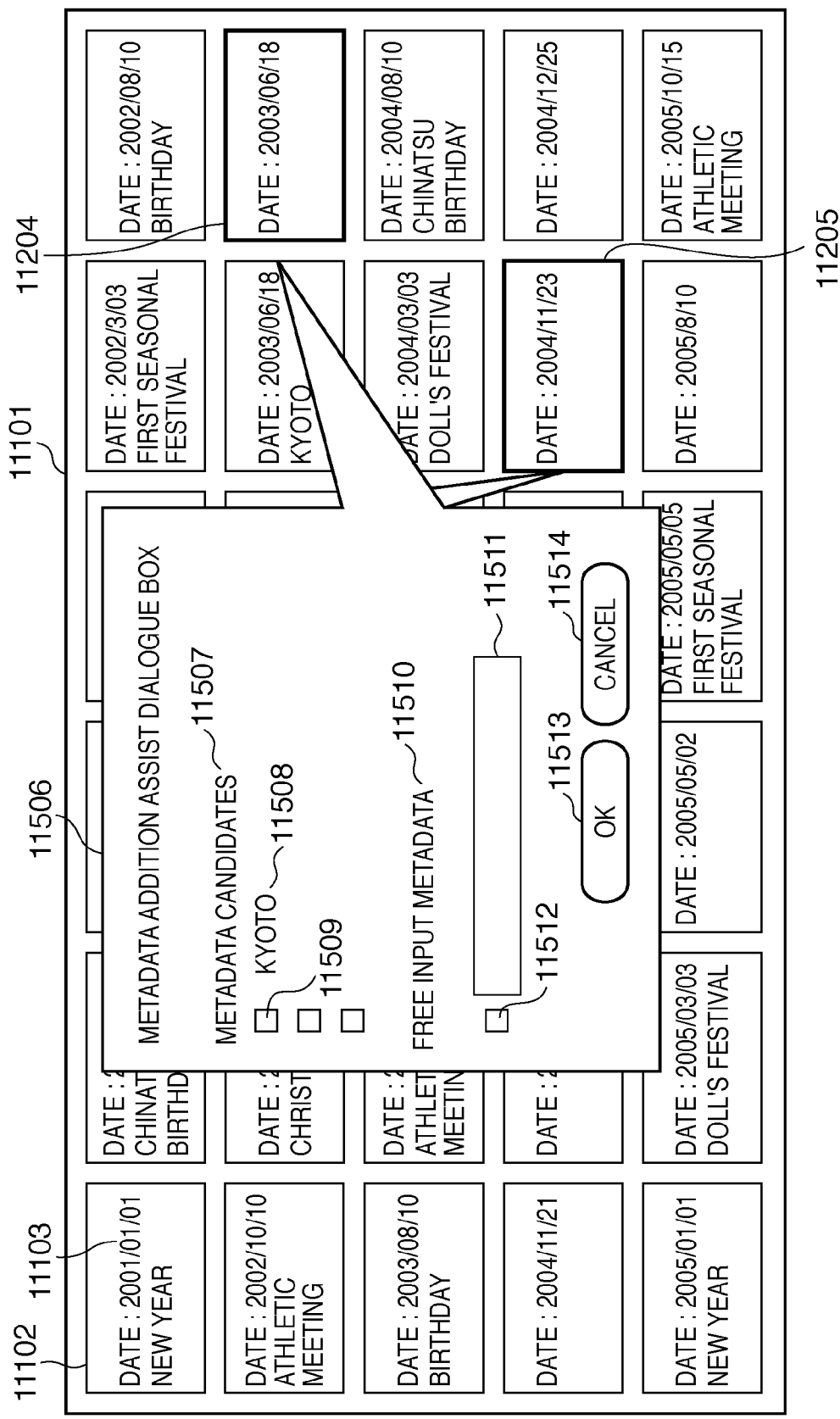

FIG. 42

| 11102 11103 | | 11101 | | 11604 | |
|---|---|---|---|---|---|
| DATE: 2001/01/01<br>NEW YEAR | DATE: 2001/08/10<br>CHINATSU<br>BIRTHDAY | | DATE: 2001/12/25<br>CHRISTMAS | DATE: 2002/01/01<br>NEW YEAR | DATE: 2002/3/03<br>FIRST SEASONAL<br>FESTIVAL | DATE: 2002/08/10<br>BIRTHDAY |
| DATE: 2002/10/10<br>CHINATSU<br>BIRTHDAY | DATE: 2002/12/25<br>CHRISTMAS | | DATE: 2003/01/01<br>NEW YEAR | DATE: 2003/03/03<br>DOLL'S FESTIVAL | DATE: 2003/06/18<br>KYOTO | DATE: 2003/06/18<br>KYOTO |
| DATE: 2003/08/10<br>BIRTHDAY | DATE: 2003/10/08<br>ATHLETIC<br>MEETING | | DATE: 2003/12/25 | DATE: 2004/01/01<br>NEW YEAR | DATE: 2004/03/03<br>DOLL'S FESTIVAL | DATE: 2004/08/10<br>CHINATSU<br>BIRTHDAY |
| DATE: 2004/11/21 | DATE: 2004/11/22 | | DATE: 2004/11/23<br>KYOTO | DATE: 2004/11/23<br>KYOTO | DATE: 2004/11/23<br>KYOTO | DATE: 2004/11/25 |
| DATE: 2005/01/01<br>NEW YEAR | DATE: 2005/03/03<br>DOLL'S FESTIVAL | | DATE: 2005/05/02 | DATE: 2005/05/05<br>FIRST SEASONAL<br>FESTIVAL | DATE: 2005/8/10 | DATE: 2005/10/16<br>ATHLETIC<br>MEETING |

| 11103 11102 | | | 11101 | 11804 |
|---|---|---|---|---|
| DATE: 2001/01/01 NEW YEAR | DATE: 2001/08/10 CHINATSU BIRTHDAY | DATE: 2001/12/25 CHRISTMAS | DATE: 2002/01/01 NEW YEAR | DATE: 2002/3/03 FIRST SEASONAL FESTIVAL | DATE: 2002/08/10 BIRTHDAY |
| DATE: 2002/10/10 ATHLETIC MEETING | DATE: 2002/12/25 CHRISTMAS | DATE: 2003/01/01 NEW YEAR | DATE: 2003/03/03 DOLL'S FESTIVAL | DATE: 2003/06/18 KYOTO NARA | DATE: 2003/06/18 |
| DATE: 2003/08/10 BIRTHDAY | DATE: 2003/10/08 ATHLETIC MEETING | DATE: 2003/12/25 | DATE: 2004/01/01 NEW YEAR | DATE: 2004/03/03 DOLL'S FESTIVAL | DATE: 2004/08/10 CHINATSU BIRTHDAY |
| DATE: 2004/11/21 | DATE: 2004/11/23 KYOTO | DATE: 2004/11/23 NARA | DATE: 2004/11/23 KYOTO | DATE: 2004/11/23 | DATE: 2004/12/25 |
| DATE: 2005/01/01 NEW YEAR | DATE: 2005/03/03 DOLL'S FESTIVAL | DATE: 2005/05/02 | DATE: 2005/05/05 FIRST SEASONAL FESTIVAL | DATE: 2005/8/10 | DATE: 2005/10/12 ATHLETIC MEETING |

11805

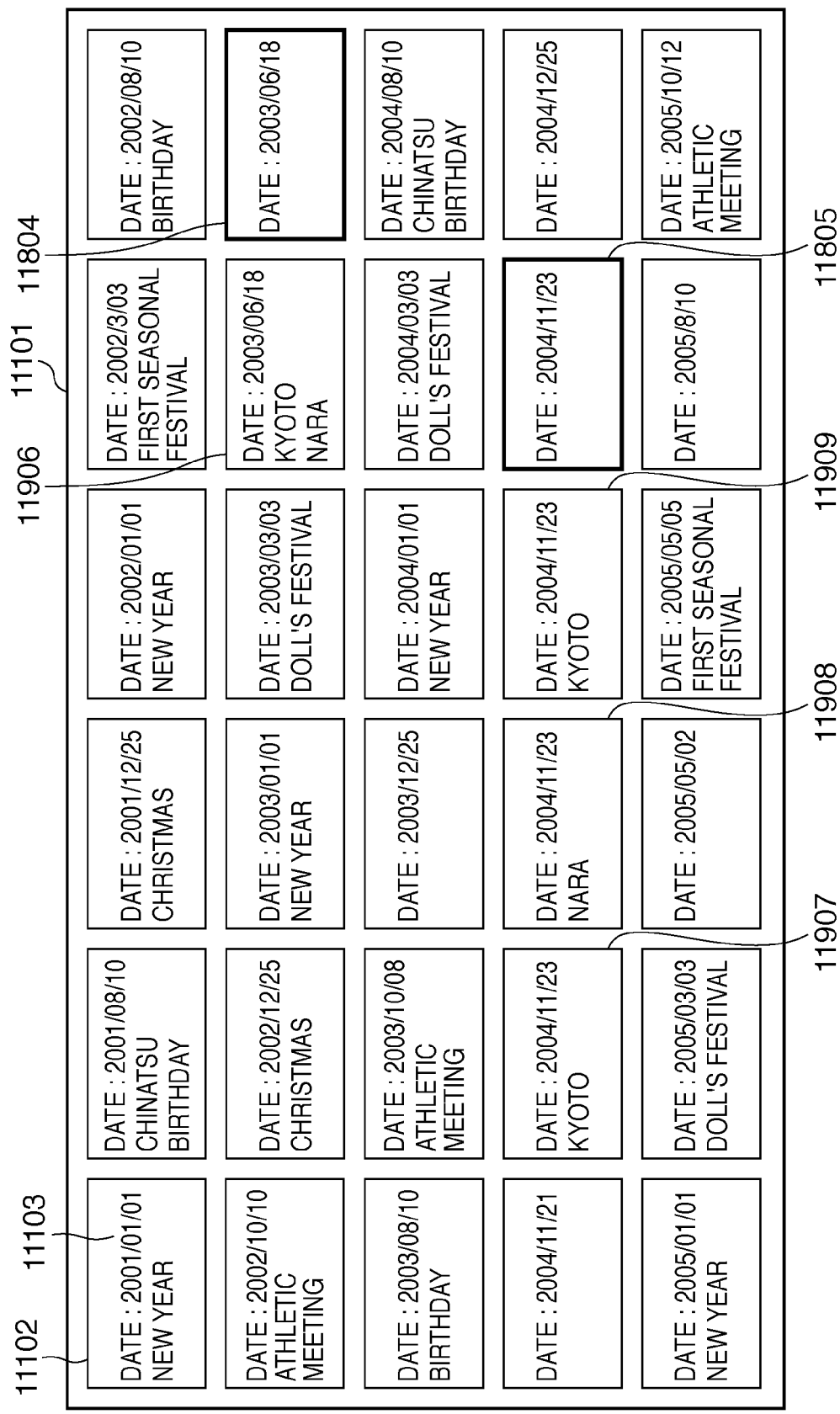

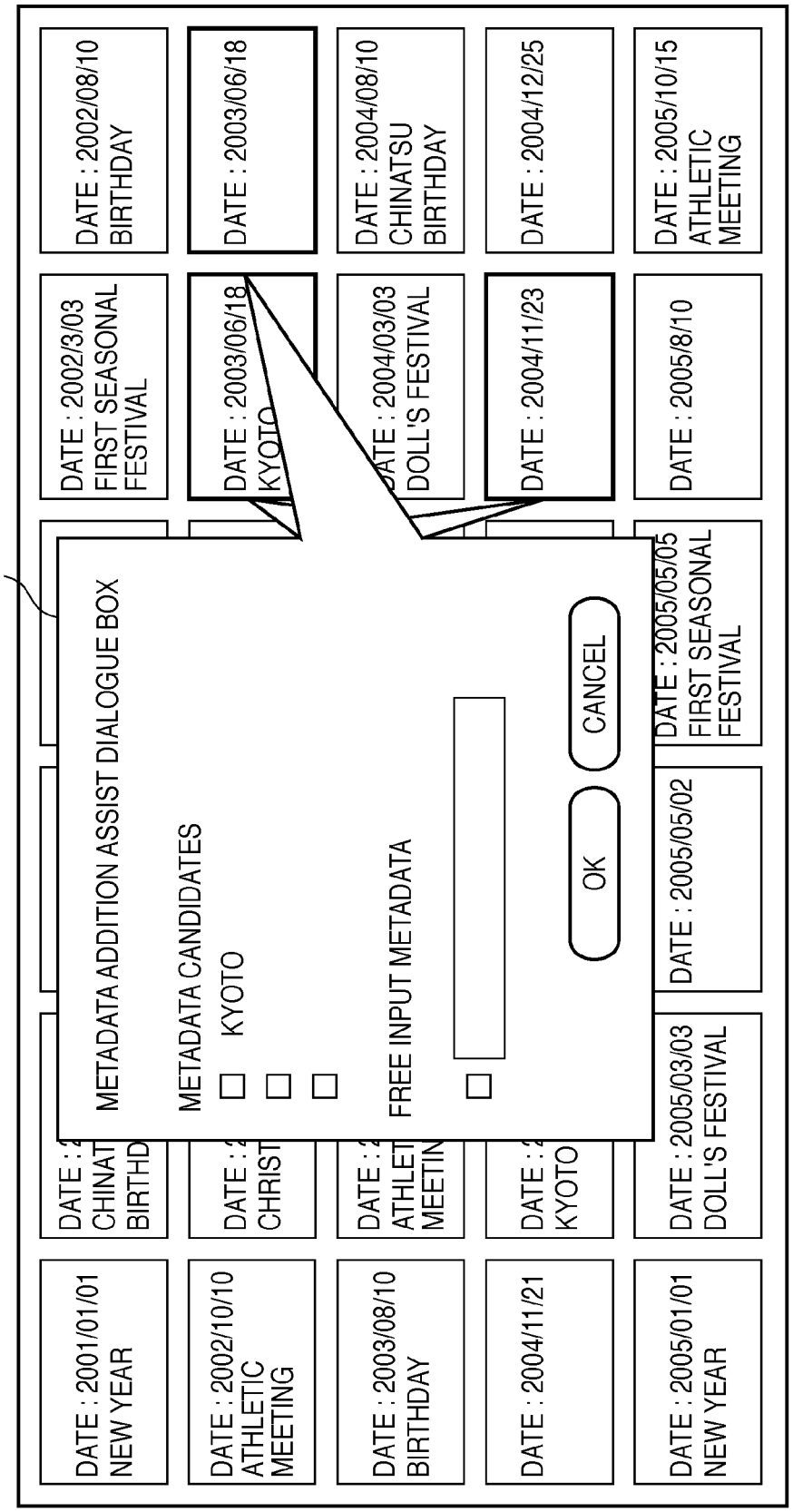

INFORMATION PROCESSING APPARATUS AND METHOD OF CONTROLLING THE SAME, INFORMATION PROCESSING METHOD, AND COMPUTER PROGRAM

BACKGROUND OF THE INVENTION

1. Field of the Invention

The present invention relates to an information processing apparatus and a method of controlling the same, an information processing method, and a computer program.

2. Description of the Related Art

Recently, easy-to-use data generation apparatuses such as a digital camera, word processor, voice creating apparatus, and music creating apparatus have been developed. In addition, along with the progress of a computer having a large-capacity storage device or products incorporating a computer, cases that an enormous amount of data is stored in the storage device of a computer or a product incorporating a computer have greatly increased. It is therefore necessary to select desired data from the large amount of data stored in the storage device. However, selecting desired data while confirming the data one by one requires labor and time, resulting in large difficulty.

When desired data is text data, it is possible to some extent to select it by a character string search. For data having no text data, like image data, desired image data must be selected by visually confirming each image data. This requires labor and time and is very difficult if the data amount is enormous.

Hence, data having no text data, like image data, is added with data called metadata and is searched for using the metadata. Additionally, recent digital cameras employ a method of automatically adding metadata called Exif data to a sensed image upon image sensing. Exif data is metadata associated with sensed data, including the shooting date, camera model name, camera owner, shutter speed, aperture value, and shooting location by GPS. It is recent common practice to acquire desired image data by searching for Exif data.

However, it is difficult to accurately select desired image data based on only Exif data used as metadata because its information amount is small. To solve this, in many cases, the user adds, as metadata, information associated with the image data such as an event name "athletic meeting" or "travel" or a personal name afterward, in addition to the Exif data, and searches for the metadata as a search target, thereby selecting desired image data.

However, since much labor and time are necessary for adding metadata to an enormous amount of data one by one, the user may be negligent in adding metadata, resulting in difficulty in selecting desired data.

To solve this problem, Japanese Patent Laid-Open No. 2003-228569 has proposed a technique of extracting keyword group data by morpheme analysis of text data that accompanies data. In the keyword group data extraction technique according to this proposal, however, it is impossible at high probability to use a method of generating metadata by element analysis of text data because many image data have no text data except for Exif data.

Japanese Patent Laid-Open No. 2002-330432 has proposed a technique of generating metadata based on the feature amount of image data. However, the proposed technique may uniformly add the same metadata to similar images and also add the same metadata to an image which is not so relevant to a person.

Japanese Patent Laid-Open No. 2006-099268 has proposed a technique of providing a metadata adding server which requests metadata addition and a requesting function. In this technique, the metadata adding server adds the same metadata to the same person, same event, or same phenomenon, thereby reducing processing of the self terminal and load in adding metadata. However, this technique adds the same metadata to the same person, same event, or same phenomenon. Since the same metadata is added to a number of data, an enormous amount of data are selected by a metadata search, resulting in difficulty in acquiring desired data.

Japanese Patent Laid-Open No. 2006-209516 has proposed a technique of preparing an icon having specific attribute information and storage location information and selecting one or more data and dragging & dropping them, thereby adding the same attribute information and storage location information to the data. This allows the user to simultaneously add the same metadata to a plurality of data to which the same attribute should be added. However, this proposed technique is not suitable for a purpose of adding metadata suitable to each data because metadata prepared in advance is unconditionally added to data selected by the user. If the user selects wrong data, it is impossible to either add appropriate metadata or perform a search by metadata.

Japanese Patent Laid-Open No. 2006-209516 has also disclosed a technique of searching for an element common to the metadata of a plurality of contents. If the metadata have the same constituent elements or constituent elements having a predetermined association, a union of the constituent elements of the metadata is generated. The union is added, as metadata, to the data having same constituent elements or constituent elements having a predetermined association. This makes it possible to add, to each of data having a strong association, the metadata of the respective data as a union. However, as a characteristic feature of this proposed technique, data having an association are added with the same metadata. Even when the user wants to discriminate between data by adding unique metadata to them based on a particularly noticeable difference, the metadata are not unique if the data have any association other than the noticeable point.

Japanese Patent Laid-Open No. 2005-352782 has disclosed a technique of selecting data as a metadata addition target to search for and extract similar data and adding metadata added to the found data to the selected data. This allows, in adding metadata, to add the same metadata as that added previously based on the metadata of the similar data. In this proposed technique, data as a metadata addition target is selected to search for and extract similar data, and metadata added to the found data is added to the selected data. In this case, however, as the metadata adding operation by the user progresses, the possibility that already added metadata is presented for data selected as a metadata addition target increases. If metadata added to data that has happened to be found and extracted as similar data and having little association is presented, the user must do determination every time. When simultaneously adding metadata to a plurality of data to raise the operation efficiency, no search and extraction of highly similar data can be done unless all the data have high similarity.

SUMMARY OF THE INVENTION

It is an object of the present invention to largely reduce the user's labor for adding metadata to data for easy search and selection of desired data.

According to one aspect of the embodiments of the present invention, an information processing apparatus is provided. The information processing apparatus comprises, a storage unit configured to store image data and metadata of the image data, a reception unit configured to receive designation of at least two of the image data stored in the storage unit and designation of metadata to be newly added to the designated image data, a first selection unit configured to select, from the image data stored in the storage unit, other image data which has the same metadata as all metadata common to the designated image data, and a control unit configured to add the metadata to be newly added to the metadata of each of the designated image data and the selected other image data and storing the image data in the storage unit.

According to another aspect of the embodiments of the present invention, an information processing apparatus is provided. The information processing apparatus comprises a data selection unit configured to select a plurality of data, a common keyword extraction unit configured to extract a common keyword from the plurality of data selected by the data selection unit, a data extraction unit configured to extract associated data based on the common keyword extracted by the common keyword extraction unit, and a metadata candidate specifying unit configured to specify metadata candidates from metadata of the associated data extracted by the data extraction unit.

Further features of the present invention will become apparent from the following description of exemplary embodiments with reference to the attached drawings.

BRIEF DESCRIPTION OF THE DRAWINGS

FIG. 5 is a view showing an example of association between image data and added metadata according to the first embodiment of the present invention;

FIG. 12 is a view showing an example of association between image data and added metadata according to the second embodiment of the present invention;

FIG. 30 is a view showing an example of a display screen on an output device 10208 in step S10302;

FIG. 31 is a view showing an example of the display screen on the output device 10208 in step S10305;

FIG. 34 is a view showing an example of a metadata addition assist dialogue box 10806;

FIG. 35 is a view showing an example of the display screen when a user selects a metadata candidate "Chinatsu" in the metadata addition assist dialogue box 10806 shown in FIG. 34 and completes metadata addition to selected data;

FIG. 37 is a view showing an example of a display screen on an output device 10208 in step S11002;

FIG. 38 is a view showing an example of the display screen on the output device 10208 in step S11005;

FIG. 39 is a view showing an example of extracted data according to the seventh embodiment of the present invention;

FIG. 41 is a view showing an example of a metadata addition assist dialogue box 11506;

FIG. 42 is a view showing an example of a display screen when a user selects a metadata candidate "Kyoto" in the metadata addition assist dialogue box 11506 shown in FIG. 41 and completes metadata addition to selected data;

FIG. 43 is a view showing an example in which data 11804 and 11805 selected by the user in step S11005 of FIG. 36 are indicated by bold frames;

FIG. 44 is a view showing an example of extracted data according to the eighth embodiment of the present invention;

FIG. 49 is a view showing an example of a metadata addition assist dialogue box 12306.

DESCRIPTION OF THE EMBODIMENTS

The embodiments of the present invention will now be described in detail with reference to the accompanying drawings.

First Embodiment

Figure 1:
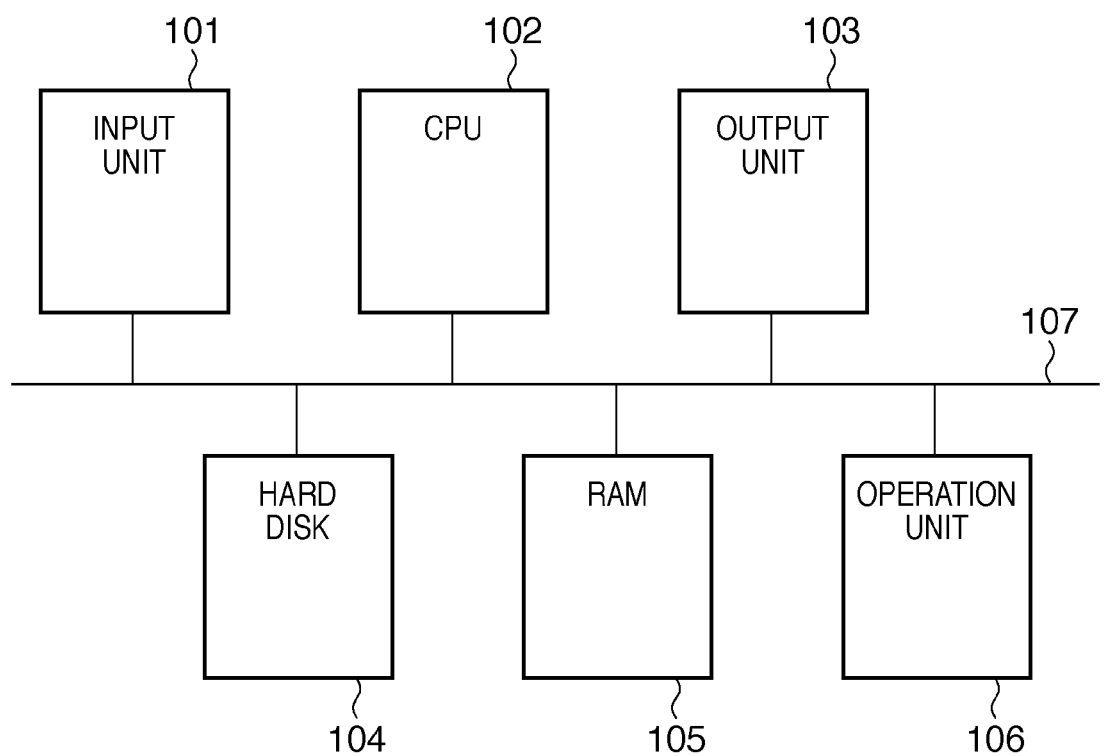
FIG. 1 is a block diagram showing an example of the hardware configuration of an information processing apparatus according to an embodiment of the present invention.

The first embodiment of the present invention will be described below in detail with reference to the accompanying drawings. FIG. 1 is a block diagram showing an example of the hardware configuration of an information processing apparatus 100 according to this embodiment.

Referring to FIG. 1, an input unit 101 inputs information (data). A CPU 102 performs arithmetic operations and logical determination for various kinds of processing and controls constituent elements connected to a bus 107. An output unit 103 outputs information (data). This embodiment will be explained assuming that the output unit 103 is an LCD capable of outputting a bitmap image. However, the output unit 103 is not limited to an LCD but may be a display such as a CRT or a printer.

A hard disk 104 is a storage means for storing programs for control by the CPU 102, including the processing procedures of flowcharts to be described later, and also storing image data and its metadata in association with each other. The hard disk 104 may include a ROM. The hard disk 104 need not always be integrated with the apparatus of this embodiment. It may be, for example, a separate device which is connected to the apparatus using wireless communication such as Bluetooth or wired communication such as a LAN.

A RAM 105 stores display data or data generated by various kinds of processing. In particular, the RAM is used to store image data and metadata read out from the hard disk 104 to execute processing according to the embodiment. In this embodiment, the RAM 105 may be either a storage medium in which data is loaded from a nonvolatile external storage medium before processing, or a storage medium that can be referred to as needed. The RAM 105 need not always be integrated with the apparatus. It may be, for example, a separate device which is connected to the apparatus using wireless communication such as Bluetooth or wired communication such as a LAN.

Figure 2:
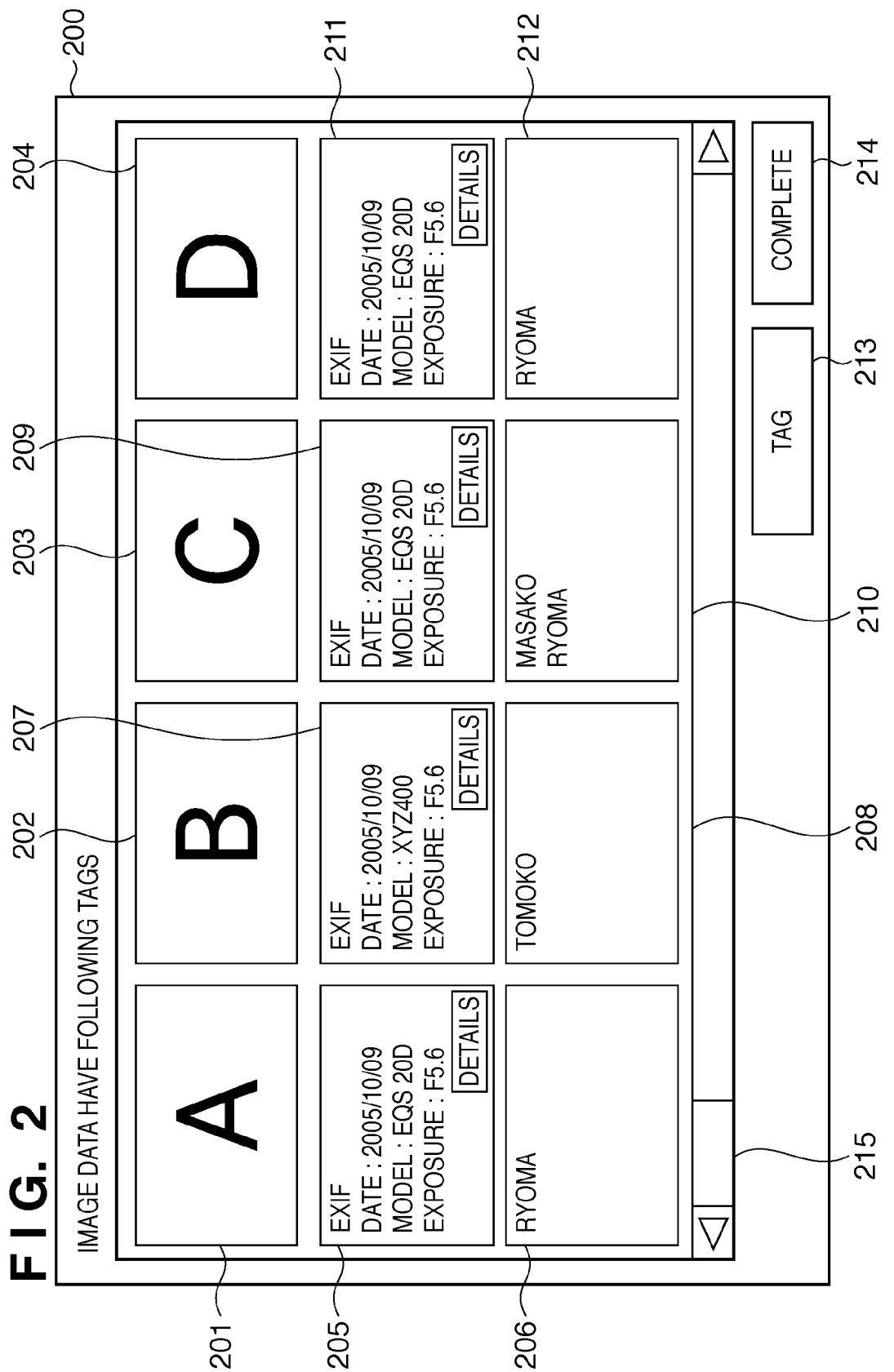
FIG. 2 is a view showing an example of an operation window according to the first embodiment of the present invention.

An operation unit 106 is a user interface, including a mouse, keyboard, and buttons, which receives an operation input from the user of the information processing apparatus 100. An operation input received by the operation unit 106 is transmitted to the CPU 102 via the bus 107 so that information is selected, or the window display contents on the output unit 103 are switched. An operation for an operation window as shown in FIG. 2 or the like to be described later is received from the user via the operation unit 106.

The bus 107 transfers address signals to designate constituent elements to be controlled by the CPU 102, control signals to control the constituent elements, and data to be exchanged between the constituent elements. In this embodiment, the bus 107 is assumed to be connected by a cable. However, any form other than the wired connection, such as wireless connection, is usable if communication can be done.

The operation of the information processing apparatus 100 according to this embodiment will be described next with reference to FIGS. 2 to 8. FIG. 2 is a view showing an example of image data and their metadata displayed on the LCD screen of the output unit 103 of the information processing apparatus 100.

An operation window 200 displays image data and its metadata in parallel. In this embodiment, image data will be explained as photo image data sensed by a digital camera. Metadata includes Exif data generated together with a photo image. Exif data includes the shooting date, digital camera model name, shooting location, camera owner, lens focal length, aperture value, and shutter speed value. In this embodiment, metadata can include either only at least one of the Exif data or none of them. Metadata also includes attribute information of image data, which is formed from an arbitrary character string assigned to the image data by the user of the information processing apparatus 100. In this embodiment, the attribute information will be referred to as a "tag". The contents of a tag include arbitrary character strings representing the attribute of image data such as an event name (e.g., athletic meeting, excursion, or school arts festival), personal name (e.g., Ryoma, Tomoko, or Masako), and category name (e.g., business, private, or family).

Image data and its metadata are associated with each other and stored in the hard disk 104. When displaying the operation window 200, they are read out to the RAM 105 and processed for display.

FIG. 2 shows an example in which four photos, that is, photo A 201, photo B 202, photo C 203, and photo D 204 are displayed on the operation window 200. However, the number of images displayed on the operation window 200 is not limited to four. A larger or smaller number of images may be displayed. The user can display other photos on the operation window 200 using a scroll bar 215.

Of the metadata of the photos A, B, C, and D, some Exif data are displayed in regions 205, 207, 209, and 211. When a details button is operated, the remaining Exif data which are not displayed on the operation window 200 can be displayed.

Of the metadata of the photos A, B, C, and D, tags are displayed in regions 206, 208, 210, and 212. In this example, each photo that is image data and the metadata of the image data (Exif data and a tag) are associated in the vertical direction and displayed. The image data are arranged in the horizontal direction so that the user can confirm the contents of metadata of other image data using the scroll bar 215. The layout of the operation window 200 is not limited to that shown in FIG. 2. Any other form may be employed if it allows the user to grasp the correspondence relationship between image data and metadata.

Referring to FIG. 2, the date of Exif data serving as the metadata of the photo A is "2005/10/09", the model is "EOS 20D", and the exposure is "F5.6". A tag "Ryoma" is also added as metadata.

The date of Exif data serving as the metadata of the photo B is "2005/10/09", the model is "XYZ 400", and the exposure is "F5.6". A tag "Tomoko" is also added as metadata. The date of Exif data serving as the metadata of the photo C is "2005/10/09", the model is "EOS 20D", and the exposure is "F5.6". Tags "Masako" and "Ryoma" are also added as metadata. The date of Exif data serving as the metadata of the photo D is "2005/10/09", the model is "EOS 20D", and the exposure is "F5.6". A tag "Ryoma" is also added as metadata.

That is, the photos A to D are added with metadata of the same date. The photos A, C, and D are added with metadata of the same model name. The photos A and C are added with the same tag "Ryoma".

The user operates a complete button 214 to end processing of adding metadata to image data using the operation window 200 in FIG. 2. The operation window 200 closes upon receiving the operation of the complete button 214.

The user operates a "tag" button 213 to add/delete a tag to/from a photo as image data in the display state in FIG. 2. When the user operates the "tag" button 213, the window shifts to an operation window 300 in FIG. 3.

Figure 3:
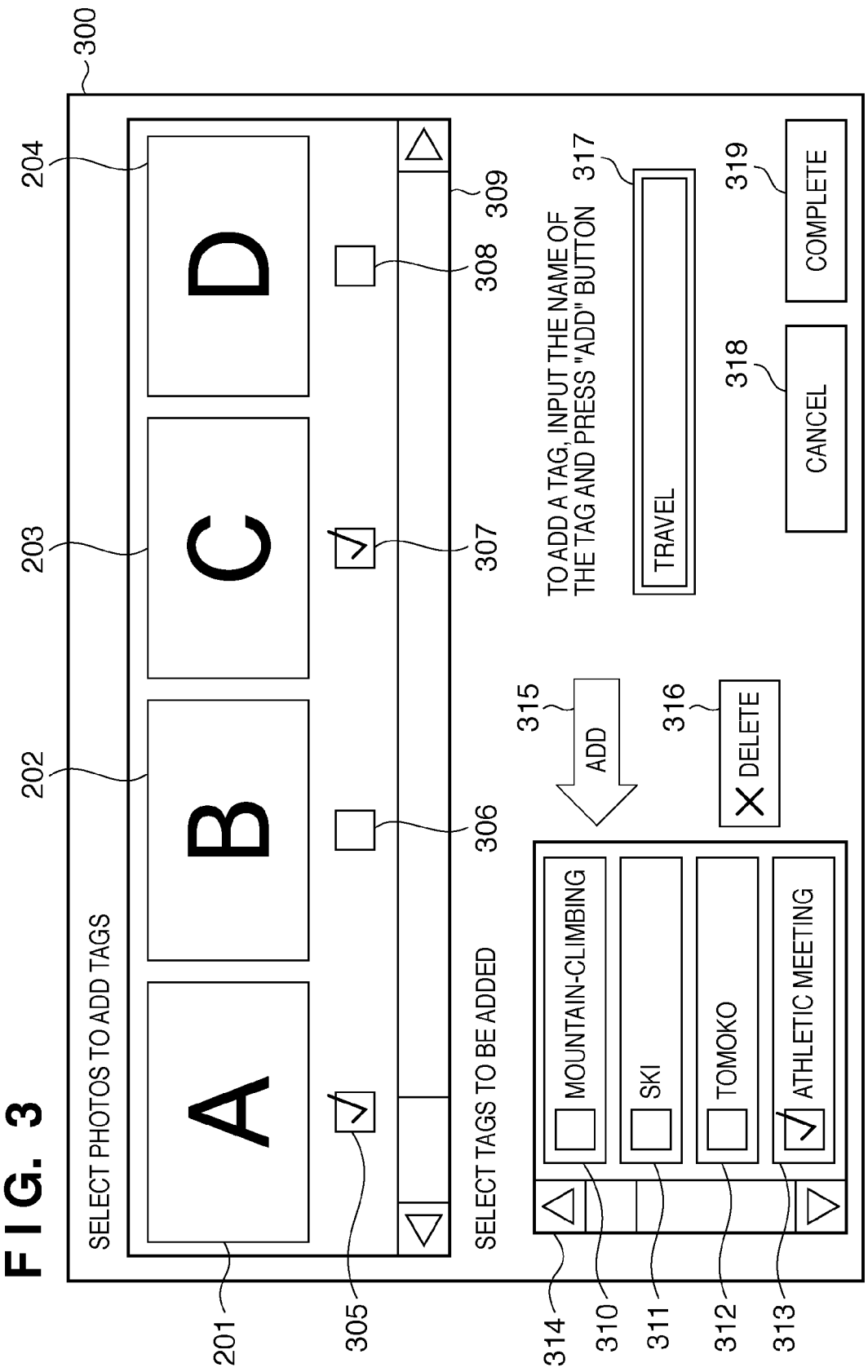
FIG. 3 is a view showing an example of an operation window for designating image data and tags according to the first embodiment of the present invention.

FIG. 3 shows a display example of the tag change operation window 300 for adding/deleting a tag to/from image data. The photo A 201, photo B 202, photo C 203, and photo D 204 are displayed. The user can display photos other than the photos A to D on the operation window 300 using a scroll bar 309.

The photos are given check boxes 305, 306, 307, and 308, respectively. The user can designate a tag addition target photo by checking the check box below the photo to which a tag is to be added. In FIG. 3, a check box is used to designate a photo. However, the photo designation method is not limited to this, and any other method is usable if it can select a photo.

A tag list in which the candidates of tags to be added to image data are registered is displayed on the lower side of the check boxes. Tags 310 to 313 are examples of tag candidates included in the list. FIG. 3 shows four tag candidates. However, the number of tag candidates is not limited to this. If other tag candidates exist, they can be displayed on the screen by scrolling the list using a scroll bar 314. The list has check boxes on the left side of the tag candidates. The user can designate tag candidates to be newly added by checking the check boxes and add the tags to the image data designated by the check boxes 305 to 308.

The tag candidates registered in the list are arbitrary character strings and can freely be added and deleted. The user can add a tag candidate by inputting an arbitrary character string to a character string input field 317 and operating an add button 315. The user can delete a tag candidate from the list by operating a delete button 316.

The user can enable tag addition performed on this window by pressing a complete button 319. If tag candidates have been added/deleted to/from the list, the change of the list is also enabled. When the user operates the complete button 319, the display screen on the output unit 103 changes to a window shown in FIG. 4. On the other hand, when the user operates a cancel button 318, all operations performed on the operation window 300 are disabled. The window is closed, and the initial window in FIG. 2 is displayed again.

The operation window 300 in FIG. 3 indicates that the photos A and C are designated. The two photos A and C are designated in this case. However, more photos may be designated by checking the check boxes of other photos using the scroll bar 309.

FIG. 3 shows a state in which "athletic meeting" is designated out of the tag candidates. When the user operates the complete button 319 in this state, the designated tag candidate is added to the metadata of the checked photos.

Figure 4:
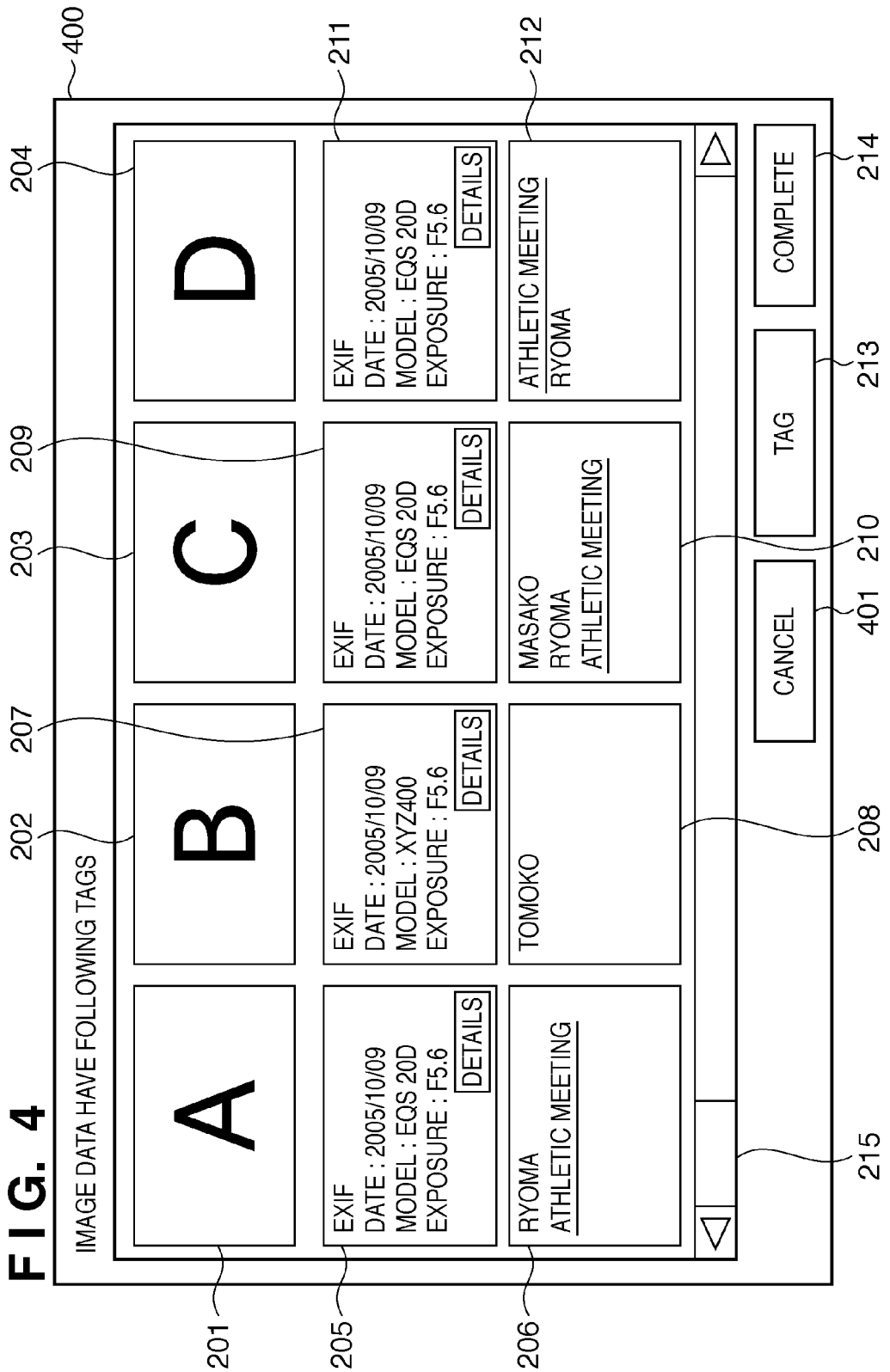
FIG. 4 is a view showing an example of an operation window after addition of tags according to the first embodiment of the present invention.

The user is notified by an operation window 400 in FIG. 4 that the new tag is added to the metadata. The window in FIG. 4 indicates the result of tag candidate addition to the metadata. In this case, the metadata of the photo A 201 and the photo C 203 are added with the tag "athletic meeting" designated in FIG. 3. The newly added metadata can be highlighted for easy identification. FIG. 4 shows underlined metadata.

Referring to FIG. 4, the photo D 204 that is not designated in FIG. 3 is also added with the tag "athletic meeting". The photo D is selected based on the metadata of the photos A and C. The photo B is not added with the tag "athletic meeting".

Processing of automatically adding tags according to this embodiment will be described next with reference to FIG. 5. FIG. 5 is a view showing the relationship between the photos and the metadata.

Referring to FIG. 5, the photos A and C are common in "date 2005/10/09", "model EOS 20D", "exposure F5.6", and the tag "Ryoma". Hence, in FIG. 5 of this embodiment, the metadata "date 2005/10/09", "model EOS 20D", "exposure F5.6", and "Ryoma" are common to the photos A and C.

The photo D has metadata "date 2005/10/09", "model EOS 20D", "exposure F5.6", and "Ryoma". The metadata of the photo D include all the metadata of the photos A and C. Hence, the photo D can be selected as a target to which metadata (tag) added to the photos A and C should automatically be added. For this reason, the photo D as selected image data is added with "athletic meeting" that is the tag added to the photos A and C.

On the other hand, the photo B has "date 2005/10/09" and "exposure F5.6" which are the metadata common to the photos A and C, though the model is "XYZ 400". That is, the photo B does not have all the metadata common to the photos A and C. Hence, the photo B is not selected as a target to which a tag should automatically be added.

The processing of automatically adding a tag is also applied to any photos other than the photos A to D. This makes it possible to designate at least two of a number of image data and designate a tag, thereby adding the designated tag to image data having all metadata common to the designated image data. This greatly saves the user time in designating each image data of a metadata addition target and assigning metadata.

Figure 6:
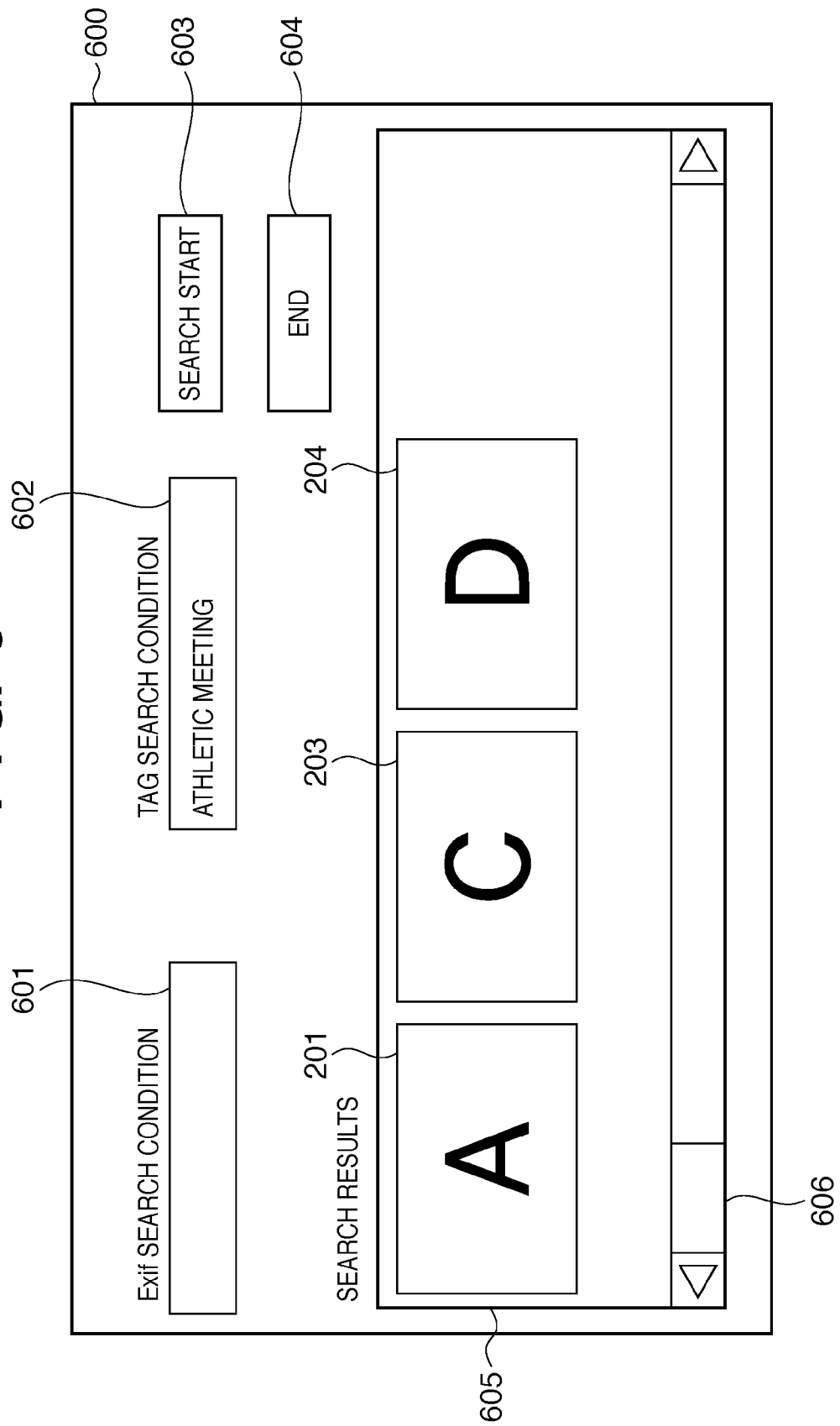
FIG. 6 is a view showing an example of a search window using metadata according to the embodiment of the present invention.

It is possible to search for image data based on the thus added metadata. FIG. 6 shows an example of a search window for searching for a character string using a tag and selecting a photo as image data. FIG. 6 shows a mere example of the search window. The form of the window is not limited to this if image data can be searched for using its metadata.

On a search window 600, the character string of Exif data to be searched can be input to an Exif search condition input region 601 where an Exif search condition is set. The character string of a tag to be searched can be input to a tag data search condition input region 602 where a tag search condition is set. FIG. 6 shows a state in which a character string "athletic meeting" is input to the input region 602.

When the user operates a search start button 603, image data each having metadata that matches the input character string are searched and displayed in a search result display region 605. FIG. 6 shows a state in which the photos A, C, and D added with the tag "athletic meeting" in FIG. 4 are displayed. If too many image data to display in the display region 605 are found, the user can use a scroll bar 606. An end button 604 is operated to close the search window.

In the example shown in FIG. 6, not the Exif input region 601 but only the tag input region 602 is used to input a search condition. However, a search can be done by inputting character strings to both input regions. In that case, an AND or OR search can be performed.

The sequence of processing according to this embodiment will be described next with reference to the flowchart in FIG. 7. This processing is implemented by reading out a corresponding processing program from the hard disk 104 to the RAM 105 and causing the CPU 102 to execute it.

First, in step S701, image data and corresponding metadata are read out from the hard disk 104 to the RAM 105. The operation window 200 shown in FIG. 2 is displayed on the output unit 103 to receive user operations. The receivable operations include the operations of the details buttons, the "tag" button 213, the complete button 214, and the scroll bar 215. In step S702, it is determined whether the "tag" button 213 is operated. If the "tag" button 213 is operated ("YES" in step S702), the process advances to step S703. In step S703, the operation window 300 shown in FIG. 3 is displayed on the output unit 103 to receive operations. The receivable operations include designation of image data as a tag addition target, designation of a tag to be added, the operation of the scroll bar 309, the operation of adding/deleting a tag to/from the tag candidate list, and the operations of the cancel button 318 and the complete button 319. On the other hand, if the "tag" button 213 is not operated ("NO" in step S702), the process returns to step S701.

In step S704, it is determined the received operations include the operation of the complete button 214. If the complete button is operated ("YES" in step S704), the process advances to step S705. If the operation of the complete button is not received ("NO" in step S704), the process returns to step S703 to further receive operations.

In step S705, image data added with a new tag are selected as a group A based on the operations received in step S704. In step S706, image data of a group B are selected based on the metadata of the image data of the group A. The processing of selecting the image data of the group B will be described later in detail with reference to FIG. 8.

In step S707, the tag added to the image data of the group A is added to the metadata of the image data of the group B. In step S708, the operation window 400 shown in FIG. 4 is displayed on the output unit 103 to receive operations. The receivable operations include the operations of the details buttons, the "tag" button 213, the complete button 214, the scroll bar 215, and a cancel button 401. The operation window 400 enables the user to confirm the contents of the tag newly added as metadata. In step S709, it is determined whether the complete button 214 on the operation window 400 is operated. If the complete button 214 is operated ("YES" in step S709), the contents of metadata of each image data stored in the hard disk 104 are updated based on the processing result, and the processing ends. On the other hand, if the complete button 214 is not operated ("NO" in step S709), the process returns to step S708 to continue the processing. If the operation of the "tag" button 213 is received again, the process may return to step S703 to execute the processing.

Details of the processing in step S706 of FIG. 7 will be described next with reference to FIG. 8. FIG. 8 is a flowchart illustrating an example of processing of selecting image data except those of the group A as the image data of the group B based on the metadata of the image data of the group A.

Referring to FIG. 8, in step S801, the metadata (to be referred to as "metadata A" hereinafter) of the image data of the group A are extracted from the metadata read out to the RAM 105. In step S802, metadata (to be referred to as "metadata B" hereinafter) common to the image data of the group A are extracted from the metadata A. In step S803, other image data having all the metadata B are selected from the image data read out to the RAM 105 as the image data of the group B.

<Modification>

In the above-described invention, all metadata added to image data are used to specify common metadata of designated image data. However, it is not always necessary to use all the added metadata. Metadata is used to form image data groups. Even when only some of the metadata are used, no problem is posed in the embodiment of the present invention as long as more appropriate grouping can be done by selecting information useful for grouping.

Particularly, Exif data that are automatically added upon image data generation may have the same or different values independently of the association between image data. Hence, when selecting image data having metadata common to designated image data, the user can arbitrary designate metadata to be taken into consideration and metadata to be excluded out of consideration.

In the example described in this embodiment, the user may exclude exposure data out of consideration. As a detailed setting method, for example, when designating image data on the operation window 300 in FIG. 3, the user can set metadata to be used out of the metadata added to the designated image data. This allows automatic tag addition using metadata regarded by the user to reflect the association between the image data. This modification is also applicable to the second and subsequent embodiments.

As described above, according to this embodiment, designating at least two image data and metadata to be added to them makes it possible to automatically add the metadata to image data which has metadata common to the designated image data. Since it is unnecessary to designate each image data to which metadata should be added, the burden on the user can be reduced, and the metadata addition processing can be executed efficiently.

Second Embodiment

The second embodiment of the present invention will be described next in detail. This embodiment describes an additional embodiment or a modification to the first embodiment. An information processing apparatus according to the second embodiment has the same hardware configuration as the information processing apparatus 100 shown in FIG. 1.

Figure 9:
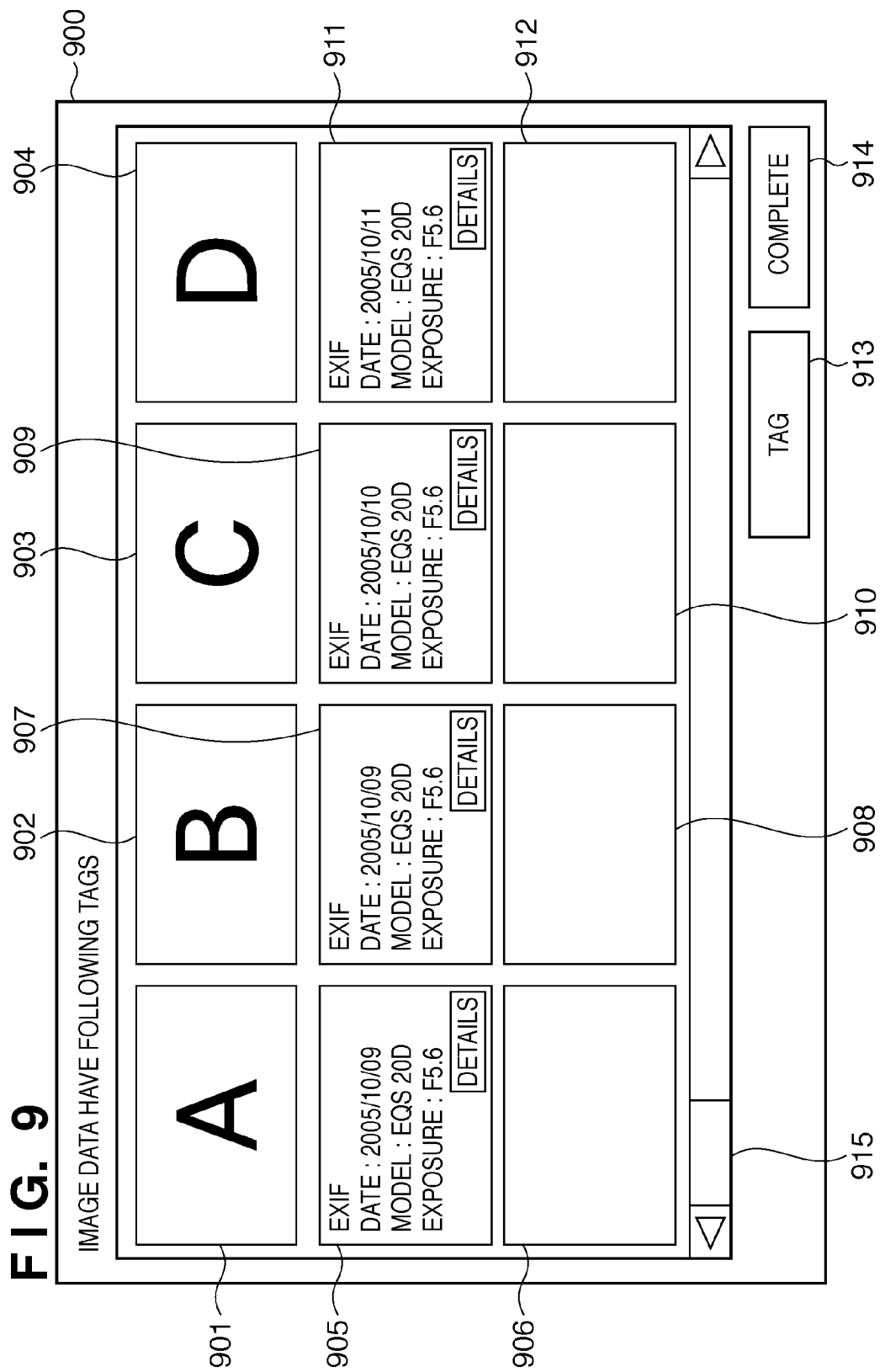
FIG. 9 is a view showing an example of an operation window according to the second embodiment of the present invention.

FIG. 9 is a view showing an example of an operation window according to this embodiment. An operation window 900 fundamentally has the same arrangement as the operation window 200 in FIG. 2. Reference numerals in the nine-hundreds in FIG. 9 correspond to those in the two-hundreds in FIG. 2. Hence, a description of common contents will not be repeated. In FIG. 9, the image data of photos A to D are added with only Exif data serving as metadata but no tags yet. The Exif data are different from those in FIG. 2.

More specifically, the date of the Exif data of the photos A and B is "2005/10/09". On the other hand, the date of the Exif data of the photo C is "2005/10/10". The date of the Exif data of the photo D is "2005/10/11". The photos A and B have the same date. The date of the photo D is later than that of the photo C.

Figure 10:
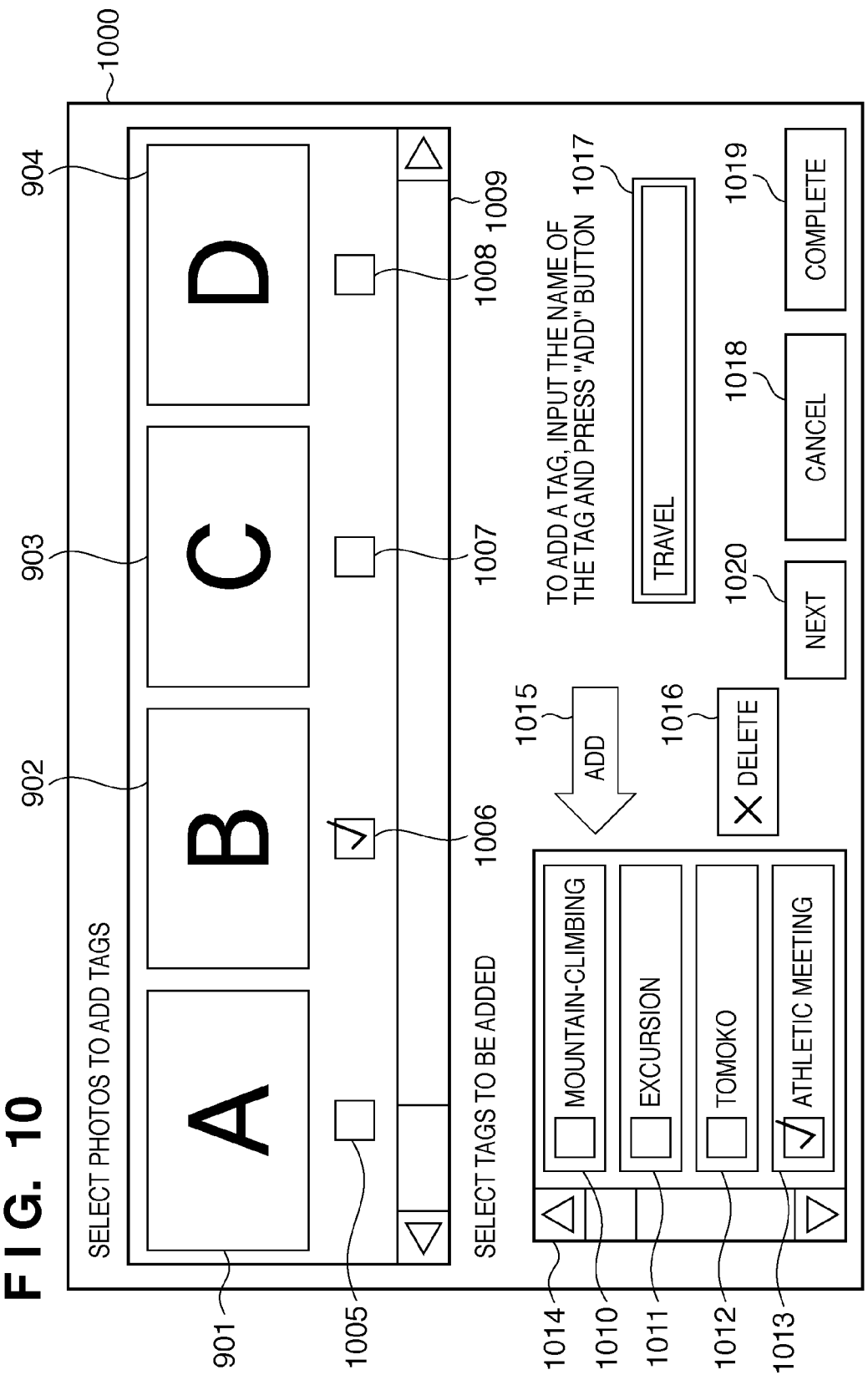
FIG. 10 is a view showing an example of an operation window for designating image data and tags according to the second embodiment of the present invention.

When the user operates a "tag" button 913 on the operation window 900 in FIG. 9, an operation window shown in FIG. 10 is displayed on an output unit 103. An operation window 1000 in FIG. 10 fundamentally has the same arrangement as the operation window 300 in FIG. 3 except the presence of a "next" button 1020.

The operation of the "next" button 1020 makes it possible to select, in the same window, image data to which each of a plurality of tag candidates is to be added. For example, as shown in FIG. 10, a check box 1006 of the photo B is checked. Then, a tag "athletic meeting" 1013" is checked, and the "next" button 1020 is operated. This makes it possible to reset the display of the operation window 1000 and select another photo and tag while holding the designated contents at that time in a RAM 105. In this embodiment, assume that a tag "excursion" is added to the photo C. After addition of a desired tag to image data is completed, the operation window shown in FIG. 11 can be displayed by operating a complete button 1019.

Figure 11:
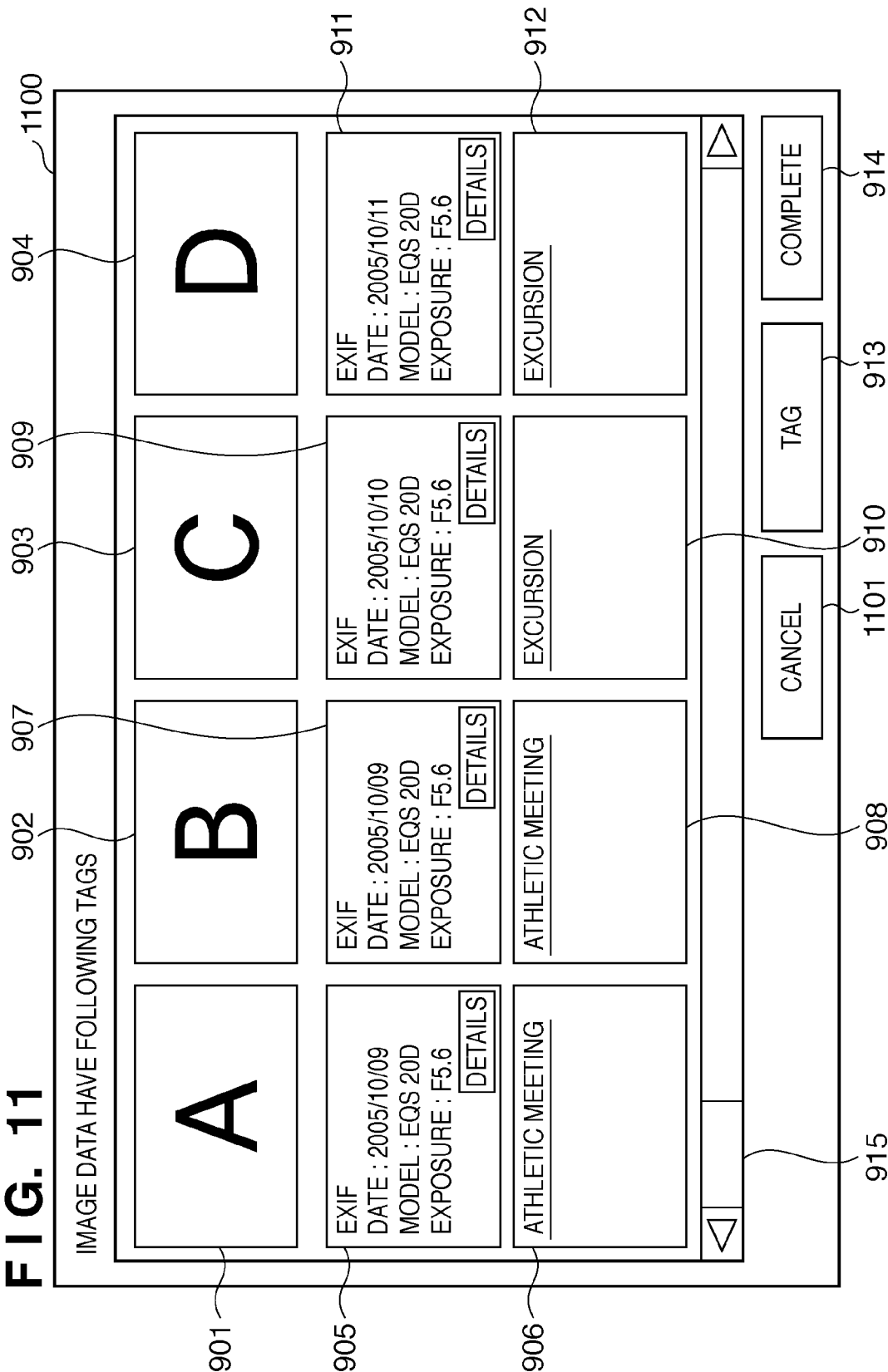
FIG. 11 is a view showing an example of an operation window after addition of tags according to the second embodiment of the present invention.

An operation window 1100 in FIG. 11 fundamentally has the same arrangement as the operation window 400 in FIG. 4 except the contents of displayed metadata.

Processing of automatically adding tags according to this embodiment will be described next with reference to FIG. 12. FIG. 12 is a view showing the relationship between the photos and the metadata.

In this embodiment, image data as an automatic metadata addition target is selected based on the date data of the Exif data of image data to which new metadata is added. As shown in FIG. 12, the date of the photo B which is image data with the tag "athletic meeting" is "2005/10/09". The date of the photo C which is image data with the tag "excursion" is "2005/10/10".

In this embodiment, new metadata is automatically added to image data having common metadata except date data which is equal to or earlier than that of image data with earlier date data out of image data added with the new metadata. New metadata is also automatically added to image data having common metadata except date data which is equal to or later than that of image data with later date data out of image data added with the new metadata.

Referring to FIG. 12, the date data of the photo B is earlier than that of the photo C. For this reason, the tag "athletic meeting" added to the photo B is added to the photo A which has metadata common to the photo B and date data equal to that of the photo B. The tag "excursion" added to the photo C is added to the photo D which has metadata common to the photo C and date data later than that of the photo C.

The automatic metadata addition is also applied to any photos as image data other than the photos A to D. More specifically, the metadata "athletic meeting" is added to any image data having metadata "model EOS 20D" and "exposure F5.6" common to the photo B and date data equal to or earlier than "2005/10/09". The metadata "excursion" is added to any image data having metadata "model EOS 20D" and "exposure F5.6" common to the photo C and date data equal to or later than "2005/10/10".

FIG. 12 shows only two Exif data except the date data. However, any other Exif data may be included.

Figure 13:
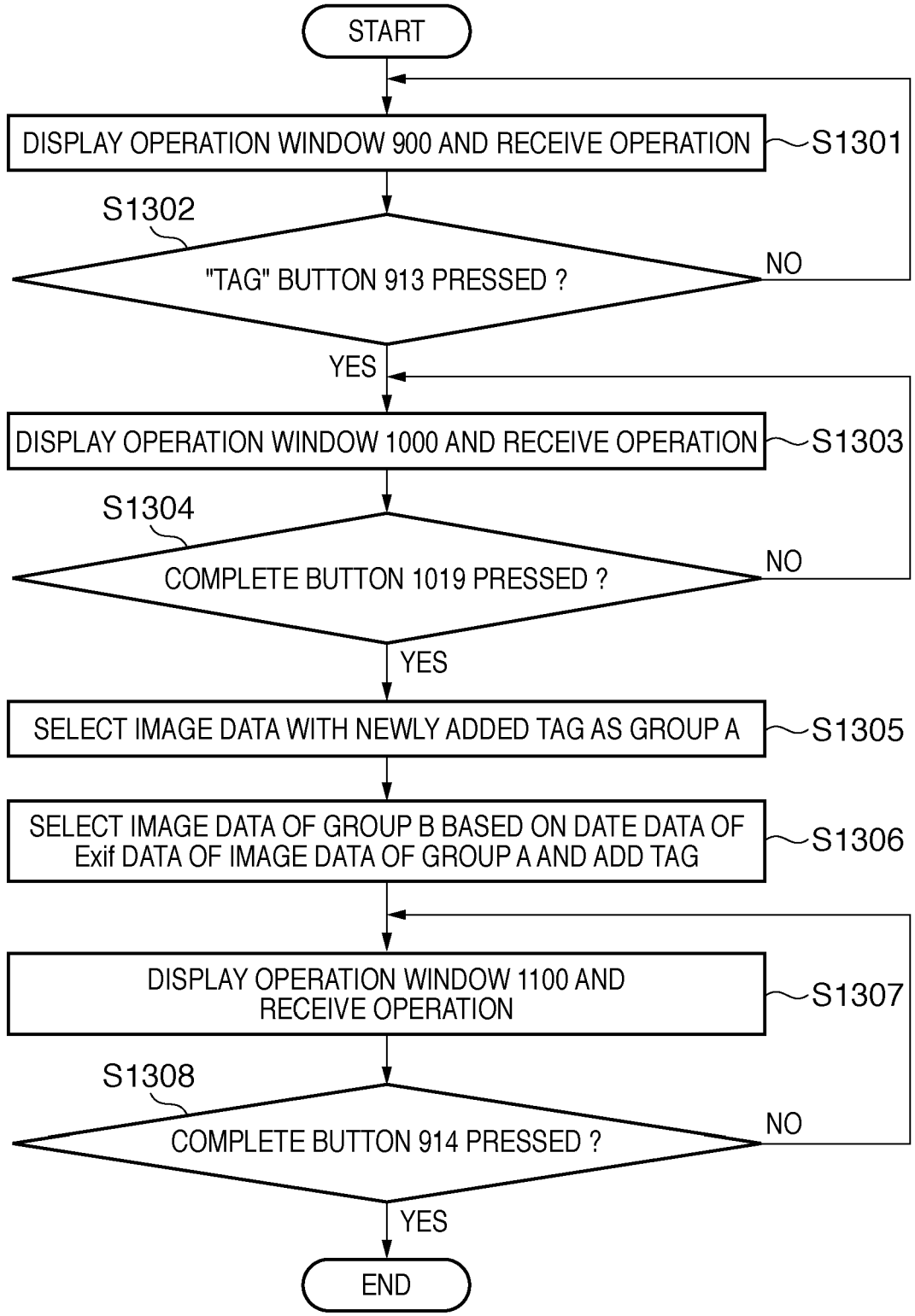
FIG. 13 is a flowchart illustrating an example of processing according to the second embodiment of the present invention.

The sequence of processing according to this embodiment will be described next with reference to the flowchart in FIG. 13. This processing is implemented by reading out a corresponding processing program from a hard disk 104 to the RAM 105 and causing a CPU 102 to execute it.

First, in step S1301, image data and corresponding metadata are read out from the hard disk 104 to the RAM 105. The operation window 900 shown in FIG. 9 is displayed on the output unit 103 to receive user operations. The receivable operations include the operations of the details buttons, the "tag" button 913, a complete button 914, and a scroll bar 915. In step S1302, it is determined whether the "tag" button 913 is operated. If the "tag" button 913 is operated ("YES" in step S1302), the process advances to step S1303. In step S1303, the operation window 1000 shown in FIG. 10 is displayed on the output unit 103 to receive operations. The receivable operations include designation of image data as a tag addition target, designation of a tag to be added, the operation of a scroll bar 309, the operation of adding/deleting a tag to/from the tag candidate list, and the operations of a cancel button 1018, the complete button 1019, and the "next" button 1020. On the other hand, if the "tag" button 913 is not operated ("NO" in step S1302), the process returns to step S1301.

In step S1304, it is determined the received operations include the operation of the complete button 1019. If the complete button 1019 is operated ("YES" in step S1304), the process advances to step S1305. If the operation of the complete button 1019 is not received ("NO" in step S1304), the process returns to step S1303 to further receive operations.

In step S1305, image data added with a new tag are selected as a group A based on the operations received in step S1304. In step S1306, image data of a group B are selected based on the metadata of the image data of the group A. The processing of selecting the image data of the group B and automatically adding a tag will be described later in detail with reference to FIG. 14.

In step S1307, the operation window 1100 shown in FIG. 11 is displayed on the output unit 103 to receive operations. The receivable operations include the operations of the details buttons, the "tag" button 913, the complete button 914, the scroll bar 915, and a cancel button 1101. The operation window 1100 enables the user to confirm the contents of the tag newly added as metadata. In step S1308, it is determined whether the complete button 914 on the operation window 1100 is operated. If the complete button 914 is operated ("YES" in step S1308), the contents of metadata of each image data stored in the hard disk 104 are updated based on the processing result, and the processing ends. On the other hand, if the complete button 914 is not operated ("NO" in step S1308), the process returns to step S1307 to continue the processing. If the operation of the "tag" button 913 is received again, the process may return to step S1303 to execute the processing.

Figure 14:
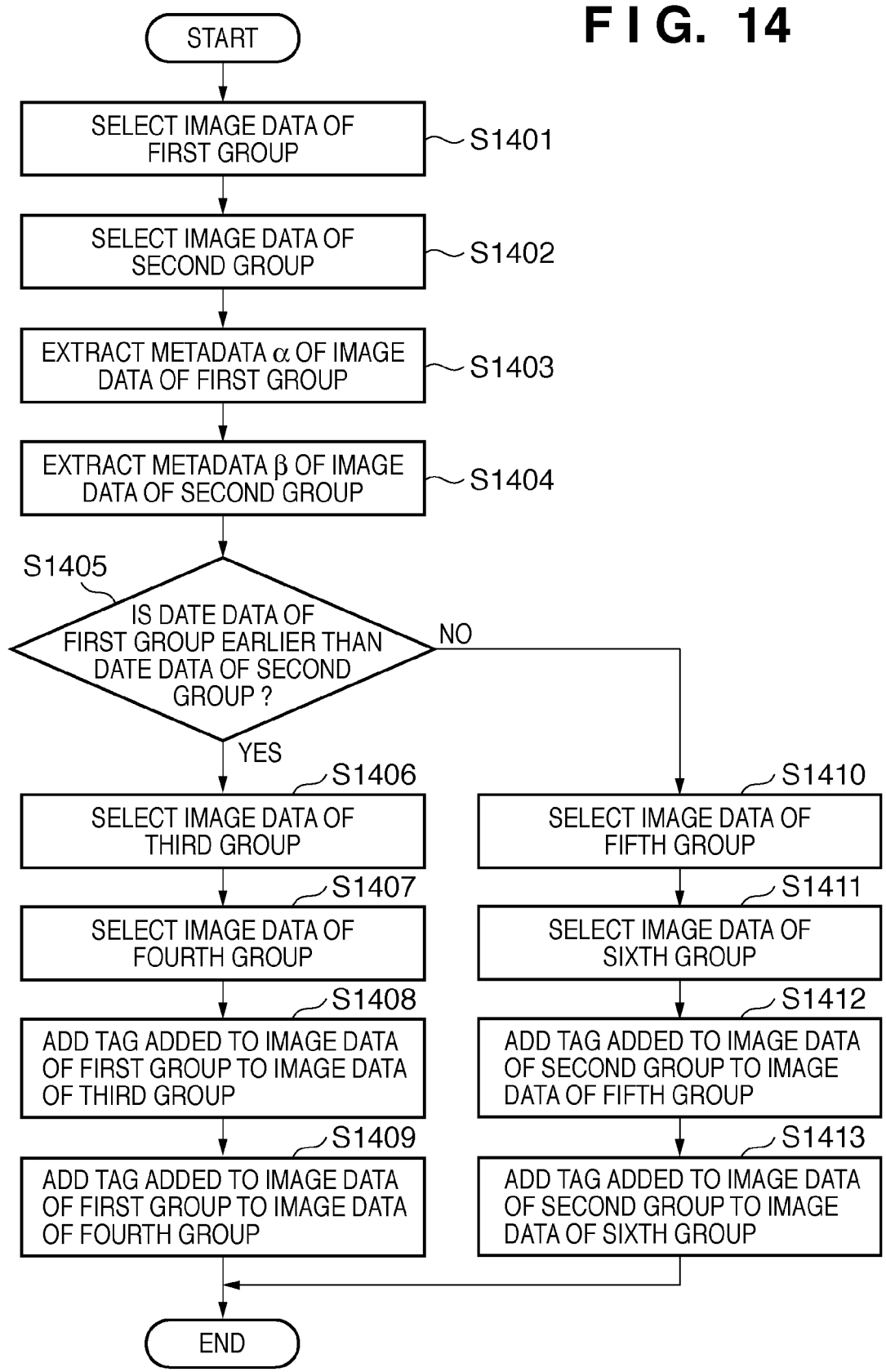
FIG. 14 is a flowchart illustrating an example of image data selection and automatic tag addition processing according to the second embodiment of the present invention.

Details of the processing in step S1306 of FIG. 13 will be described next with reference to FIG. 14. FIG. 14 will be described assuming that the tag "athletic meeting" and the tag "excursion" are added, as shown in FIG. 12, to help understanding.

In step S1401, out of the image data read out to the RAM 105, a plurality of image data added with the tag "athletic meeting" by the user are selected as a "first group". In step S1402, out of the image data read out to the RAM 105, a plurality of image data added with another tag "excursion" by the user are selected as a "second group". In step S1403, metadata (to be referred to as "metadata α" hereinafter) common to the image data of the first group are extracted. The metadata α include date data. In step S1404, metadata (to be referred to as "metadata β" hereinafter) common to the image data of the second group are extracted. The metadata β include date data. In step S1405, the date data of the first group is compared with the date data of the second group. It is determined based on the comparison result whether the date data of the first group is earlier than that of the second group.

If it is determined by comparison that the group having an earlier date is the first group, that is, the date data of the first group indicates an earlier date ("YES" in step S1405), the process advances to step S1406. If it is determined by comparison that the group having an earlier date is the second group, that is, the date data of the second group indicates an earlier date ("NO" in step S1405), the process advances to step S1410.

In step S1406, image data which are included neither in the first group nor in the second group and have date data earlier than that of the first group and, of the metadata α, all metadata except the date data are selected as the "third group". That is, the image data of the third group have the same metadata as the metadata α except that the date data is earlier than that of the first group.

In step S1407, image data which are included neither in the first group nor in the second group and have date data later than that of the second group and, of the metadata β, all metadata except the date data are selected as the "fourth group". That is, the image data of the fourth group have the same metadata as the metadata β except that the date data is later than that of the second group.

In step S1408, a tag that is metadata added to the image data of the first group is added to the image data of the third group selected in step S1406. In step S1409, a tag that is metadata added to the image data of the second group is added to the image data of the fourth group selected in step S1407. Then, the process returns to step S1307.

In step S1410, image data which are included neither in the first group nor in the second group and have date data later than that of the first group and, of the metadata α, all metadata except the date data are selected as the "fifth group" . That is, the image data of the fifth group have the same metadata as the metadata α except that the date data is later than that of the first group.

In step S1411, image data which are included neither in the first group nor in the second group and have date data earlier than that of the second group and, of the metadata β, all metadata except the date data are selected as the "sixth group". That is, the image data of the sixth group have the same metadata as the metadata β except that the date data is earlier than that of the second group.

In step S1412, a tag that is metadata added to the image data of the first group is added to the image data of the fifth group selected in step S1410. In step S1413, a tag that is metadata added to the image data of the second group is added to the image data of the sixth group selected in step S1411. Then, the process returns to step S1307.

As described above, designating at least two image data and metadata to be added to them makes it possible to automatically add the metadata to image data having an earlier date and image data having a later date based on the two image data. Since it is unnecessary to designate each image data to which metadata should be added, the burden on the user can be reduced, and the metadata addition processing can be executed efficiently.

Third Embodiment

The third embodiment of the present invention will be described next in detail. An information processing apparatus according to the third embodiment also has the same hardware configuration as the information processing apparatus 100 shown in FIG. 1.

Figure 15:
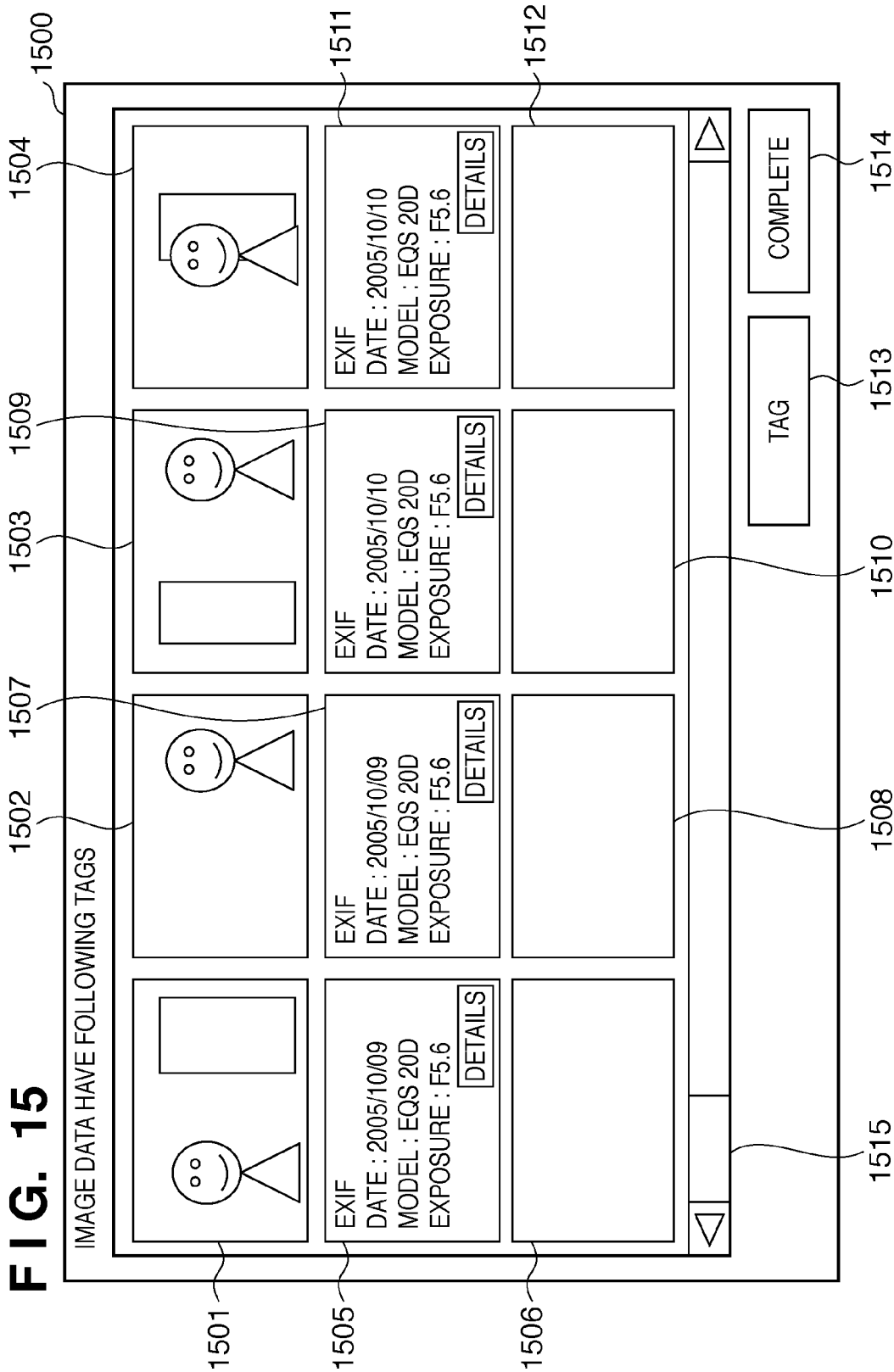
FIG. 15 is a view showing an example of an operation window according to the third embodiment of the present invention.

FIG. 15 is a view showing an example of an operation window according to this embodiment. An operation window 1500 fundamentally has the same arrangement as the operation window 200 in FIG. 2. Reference numerals in the fifteen-hundreds in FIG. 15 correspond to those in the two-hundreds in FIG. 2. Hence, a description of common contents will not be repeated. In FIG. 15, the image data of photos 1501 to 1504 are added with only Exif data serving as metadata but no tags yet. The Exif data are different from those in FIG. 2.

The photos 1501 to 1504 contain specific objects, unlike FIG. 2. More specifically, the photos 1501, 1503, and 1504 contain a "person" and a "building" as objects. The photo 1502 contains only the "person" as an object.

Figure 16:
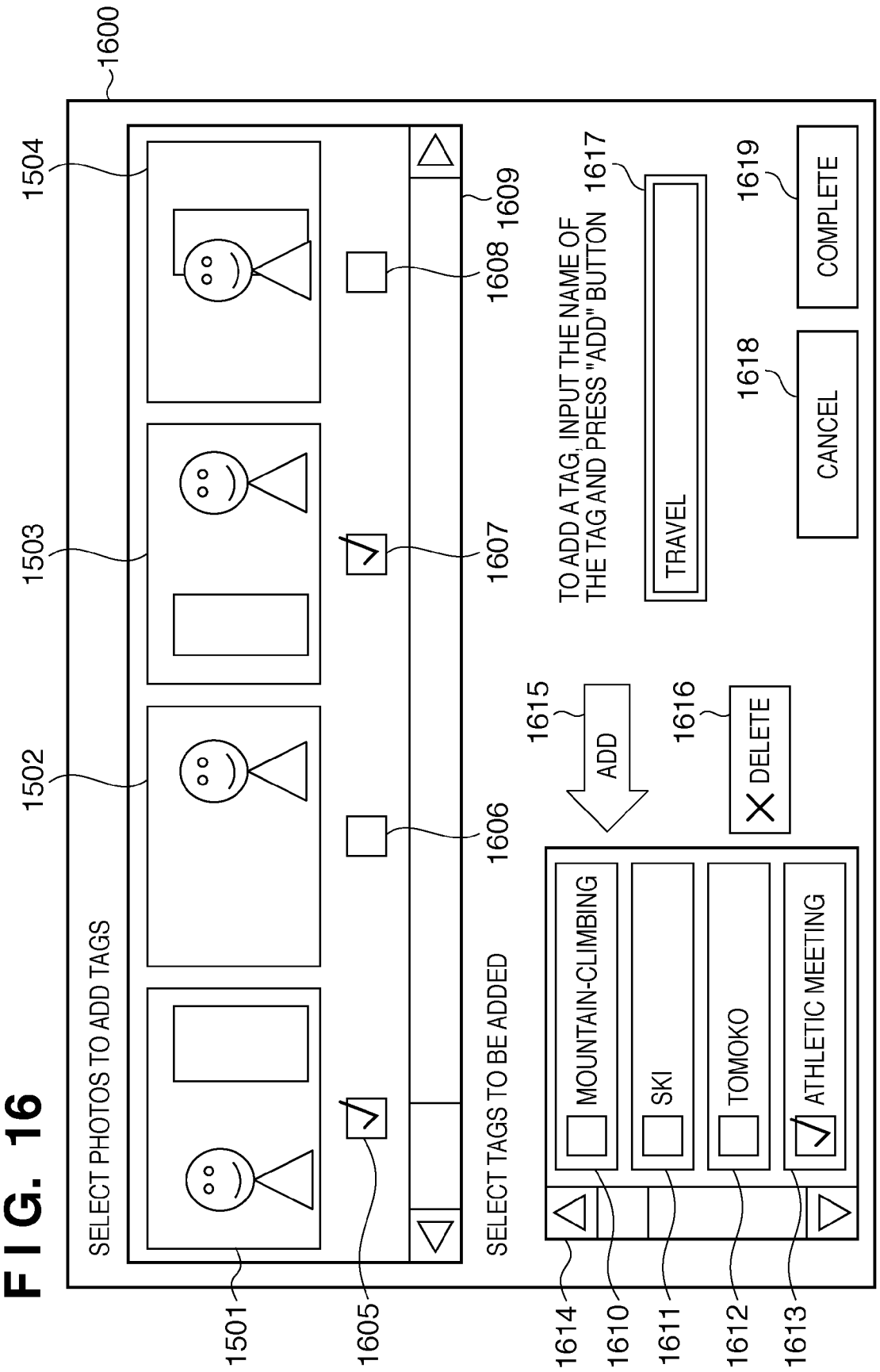
FIG. 16 is a view showing an example of an operation window for designating image data and tags according to the third embodiment of the present invention.

When the user operates a "tag" button 1513 on the operation window 1500 in FIG. 15, an operation window shown in FIG. 16 is displayed on an output unit 103. An operation window 1600 in FIG. 16 fundamentally has the same arrangement as the operation window 300 in FIG. 3, and a detailed description thereof will not be repeated. In the window shown in FIG. 16, the photos 1501 and 1503 are designated as image data, for which a tag "athletic meeting" is designated. When the user operates a complete button 1619 in this state, an operation window shown in FIG. 17 is displayed.

Figure 17:
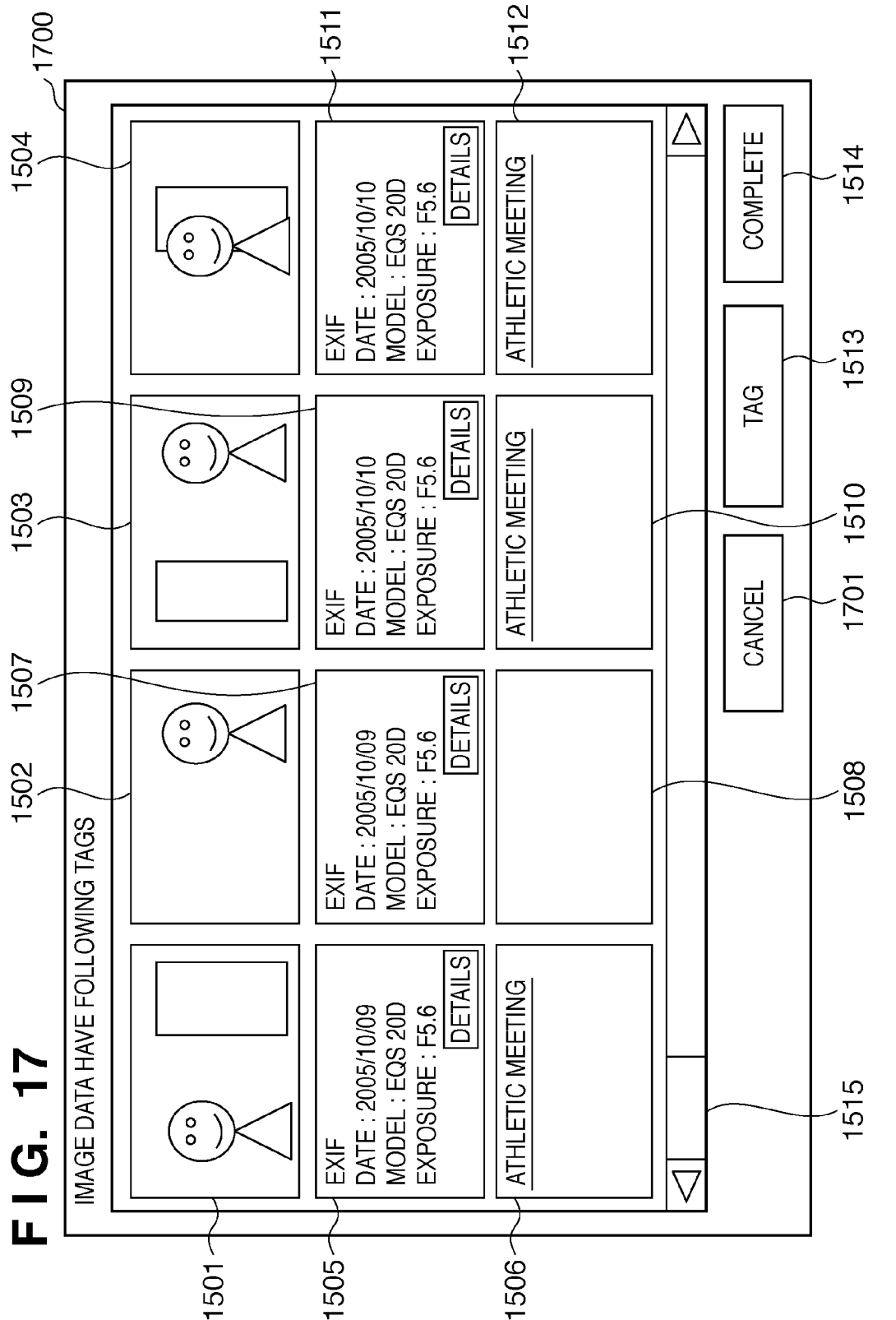
FIG. 17 is a view showing an example of an operation window after addition of tags according to the third embodiment of the present invention.

An operation window 1700 in FIG. 17 fundamentally has the same arrangement as the operation window 400 in FIG. 4 except the contents of displayed metadata.

Figures 18, 19:
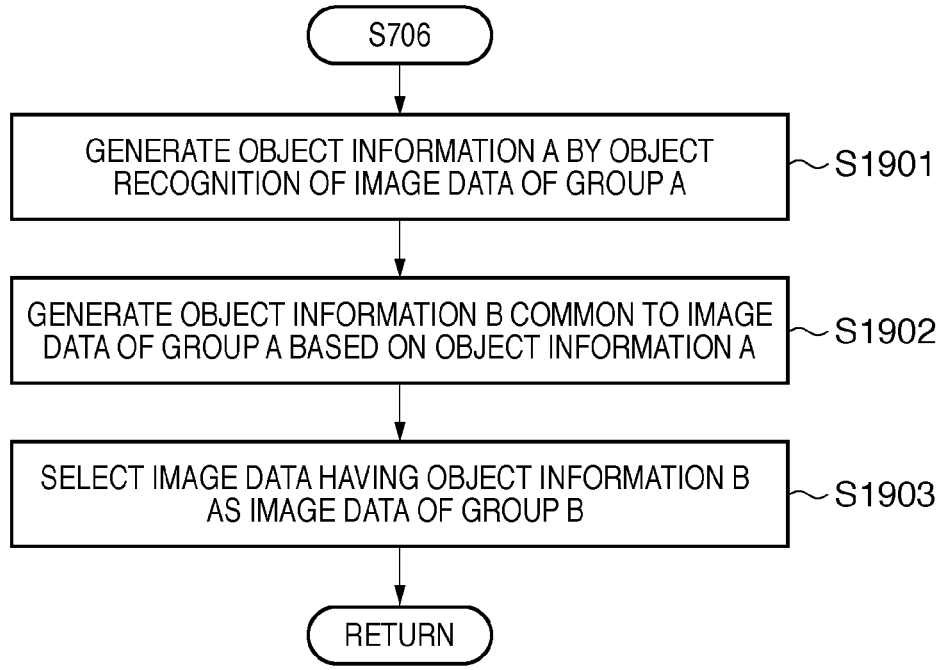
FIG. 18 is a view showing an example of association between image data and added metadata according to the third embodiment of the present invention.
FIG. 19 is a flowchart illustrating an example of image data selection processing according to the third embodiment of the present invention.

Processing of automatically adding tags according to this embodiment will be described next with reference to FIG. 18. FIG. 18 is a view showing the relationship between the photos and the metadata.

In this embodiment, object information common to designated image data is handled as metadata, and image data including all the same object information are selected. As shown in FIG. 18, the photos 1501 and 1503 which are image data added with the tag "athletic meeting" contain the object information of "person" and "building". Image data containing all the pieces of object information of "person" and "building" are searched for. The photo 1504 contains both pieces of object information. Hence, the photo 1504 is automatically added with the tag "athletic meeting".

The automatic metadata addition is also applied to any photos as image data other than the photos 1501 to 1504. More specifically, the tag "athletic meeting" is added, as additional metadata, to any image data having the pieces of object information of "person" and "building" of the photos 1501 and 1503. On the other hand, the photo 1502 which has only the object information of "person" is not automatically added with the tag "athletic meeting".

In FIG. 18, the types of objects are specified as "person" and "building". This aims only at facilitating the explanation. In this embodiment, the types need not always be specified if the feature amount of each object can be extracted.

Figure 7:
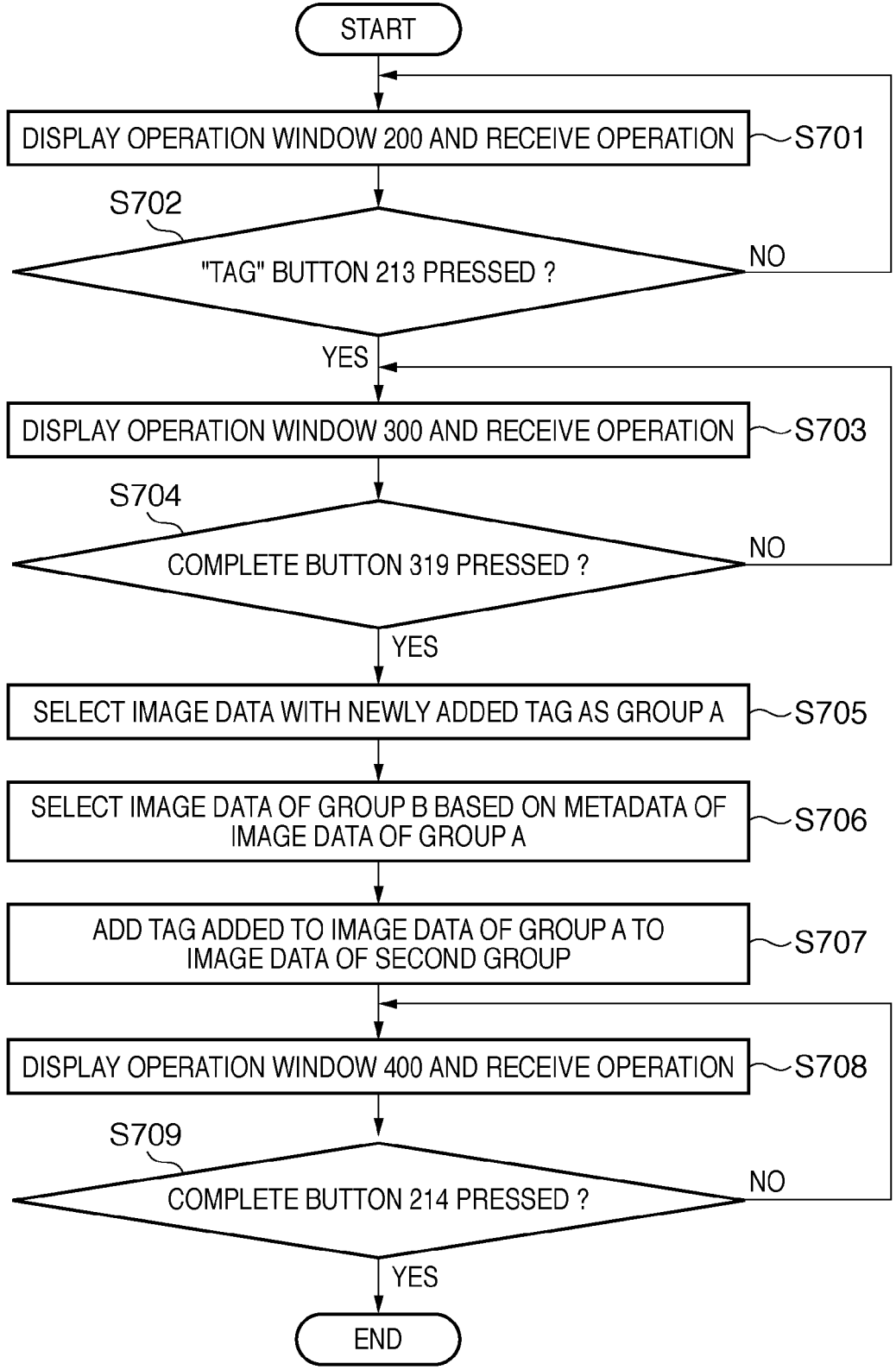
FIG. 7 is a flowchart illustrating an example of processing according to the first embodiment of the present invention.
Figure 8:
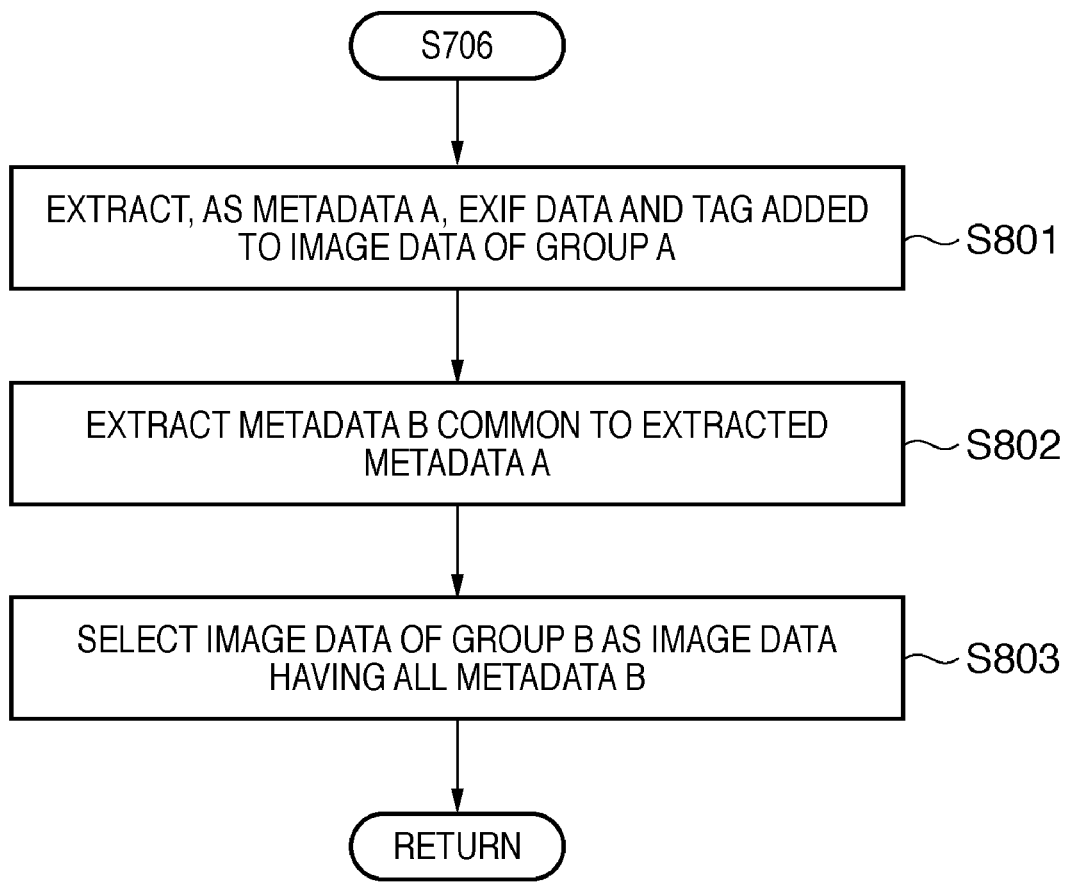
FIG. 8 is a flowchart illustrating an example of image data selection processing according to the first embodiment of the present invention.

The sequence of processing according to this embodiment can comply with the flowchart in FIG. 7. The processing in step S706 is unique to this embodiment and is performed as shown in FIG. 19.

Details of the processing in step S706 according to this embodiment will be described with reference to FIG. 19. This processing is implemented by reading out a corresponding processing program from a hard disk 104 to a RAM 105 and causing a CPU 102 to execute it. In this processing, the CPU 102 also functions as an object recognition means.

In step S1901, objects in image data included in a group A out of image data read out to the RAM 105 are recognized to generate object information A. This object recognition can be done by matching processing with the templates of a person, building, and the like which are prepared in advance. At this time, the user may designate a region where an object exists in image data. The object recognition processing is a known technique, and a detailed description thereof will be omitted.

In step S1902, object information B common to the image data of the group A is generated. In step S1903, object recognition in the remaining image data is executed, and image data having the object information B are selected as the image data of a group B.

In FIG. 19, the object information B is generated based on the object information A. However, the method of generating object information common to the image data of the group A is not limited to this. For example, block matching may be performed between the image data of the group A to extract information common to the image data as the object information B.

In selecting the image data of the group B, object recognition may be performed for only image data having common Exif data or metadata as tags because object recognition processing of all image data increases the process load. Alternatively, the recognition processing may be performed for image data having date data close to that of the image data of the group A.

As described above, it is possible to automatically add metadata to image data based on object information contained in designated image data. This greatly saves the user time in adding metadata to each of a number of image data.

Fourth Embodiment

The fourth embodiment of the present invention will be described next in detail. An information processing apparatus according to the fourth embodiment also has the same hardware configuration as the information processing apparatus 100 shown in FIG. 1.

Figure 20:
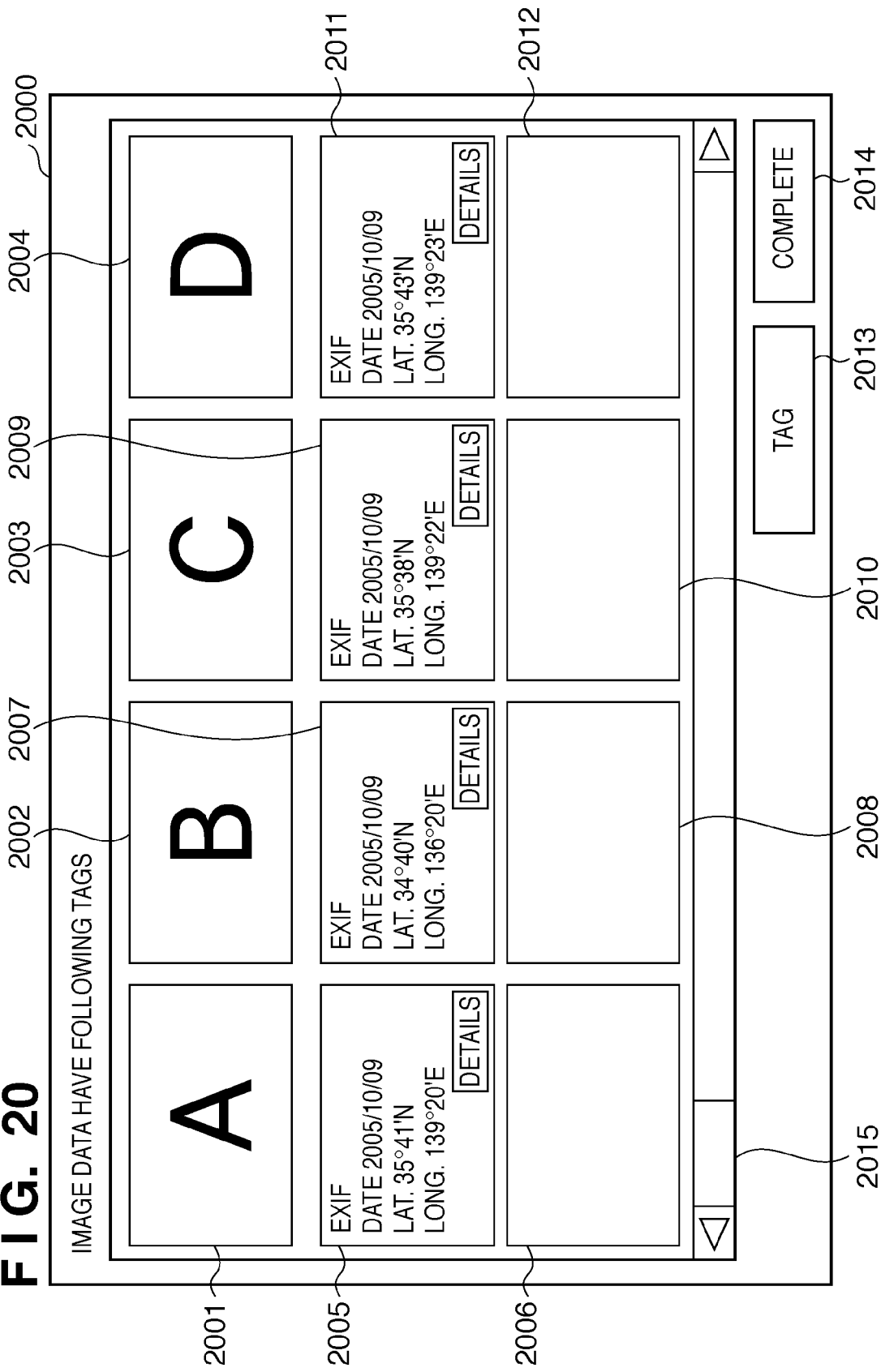
FIG. 20 is a view showing an example of an operation window according to the fourth embodiment of the present invention.

FIG. 20 is a view showing an example of an operation window according to this embodiment. An operation window 2000 fundamentally has the same arrangement as the operation window 200 in FIG. 2. Reference numerals in the twenty-hundreds in FIG. 20 correspond to those in the two-hundreds in FIG. 2. Hence, a description of common contents will not be repeated. In FIG. 20, the image data of photos A to D are added with only Exif data serving as metadata but no tags yet.

The Exif data are different from those in FIG. 2. More specifically, in FIG. 20, the Exif data serving as metadata includes the information (position data) of a shooting location where the photo as image data has been sensed. Exif data as the metadata of the photo A includes date data "2005/10/09" and position data "lat. 35°41'N. and long. 139°20'E." Exif data as the metadata of the photo B includes date data "2005/10/09" and position data "lat. 34°40'N. and long. 136°20'E". Exif data as the metadata of the photo C includes date data "2005/10/09" and position data "lat. 35°38'N. and long. 139°22'E". Exif data as the metadata of the photo D includes date data "2005/10/09" and position data "lat. 35°43'N. and long. 139°23'E". That is, the photos A, C, and D have been sensed in the Kanto area, whereas the photo B has been sensed in the Kansai area.

Figure 21:
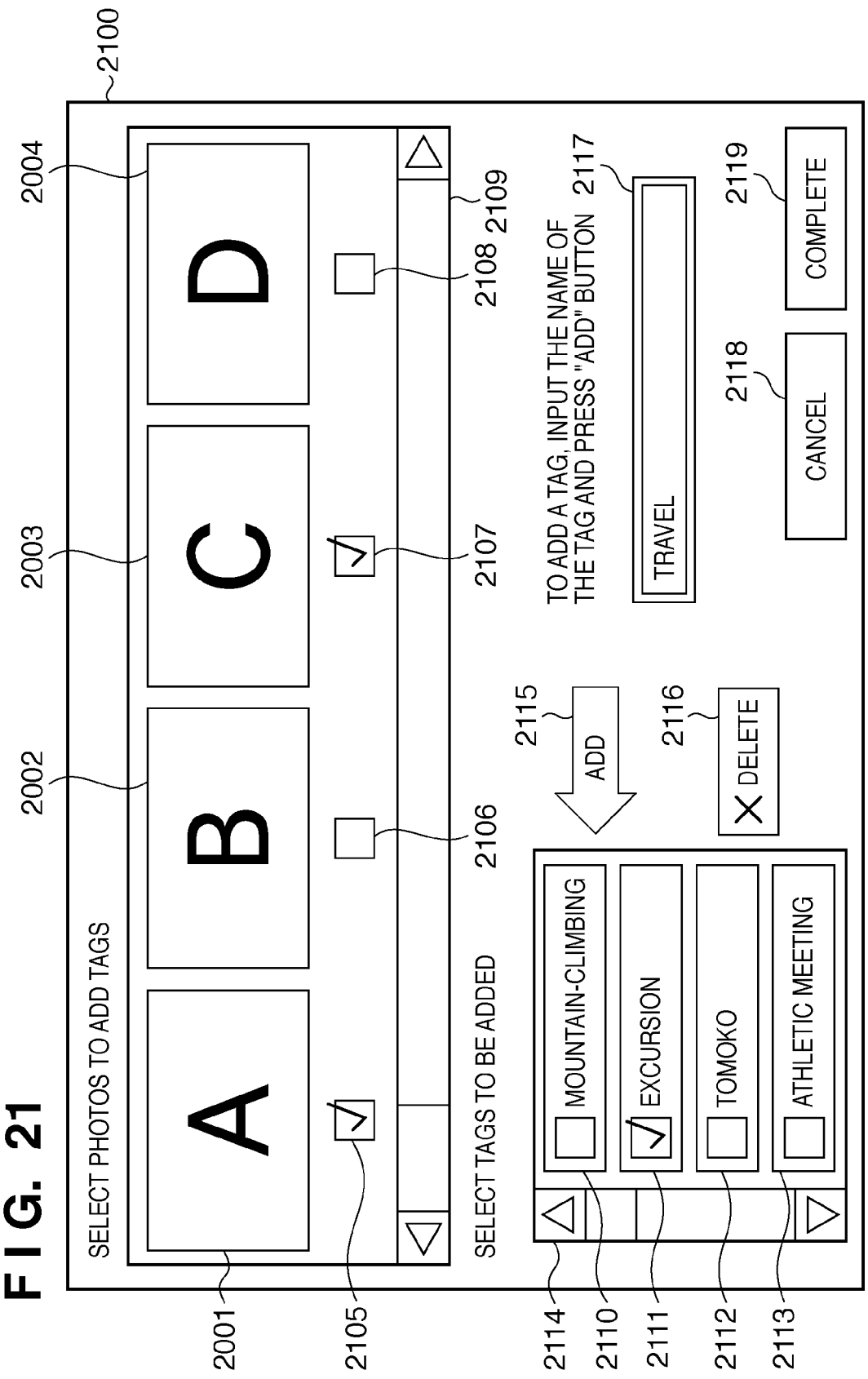
FIG. 21 is a view showing an example of an operation window for designating image data and tags according to the fourth embodiment of the present invention.

When the user operates a "tag" button 2013 on the operation window 2000 in FIG. 20, an operation window shown in FIG. 21 is displayed on an output unit 103. An operation window 2100 in FIG. 21 fundamentally has the same arrangement as the operation window 300 in FIG. 3, and a detailed description thereof will not be repeated. In the window shown in FIG. 21, the photos A and C are designated as image data, for which a tag "excursion" is designated. When the user operates a complete button 2119 in this state, an operation window shown in FIG. 22 is displayed.

Figure 22:
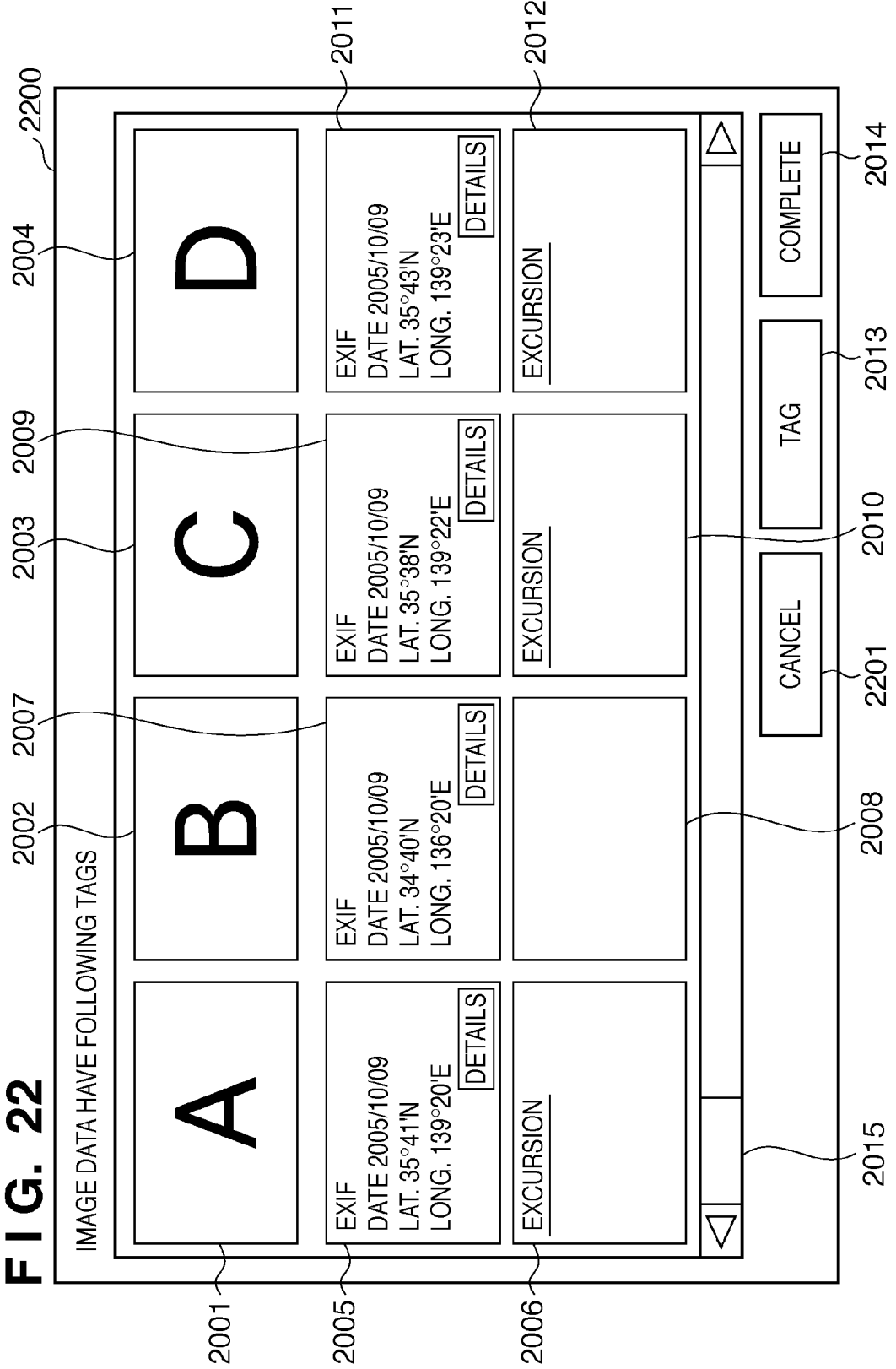
FIG. 22 is a view showing an example of an operation window after addition of tags according to the fourth embodiment of the present invention.

An operation window 2200 in FIG. 22 fundamentally has the same arrangement as the operation window 400 in FIG. 4 except the contents of displayed metadata.

Figures 23, 24:
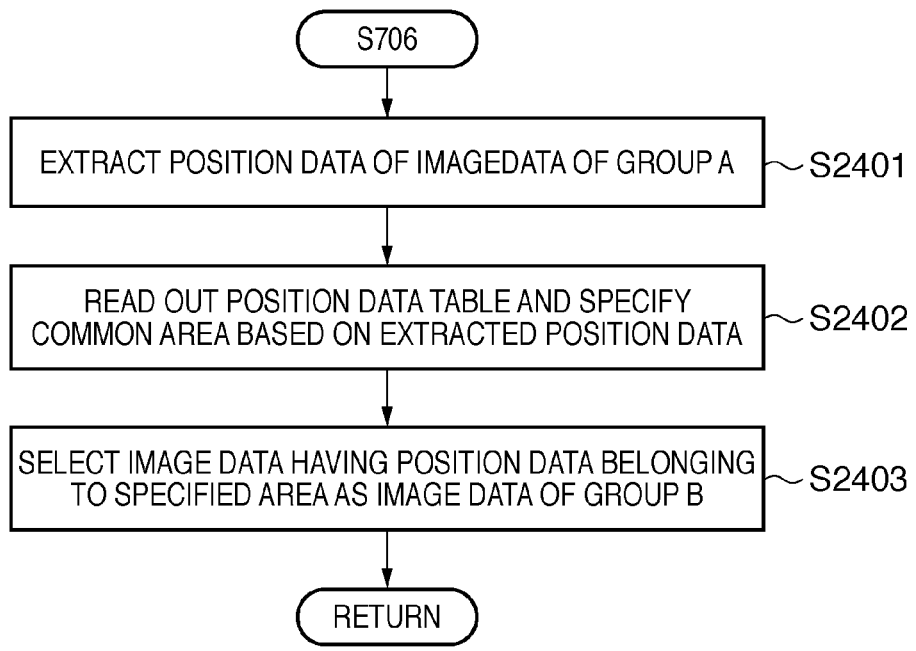
FIG. 23 is a view showing an example of association between image data and added metadata according to the fourth embodiment of the present invention.
FIG. 24 is a flowchart illustrating an example of image data selection processing according to the fourth embodiment of the present invention.

Processing of automatically adding tags according to this embodiment will be described next with reference to FIG. 23. FIG. 23 is a view showing the relationship between the photos and the metadata.

In this embodiment, all image data generated in the same area are selected based on the position data of designated image data. Not only the position data but also date data may be referred to select image data depending on whether they are generated on the same day.

Referring to FIG. 23, the photos A, C, and D have been sensed in the Kanto area, whereas the photo B has been sensed in the Kansai area. For this reason, the photo D is selected as image data to which the tag "excursion" added to the photos A and C should automatically be added. On the other hand, no tag is automatically added to the photo B. The automatic metadata addition is also applied to any photos as image data other than the photos A to D. More specifically, the tag "excursion" is added, as additional metadata, to any image data having position data belonging to the Kanto area.

In FIG. 23, an area is determined based on position data, and image data as an automatic tag addition target is selected. However, image data having position data that falls within the range of ±N (N is, e.g., 2) from the position data of designated image data may be selected. In this case, the photo A has position data "lat. 35°41'N. and long. 139°20'E.", and the photo C has position data "lat. 35°38'N. and long. 139°22'E". Hence, image data whose position data falls within the range of lat. 35°36N. to 35°43'N. and long. 139°18'E. to 139°24'E. may be selected.

The sequence of processing according to this embodiment can comply with the flowchart in FIG. 7. The processing in step S706 is unique to this embodiment and is performed as shown in FIG. 24.

Referring to FIG. 24, in step S2401, position data is extracted from the Exif data as metadata added to the image data of a group A. In step S2402, to specify a shooting location based on the position data, a position data table is read out to a RAM 105. A shooting location (common area) common to the image data of the group A is specified using the position data table. In step S2403, image data having position data belonging to the specified common area are selected from the image data read out to the RAM 105 as the image data of a group B. Then, the process advances to step S707.

As described above, it is possible to automatically add metadata to image data based on the information of the shooting location of designated image data. This greatly saves the user time in adding metadata to each of a number of image data.

Fifth Embodiment

The fifth embodiment of the present invention will be described next in detail. An information processing apparatus according to the fifth embodiment also has the same hardware configuration as the information processing apparatus 100 shown in FIG. 1.

In this embodiment, modifications of FIGS. 3, 10, and 16 in the above-described first to third embodiments will be described.

Figure 25:
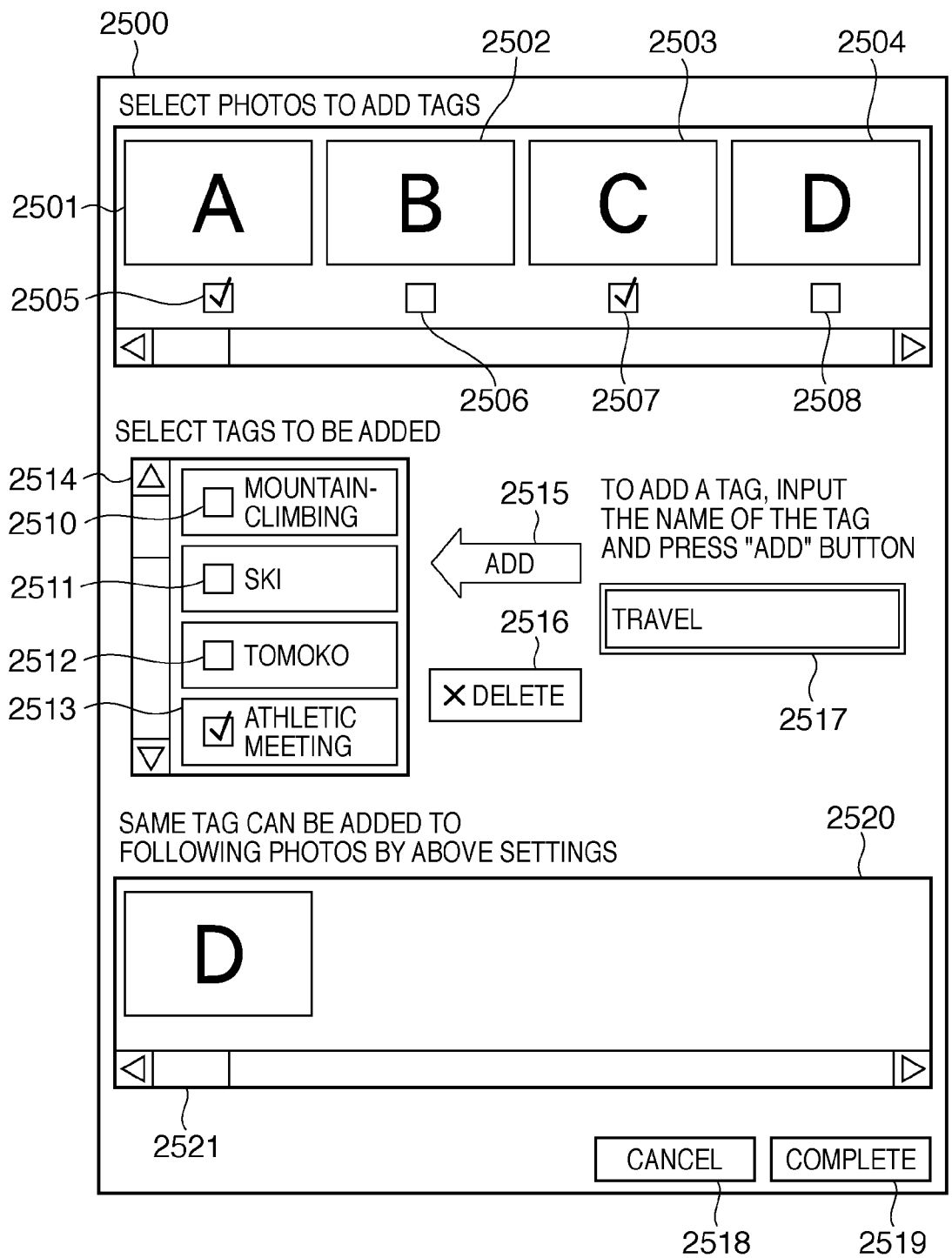
FIG. 25 is a view showing an example of an operation window for designating image data and tags according to the fifth embodiment of the present invention.

FIG. 25 is a view showing an example of an operation window according to this embodiment. An operation window 2500 has an arrangement common to those in FIGS. 3, 10, and 16 except a slide bar 2521 and a display region 2520 where image data as an automatic tag addition target is displayed.

In this embodiment, processing in one of FIGS. 8, 14, and 19 is executed based on image data having a check in check boxes 2505 to 2508 on the operation window 2500, thereby selecting image data to which a tag is to automatically be added. The selected image data are displayed in the display region 2520 so that the user can confirm in advance which data is to be added with a tag.

If image data the user finds inappropriate is displayed in the display region 2520, image data as a tag addition target can be designated again manually. Alternatively, as shown in FIG. 26, an image as an automatic tag addition target may be selected or deleted in the display region 2520 using check boxes 2601 or 2602.

Figure 26:
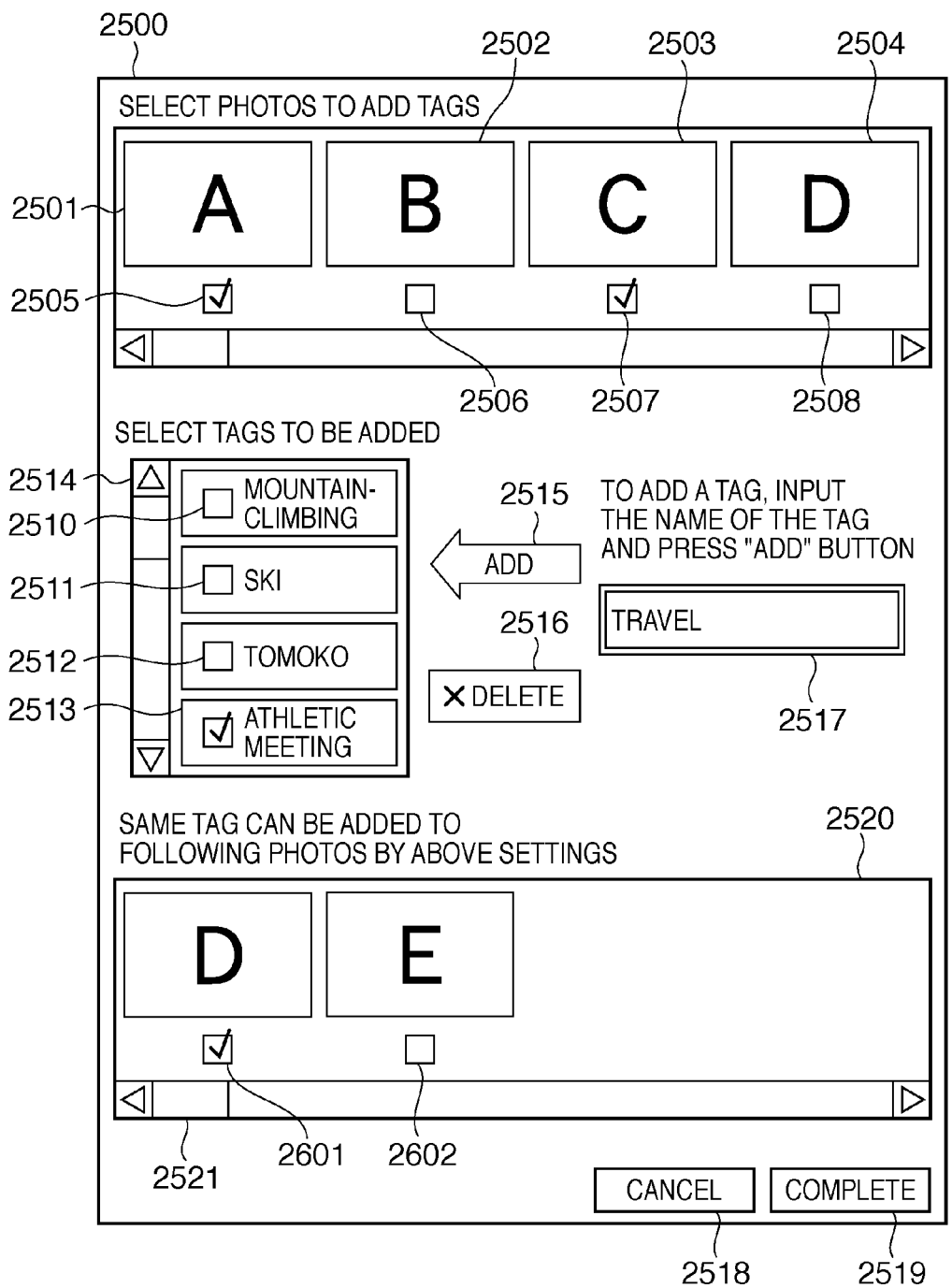
FIG. 26 is a view showing another example of the operation window for designating image data and tags according to the fifth embodiment of the present invention.

In FIG. 26, it is possible to cancel selection and inhibit automatic tag addition by canceling the check mark in the check box of a photo determined to be inappropriate in the photos automatically selected and displayed in the display region 2520. In the example shown in FIG. 26, a tag is automatically added to a photo D but not to a photo E. In FIG. 26, image data to inhibit tag addition may be checked.

Tag addition can also be stopped by operating a cancel button 2518.

As described above, in this embodiment, it is possible to control to automatically add metadata to only appropriate image data by confirming the images as the automatic tag addition target.

Sixth Embodiment

Figure 27:
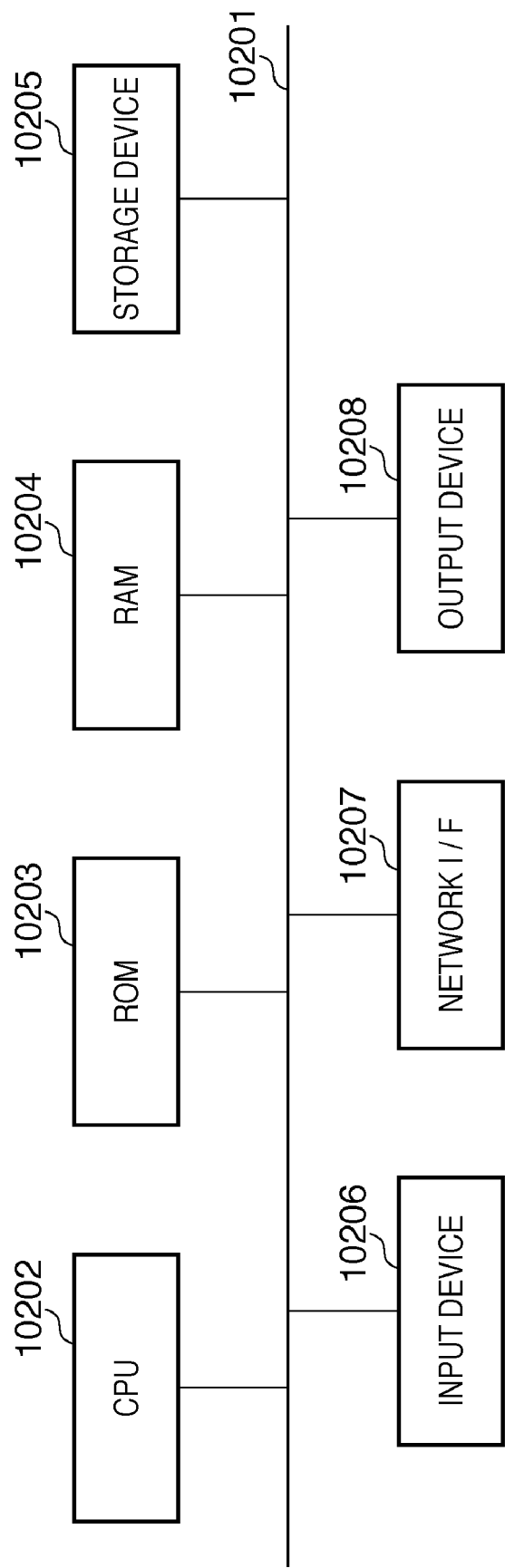
FIG. 27 is a block diagram showing an example of the hardware configuration of a data management apparatus which is an example of an information processing apparatus according to the sixth to ninth embodiments of the present invention.

FIG. 27 is a block diagram showing an example of the hardware configuration of a data management apparatus which is an example of an information processing apparatus (computer).

A CPU 10202 performs arithmetic operations and logical determination for various kinds of processing and controls constituent elements connected to a bus 10201. The data management apparatus has a memory including a program memory and a data memory. The program memory stores programs. The CPU 10202 executes the programs to implement some of the functions of the data management apparatus to be described later or processing according to flowcharts to be described later. The memory can be either a ROM 10203 or a RAM 10204 to which programs are loaded from, for example, an external storage device.

A storage device 10205 is a nonvolatile memory or a hard disk for storing data and programs. An input device 10206 is a device for inputting information from a user and includes, for example, a mouse, touch panel, and keyboard. An output device 10208 is a device for outputting, for example, analyzed data output information and includes, for example, a CRT or liquid crystal display. A network I/F 10207 exchanges data with another storage medium or device connected via a network.

Figure 28:
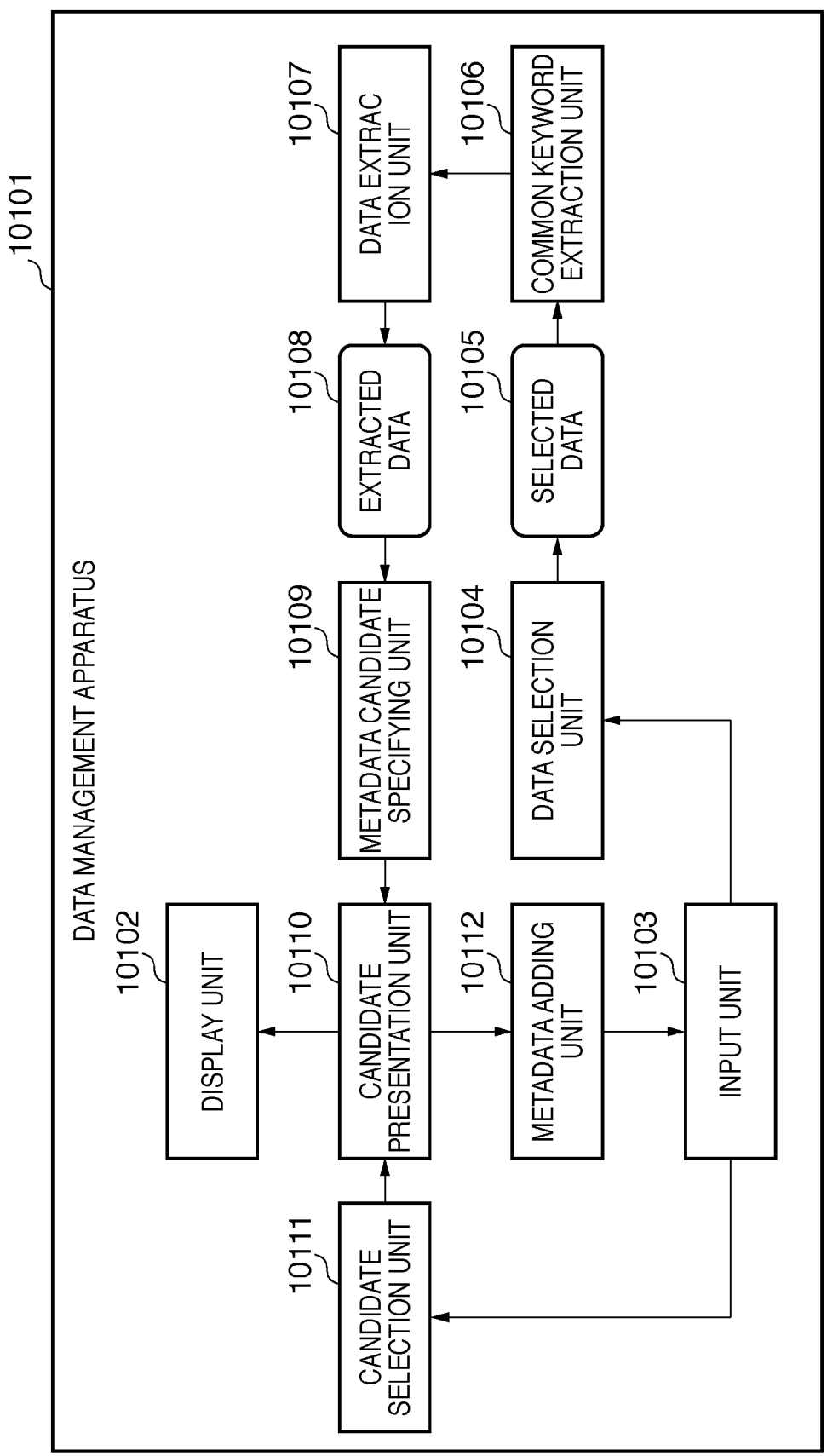
FIG. 28 is a block diagram showing an example of the functional components of the data management apparatus according to the sixth to ninth embodiments of the present invention.

FIG. 28 is a block diagram showing an example of the functional components of the data management apparatus.

A data management apparatus 10101 as an example of an information processing apparatus includes, as functional components, a display unit 10102, input unit 10103, data selection unit 10104, common keyword extraction unit 10106, data extraction unit 10107, metadata candidate specifying unit 10109, candidate presentation unit 10110, candidate selection unit 10111, and metadata adding unit 10112.

The display unit 10102 displays a UI window. The data selection unit 10104 selects data displayed on the UI window based on a user instruction operation input via the input unit 10103.

The common keyword extraction unit 10106 extracts a common keyword of data 10105 selected by the user.

The data extraction unit 10107 extracts data (associated data) using, as a key, the common keyword extracted by the common keyword extraction unit 10106. The metadata candidate specifying unit 10109 specifies the candidates of metadata (metadata candidates) to be presented to the user from the metadata of extracted data 10108. The candidate presentation unit 10110 presents, via the UI window, the metadata candidates specified by the metadata candidate specifying unit 10109.

The candidate selection unit 10111 selects, from the metadata candidates presented by the candidate presentation unit 10110, a metadata candidate based on a user instruction operation input via the input unit (metadata selection). The metadata adding unit 10112 adds the metadata selected by the candidate selection unit 10111 to the selected data 10105 selected by the user.

In this embodiment, when the user selects a plurality of contents for the purpose of adding metadata, candidates of metadata to be added are presented and actually added to the selected contents.

Figure 29:
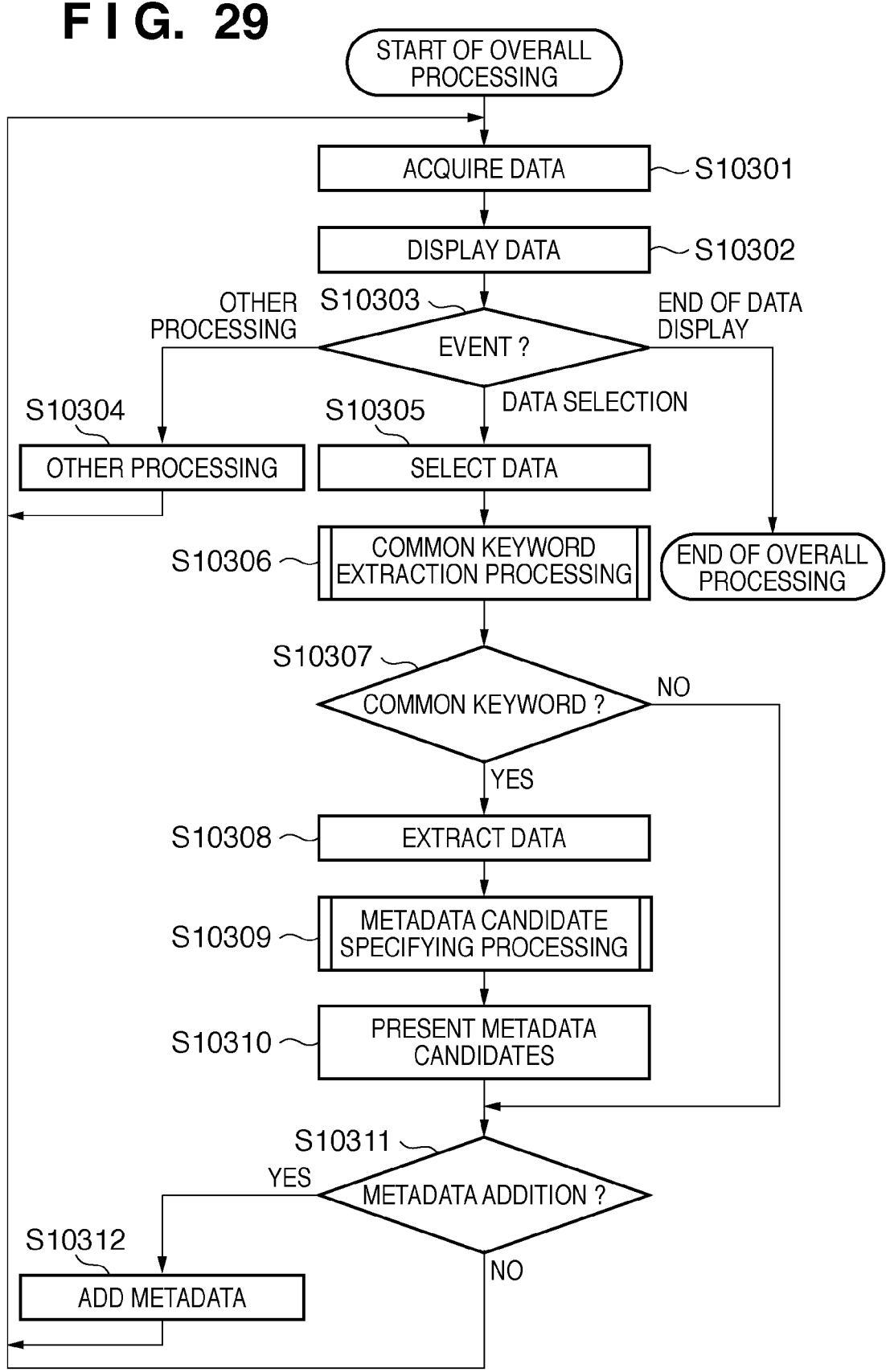
FIG. 29 is a flowchart illustrating an example of the sequence of overall processing of metadata addition by a data management apparatus 10101 according to the sixth embodiment.

FIG. 29 is a flowchart illustrating an example of the sequence of overall processing of metadata addition by the data management apparatus 10101 according to this embodiment.

In step S10301, the data management apparatus 10101 acquires data to be displayed.

In step S10302, the display unit 10102 of the data management apparatus 10101 actually displays the data on the output device 10208.

FIG. 30 is a view showing an example of a display screen on the output device 10208 in step S10302. Reference numeral 10401 denotes an overall display window; and 10402, an icon representing each data. Normally, thumbnails (not shown in FIG. 30) are displayed in front of the icons. Reference numeral 10403 denotes metadata of each data. The metadata are illustrated here for a descriptive convenience, though they are normally not displayed on the window without user instruction.

Referring back to FIG. 29, in step S10303, the data management apparatus 10101 waits for an event from the user. The data management apparatus 10101 executes various kinds of processing of the data in accordance with the event given by the user. Normally, another processing in step S10304 is executed. Then, the process returns to step S10301. The data management apparatus waits for an event from the user again in step S10303. If the user selects a data display end event in step S10303, the data management apparatus 10101 immediately ends the processing.

If the user selects data to add metadata from the data in the list in step S10303, the data management apparatus 10101 advances to step S10305. In step S10305, the data selection unit 10104 of the data management apparatus 10101 selects one or a plurality of data from the data displayed in the list in accordance with a user operation.

FIG. 31 is a view showing an example of the display screen on the output device 10208 in step S10305. In FIG. 31, data 10504 and 10505 selected by the user are indicated by bold frames.

Referring back to FIG. 29, in step S10306, the common keyword extraction unit 10106 of the data management apparatus 10101 extracts a common keyword for the plurality of data (selected data) selected by the data selection unit 10104.

Figure 32:
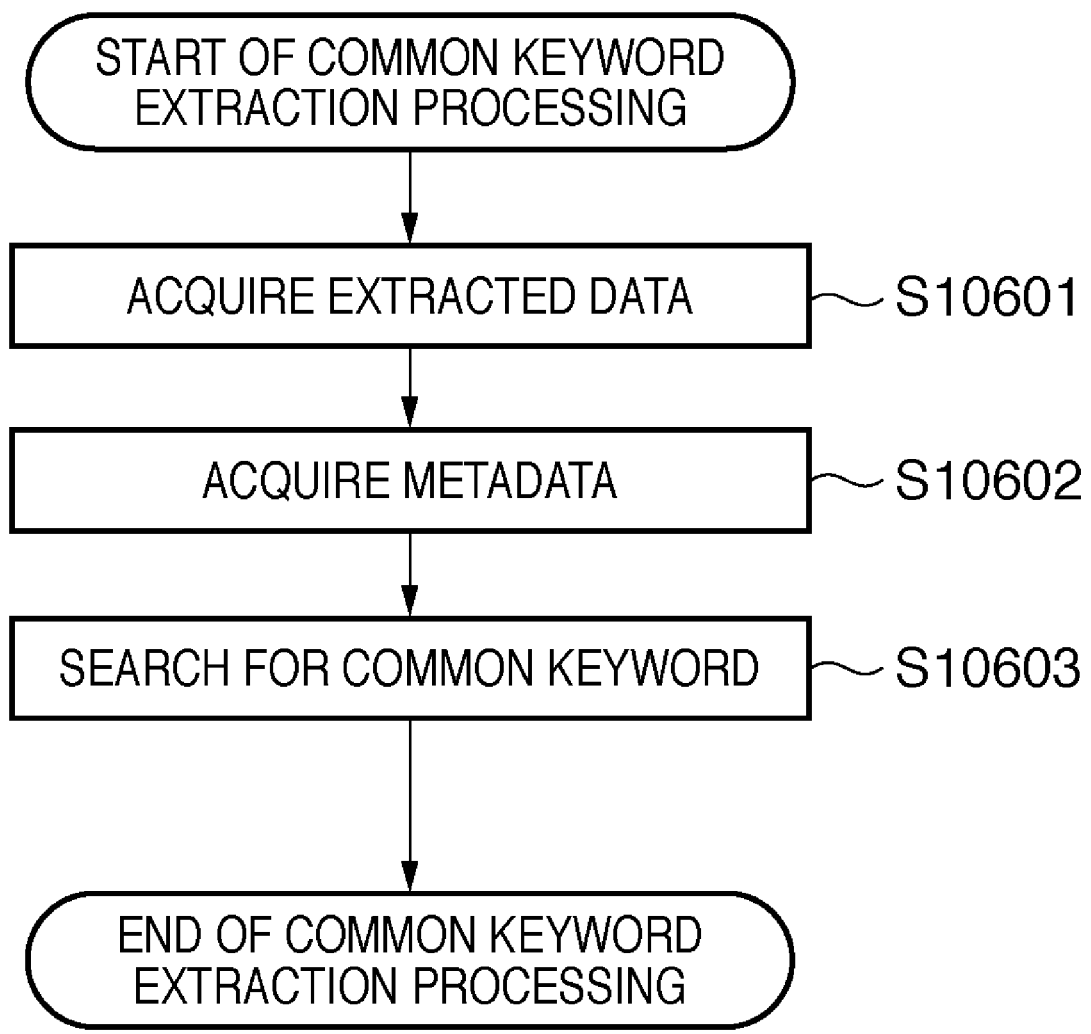
FIG. 32 is a flowchart illustrating details of common keyword extraction processing in step S10306.

FIG. 32 is a flowchart illustrating details of common keyword extraction processing in step S10306.

In step S10601, the common keyword extraction unit 10106 acquires the data selected in step S10305.

In step S10602, the common keyword extraction unit 10106 acquires metadata of the acquired data.

In step S10603, the common keyword extraction unit 10106 detects a common keyword of the metadata of the acquired data and ends the processing shown in FIG. 32.

With the common keyword extraction processing shown in FIG. 32, metadata "birthday" is extracted from the selected data 10504 and 10505 in FIG. 31 as a common keyword.

Referring back to FIG. 29, in step S10307, the common keyword extraction unit 10106 of the data management apparatus 10101 determines whether a common keyword is extracted. If a common keyword is extracted, the common keyword extraction unit 10106 advances the process to step S10308. If no common keyword is extracted, the process advances to step S10311.

In step S10308, the data extraction unit 10107 of the data management apparatus 10101 searches for and extracts data using the common keyword as a search key. This will be described in more detail using the example in FIG. 31. The data extraction unit 10107 searches for data using "birthday" as a key, and consequently extracts two data 10506 and 10507 as extracted data (associated data).

In step S10309, the metadata candidate specifying unit 10109 specifies metadata candidates from metadata added to the extracted data.

Figure 33:
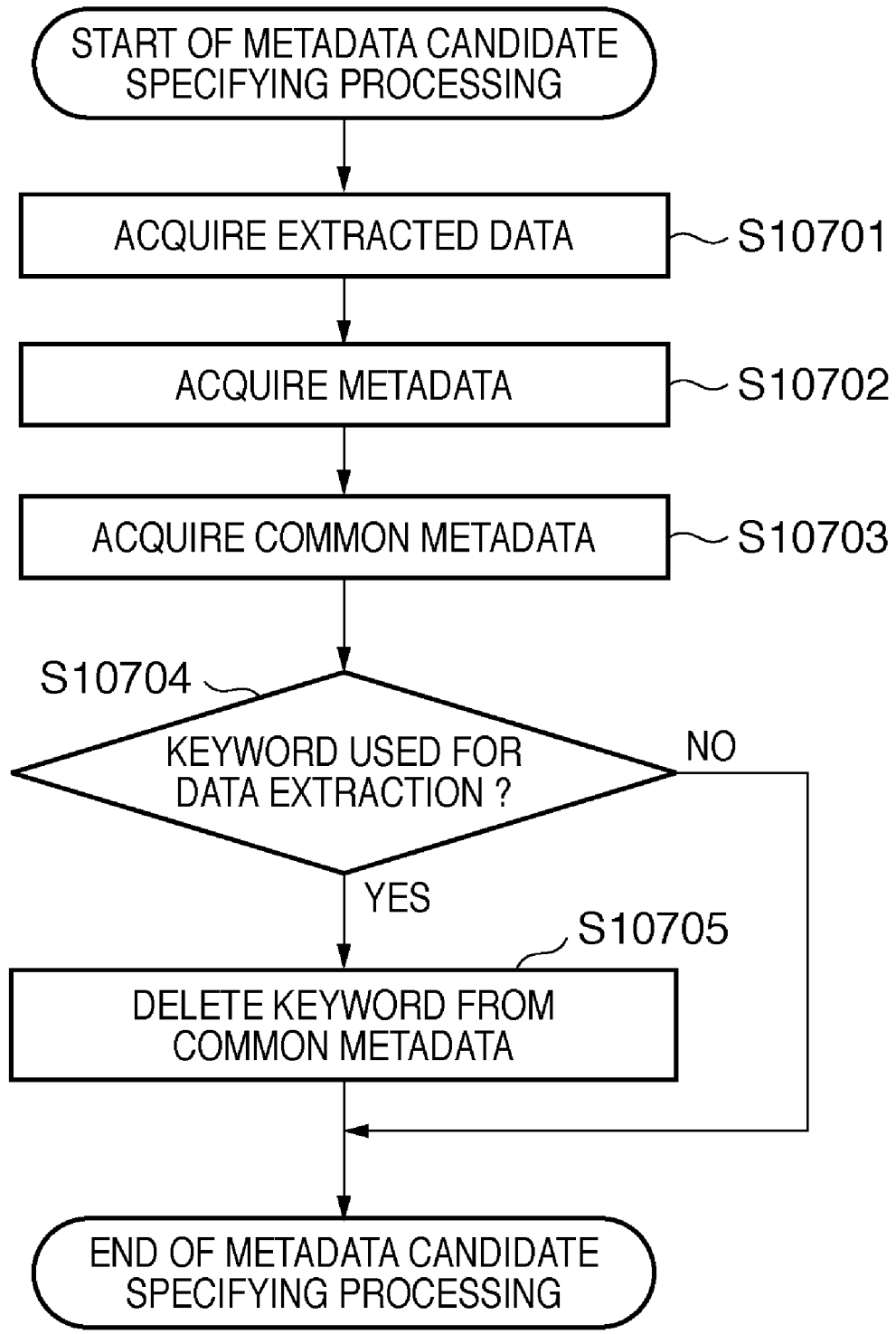
FIG. 33 is a flowchart illustrating details of metadata candidate specifying processing in step S10309.

FIG. 33 is a flowchart illustrating details of metadata candidate specifying processing in step S10309.

In step S10701, the metadata candidate specifying unit 10109 acquires the data (extracted data) extracted in step S10308.

In step S10702, the metadata candidate specifying unit 10109 acquires metadata added to the extracted data. This will be described in more detail using the example in FIG. 31. The metadata candidate specifying unit 10109 acquires metadata from the data 10506 and 10507.

In step S10703, the metadata candidate specifying unit 10109 acquires metadata common in the metadata acquired in step S10702. This will be described in more detail using the example in FIG. 31. Of the metadata acquired from the data 10506 and 10507, metadata "birthday" and "Chinatsu" are common to these data. For this reason, the metadata candidate specifying unit 10109 acquires "birthday" and "Chinatsu" as common metadata.

In step S10704, the metadata candidate specifying unit 10109 determines whether the common metadata acquired in step S10703 include the metadata used as the search key in step S10308. If the common metadata acquired in step S10703 include the metadata used as the search key in step S10308, the metadata candidate specifying unit 10109 advances the process to step S10705. On the other hand, if the common metadata acquired in step S10703 do not include the metadata used as the search key in step S10308, the processing shown in FIG. 33 ends.

In step S10705, the metadata candidate specifying unit 10109 deletes the metadata used as the search key in step S10308 from the common metadata acquired in step S10703 and ends the processing shown in FIG. 33. This will be described in more detail using the example in FIG. 31. The metadata candidate specifying unit 10109 deletes the metadata "birthday" used as the search key in step S10308 from the common metadata "birthday" and "Chinatsu" acquired in step S10703, thereby specifying the metadata candidate "Chinatsu".

Referring back to FIG. 29, in step S10310, the candidate presentation unit 10110 of the data management apparatus 10101 displays the metadata candidate specified by the metadata candidate specifying unit 10109 on a metadata addition assist dialogue box 10806 to be described later.

FIG. 34 is a view showing an example of the metadata addition assist dialogue box 10806.

The metadata addition assist dialogue box 10806 shown in FIG. 34 is arranged on the display screen in FIG. 31 to present metadata candidates to the user.

Reference numeral 10807 denotes a title "metadata candidates" on the metadata addition assist dialogue box 10806; 10808, a presented metadata candidate; 10809, a check box used by the user to select metadata to be added; 10810, a title of a text box in which the user freely inputs new metadata; 10811, a text box in which the user freely inputs metadata; 10812, a check box used by the user to select the contents in the text box 10811 as metadata; 10813, an OK button used by the user to decide metadata to be added; and 10814, a cancel button used by the user to cancel metadata addition.

When the user operates the cancel button 10814, the candidate selection unit 10111 of the data management apparatus 10101 determines in step S10311 in FIG. 29 that metadata addition is stopped, and the process returns to step S10301. When the user operates the OK button 10813, the candidate selection unit 10111 of the data management apparatus 10101 determines in step S10311 in FIG. 29 that metadata addition is decided, and the process advances to step S10312.

In step S10312, the candidate selection unit 10111 of the data management apparatus 10101 adds metadata having a check in the check box 10809 of the metadata addition assist dialogue box 10806 to the data selected in step S10305.

FIG. 35 is a view showing an example of the display screen when the user selects the metadata candidate "Chinatsu" in the metadata addition assist dialogue box 10806 in FIG. 34 and completes metadata addition to selected data. Data 10904 and 10905 are the data selected by the user in FIGS. 31 and 34. "Chinatsu" is newly added to the metadata illustrated for the descriptive convenience.

As described above, according to this embodiment, when adding metadata simultaneously to a plurality of data selected by the user, a common keyword of the data is extracted. Then, metadata addition candidates can be determined based on data extracted using the common keyword as a search key. For this reason, the user who wants to add new metadata need not vacillate between terms to be used as metadata. Additionally, since the user can refer to metadata added in the past, it is possible to add metadata for the same purpose without large fluctuation in the keyword or add metadata for different purposes while ensuring an exact difference.

Seventh Embodiment

In this embodiment, when a plurality of data selected for the purpose of metadata addition have no common keyword, individual metadata of the plurality of selected data are used to extract associated data.

Figure 36:
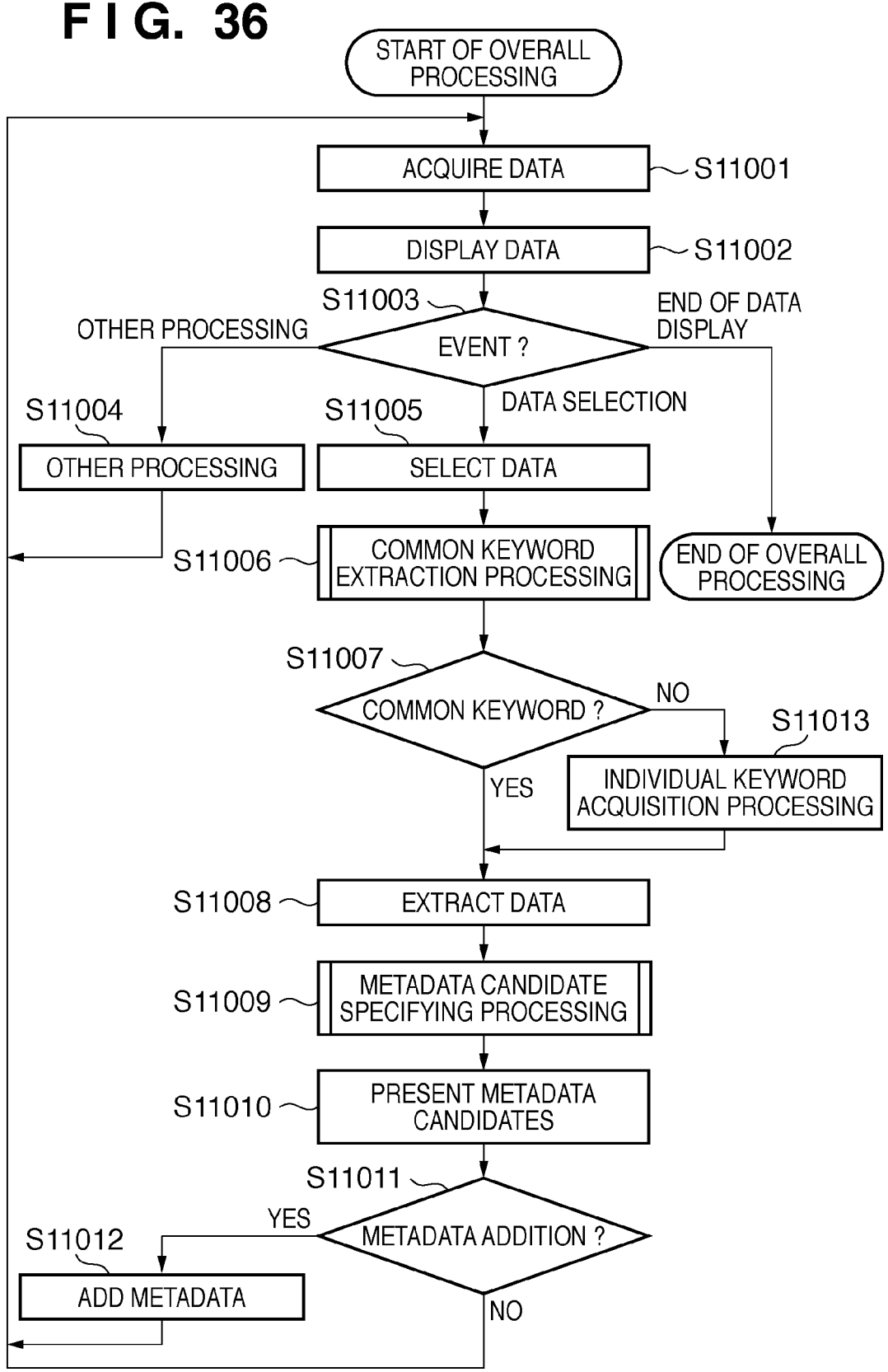
FIG. 36 is a flowchart illustrating an example of the sequence of overall processing of metadata addition by a data management apparatus 10101 according to the seventh embodiment of the present invention.

FIG. 36 is a flowchart illustrating an example of the sequence of overall processing of metadata addition by a data management apparatus 10101 according to the seventh embodiment.

The processing in steps S11001 to S11006 of FIG. 36 is the same as in the sixth embodiment, and a detailed description thereof will not be repeated.

FIG. 37 is a view showing an example of a display screen on an output device 10208 in step S11002. FIG. 38 is a view showing an example of the display screen on the output device 10208 in step S11005. In FIG. 38, data 11204 and 11205 selected by the user are indicated by bold frames.

Referring back to FIG. 36, in step S11006, a common keyword extraction unit 10106 of the data management apparatus 10101 extracts a common keyword for the plurality of data (selected data) selected by a data selection unit 10104. However, the data 11204 and 11205 have no common metadata.

Since no common keyword is extracted, the common keyword extraction unit 10106 of the data management apparatus 10101 advances the process from step S11007 to step S11013. In step S11013, the common keyword extraction unit 10106 acquires all metadata of the selected data 11204 and 11205. Since the selected data 11204 and 11205 do not particularly have any metadata, the common keyword extraction unit 10106 acquires the date data of the selected data 11204 and that of the selected data 11205 as keywords.

In step S11008, a data extraction unit 10107 of the data management apparatus 10101 searches for and extracts data using a common keyword as a search key. This will be described in more detail. In step S11008, the data extraction unit 10107 searches for data using the date data (2003/06/18) of the selected data 11204 and that (2004/11/23) of the selected data 11205. As a result, three data 11406, 11407, and 11408 shown in FIG. 39 are extracted as extracted data. FIG. 39 is a view showing an example of extracted data according to the seventh embodiment.

In step S11009, a metadata candidate specifying unit 10109 specifies metadata candidates from metadata added to the extracted data.

Figure 40:
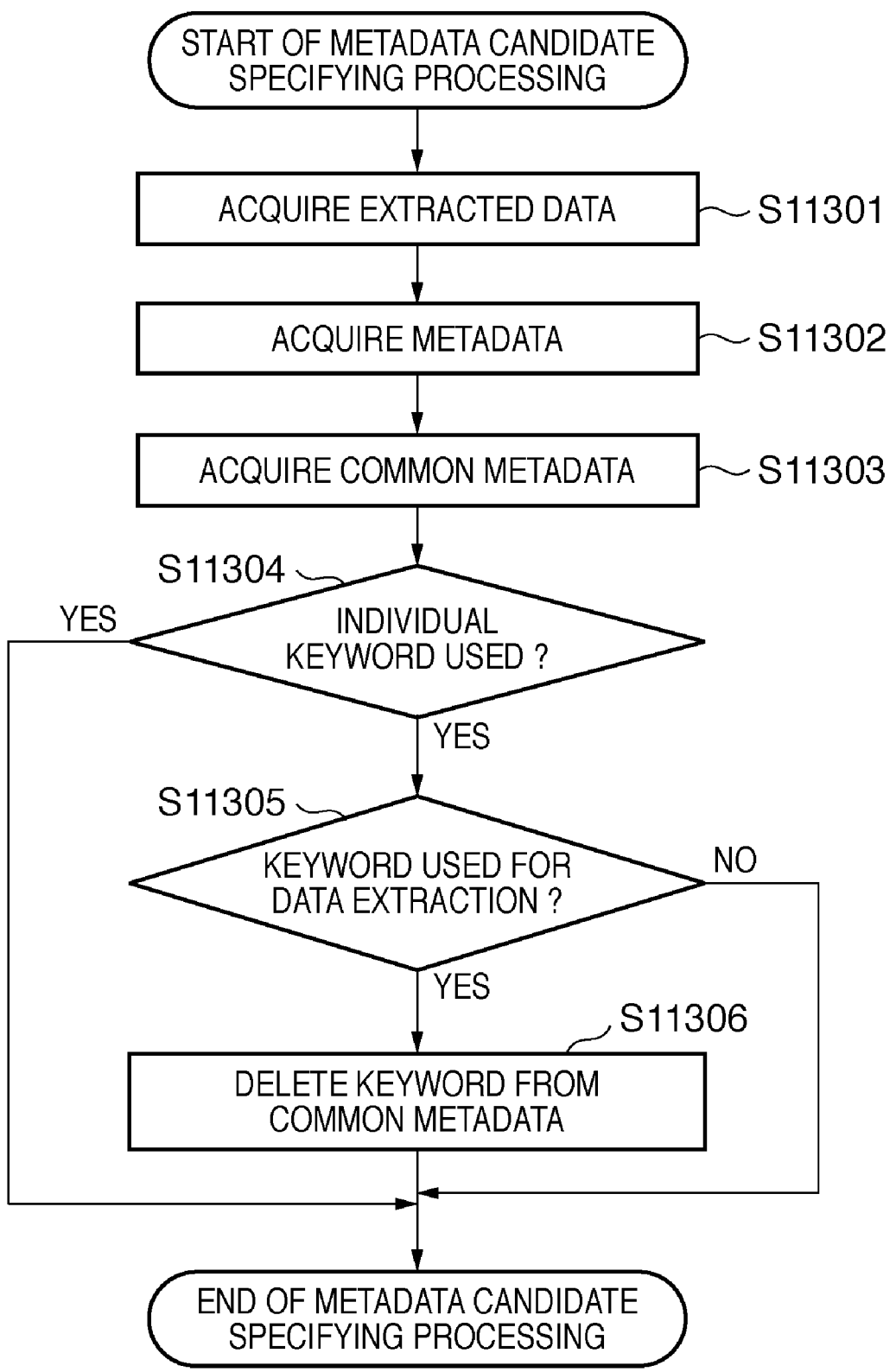
FIG. 40 is a flowchart illustrating details of metadata candidate specifying processing in step S11009 according to the seventh embodiment of the present invention.

FIG. 40 is a flowchart illustrating details of metadata candidate specifying processing in step S11009 according to the seventh embodiment.

Processing in steps S11301 to S11303 is the same as in steps S10701 to S10703 of FIG. 33 according to the sixth embodiment, and a description thereof will not be repeated.

In this embodiment, assume that common metadata is acquired from the extracted data, and metadata "Kyoto" common to the data 11406, 11407, and 11408 is specified as a metadata candidate in the processing up to step S11303.

In step S11304, the metadata candidate specifying unit 10109 determines whether the search key used in data extraction processing in step S11008 is an individual keyword. In this example, the data selected first have no common keyword (metadata), and individual keywords are acquired in step S11013. Hence, the metadata candidate specifying unit 10109 determines that an individual keyword is used, and the processing shown in FIG. 40 ends.

On the other hand, if the metadata candidate specifying unit 10109 determines in step S11304 that a common keyword is used, the process advances to step S11305 to execute the same processing as in the sixth embodiment, and the processing shown in FIG. 40 ends.

Referring back to FIG. 36, in step S11010, a candidate presentation unit 10110 of the data management apparatus 10101 displays the metadata candidate specified by the metadata candidate specifying unit 10109 on a metadata addition assist dialogue box 11506 to be described later.

FIG. 41 is a view showing an example of the metadata addition assist dialogue box 11506.

The metadata addition assist dialogue box 11506 shown in FIG. 41 is arranged on the display screen in FIG. 40 to present metadata candidates to the user.

Reference numeral 11507 denotes a title "metadata candidates" on the metadata addition assist dialogue box 11506; 11508, a presented metadata candidate; 11509, a check box used by the user to select metadata to be added; 11510, a title of a text box in which the user freely inputs new metadata; 11511, a text box in which the user freely inputs metadata; 11512, a check box used by the user to select the contents in the text box 11511 as metadata; 11513, an OK button used by the user to determine metadata to be added; and 11514, a cancel button used by the user to cancel metadata addition.

When the user operates the cancel button 11514, the candidate selection unit 10111 of the data management apparatus 10101 determines in step S11011 of FIG. 36 that metadata addition is stopped, and the process returns to step S11001. When the user operates the OK button 11513, the candidate selection unit 10111 of the data management apparatus 10101 determines in step S11011 of FIG. 36 that metadata addition is decided, and the process advances to step S11012.

In step S11012, the candidate selection unit 10111 of the data management apparatus 10101 adds metadata having a check in the check box 11509 of the metadata addition assist dialogue box 11506 to the data selected in step S11005.

FIG. 42 is a view showing an example of the display screen when the user selects the metadata candidate "Kyoto" in the metadata addition assist dialogue box 11506 in FIG. 41 and completes metadata addition to selected data. Data 11604 and 11605 are the data selected by the user in FIGS. 40 and 41. "Kyoto" is newly added to the metadata illustrated for the descriptive convenience.

As described above, according to this embodiment, when adding metadata simultaneously to a plurality of data selected by the user, and the data have no common keyword, associated data are extracted using an individual keyword of the data. Then, metadata addition candidates can be determined based on data extracted using the individual keyword as a search key. For this reason, when new metadata is to be added to a plurality of selected data, and the plurality of selected data have no existing common metadata, the user can find or confirm the association between them by referring to metadata candidates.

In this embodiment, only when extracted associated data have no common metadata, a plurality of existing metadata is presented. However, even when common metadata exist, both the common metadata and the plurality of remaining metadata may be presented as candidates. This allows presenting more reference data as metadata candidates for the user.

Eighth Embodiment

In this embodiment, when extracted associated data have metadata common to all the extracted data, and metadata common to only some of the data also exist, the metadata are extracted and presented as candidates in descending order of the number of data including the metadata.

In this embodiment, the sequence of overall processing of metadata addition by a data management apparatus 10101 is the same as in FIG. 36 of the seventh embodiment. In the eighth embodiment, however, the metadata candidate specifying processing in step S11009 of FIG. 36 is replaced with metadata candidate specifying processing shown in FIG. 45 to be described later.

FIG. 43 is a view showing an example in which data 11804 and 11805 selected by the user in step S11005 of FIG. 36 are indicated by bold frames.

Processing shown in FIG. 36 progresses, as in the seventh embodiment. In step S11008, a search is performed using date data as a search key. In this embodiment, four data

11906, 11907, 11908, and 11909 shown in FIG. 44 are extracted as extracted data. FIG. 44 is a view showing an example of the extracted data according to the eighth embodiment.

In step S11009, a metadata candidate specifying unit 10109 specifies metadata candidates from metadata added to the extracted data.

Figure 45:
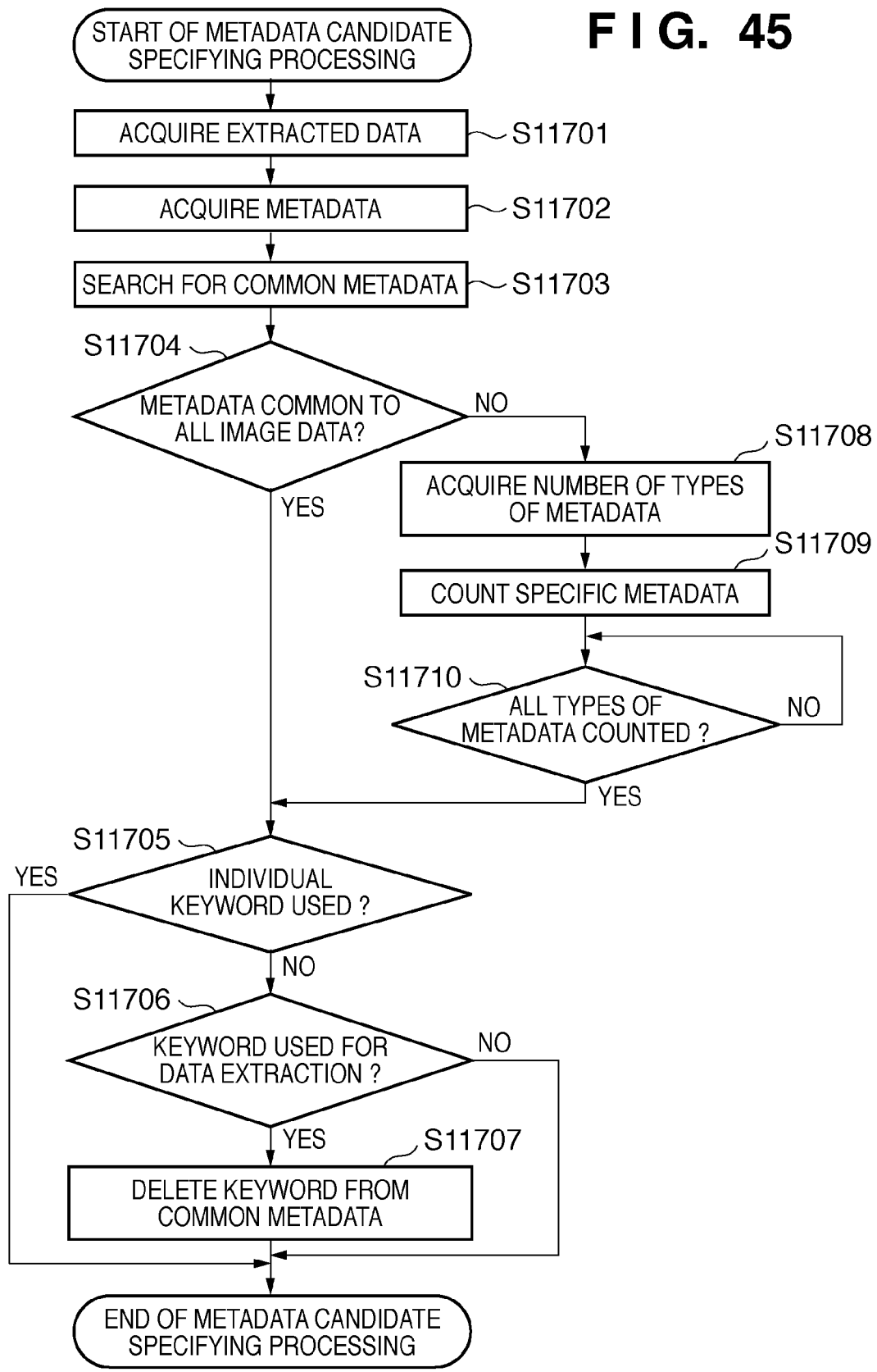
FIG. 45 is a flowchart illustrating details of metadata candidate specifying processing in step S11009 according to the eighth embodiment of the present invention.

FIG. 45 is a flowchart illustrating details of metadata candidate specifying processing in step S11009 according to the eighth embodiment. Processing in steps S11701 to S11703 is the same as in steps S10701 to S10703 of FIG. 33 according to the sixth embodiment, and a description thereof will not be repeated. In this embodiment, assume that two kinds of metadata, that is, "Nara" common to the data 11906 and 11908 and "Kyoto" common to the data 11907 and 11909 are specified as metadata candidates in the processing up to step S11703.

In step S11704, the metadata candidate specifying unit 10109 determines whether metadata common to the data having the metadata specified in step S11703 exists. Since no metadata common to the data 11906, 11907, 11908, and 11909 exists, the metadata candidate specifying unit 10109 advances the process to step S11708.

In step S11708, the metadata candidate specifying unit 10109 acquires the number (e.g., 2) of types of metadata candidates specified in step S11703. In steps S11709 and S11710, loop processing is performed in the number of types of metadata candidates. In step S11709, the metadata candidate specifying unit 10109 counts the number of data having a metadata candidate as metadata. In the example shown in FIG. 44, the metadata candidate specifying unit 10109 counts three data as data having "Kyoto" as metadata and two data as data having "Nara" as metadata.

In step S11705, the metadata candidate specifying unit 10109 determines whether the search key used in data extraction processing in step S11008 of FIG. 36 is an individual keyword. In this example, the data selected first have no common keyword (metadata), and individual keywords are acquired in step S11013. Hence, the metadata candidate specifying unit 10109 determines that an individual keyword is used, and the processing shown in FIG. 44 ends.

In step S11010 of FIG. 36, a candidate presentation unit 10110 of the data management apparatus 10101 displays the metadata candidates specified by the metadata candidate specifying unit 10109 on a metadata addition assist dialogue box 12006 to be described later.

Figure 46:
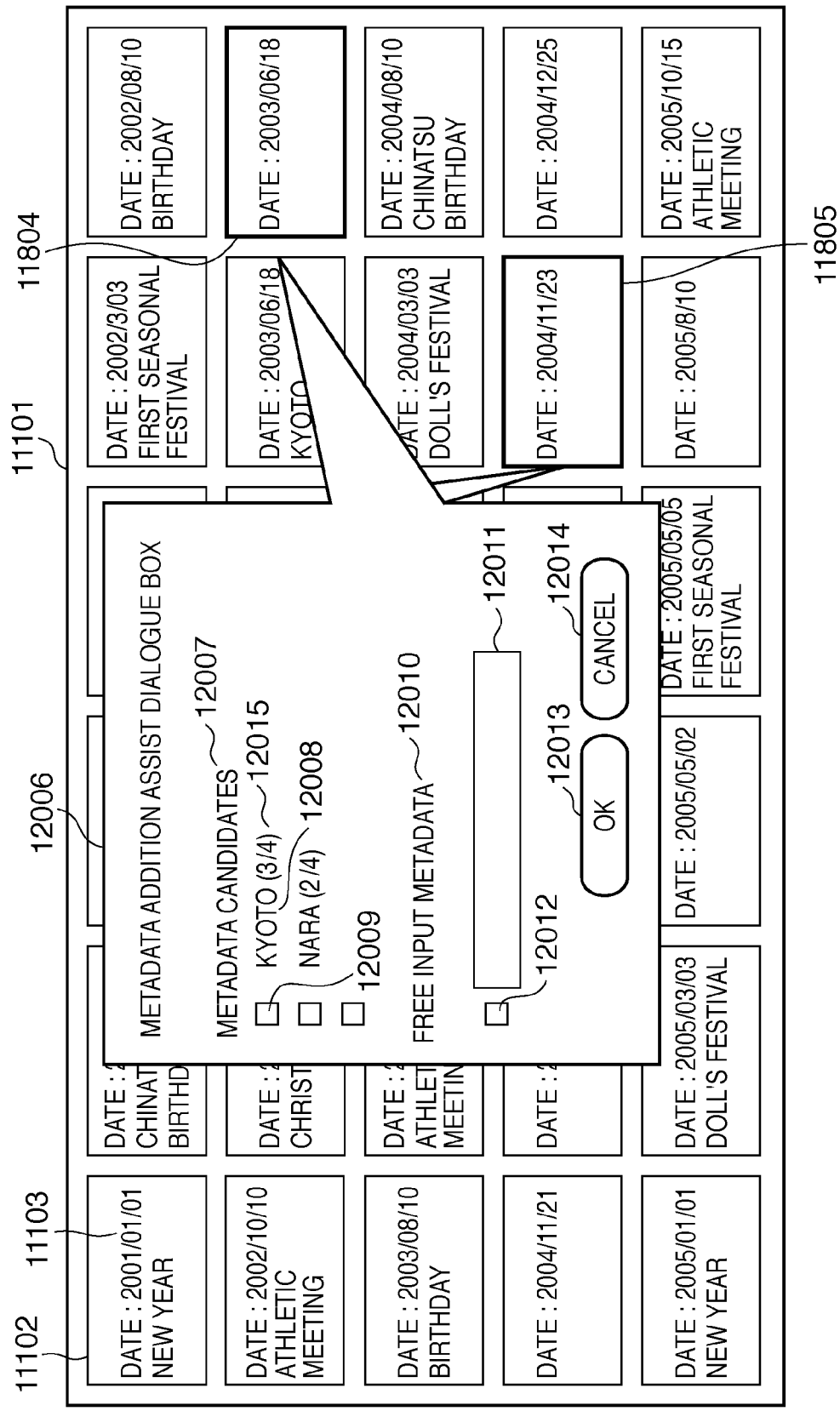
FIG. 46 is a view showing an example of a metadata addition assist dialogue box 12006.

FIG. 46 is a view showing an example of the metadata addition assist dialogue box 12006.

The metadata addition assist dialogue box 12006 shown in FIG. 46 is arranged on the display screen in FIG. 44 to present metadata candidates to the user in accordance with the priority order.

Reference numeral 12007 denotes a title "metadata candidates" on the metadata addition assist dialogue box 12006; 12008, a presented metadata candidate; 12015, the number of extracted data and the number of data (extracted data) using the corresponding metadata; 12009, a check box used by the user to select metadata to be added; 12010, a title of a text box in which the user freely inputs new metadata; 12011, a text box in which the user freely inputs metadata; 12012, a check box used by the user to select the contents in the text box 12011 as metadata; 12013, an OK button used by the user to decide metadata to be added; and 12014, a cancel button used by the user to cancel metadata addition.

As shown in FIG. 46, in the metadata addition assist dialogue box 12006, a metadata candidate and the ratio of extracted data having the metadata candidate to all extracted data are presented to the user.

When the user operates the cancel button 12014, a candidate selection unit 10111 of the data management apparatus 10101 determines in step S11011 of FIG. 36 that metadata addition is stopped, and the process returns to step S11001. When the user operates the OK button 12013, the candidate selection unit 10111 of the data management apparatus 10101 determines in step S11011 of FIG. 36 that metadata addition is decided, and the process advances to step S11012.

In step S11012, the candidate selection unit 10111 of the data management apparatus 10101 adds metadata having a check in the check box 12009 of the metadata addition assist dialogue box 12006 to the data selected in step S11005.

As described above, according to this embodiment, when presenting metadata candidates for extracted associated data, if a plurality of metadata candidates exists, the number of data having the metadata is also presented. This allows the user to decide new metadata by referring to the degree of association.

In this embodiment, the number of metadata present in associated data is presented for each metadata candidate to be presented as a reference. For example, Instead of presenting both the metadata candidates and the number of metadata to the user, the metadata candidates may be presented in descending order of the number. This allows the user to more naturally refer to the degree of association in consideration of the presentation order without noticing the presented number.

The metadata candidate specifying unit 10109 may specify, as a metadata candidate, only metadata common to all associated data.

Ninth Embodiment

In the above-described embodiments, a metadata candidate to be newly added is selected from metadata common to extracted associated data or included a plurality of associated data and not included in data selected by the user. In the ninth embodiment, metadata which is added to only some of data selected by the user first and is also included in extracted data is specified as a metadata candidate.

In this embodiment, the sequence of overall processing of metadata addition by a data management apparatus 10101 is the same as in FIG. 36 of the seventh embodiment. In the ninth embodiment, however, the metadata candidate specifying processing in step S11009 of FIG. 36 is replaced with metadata candidate specifying processing shown in FIG. 48 to be described later.

Figure 47:
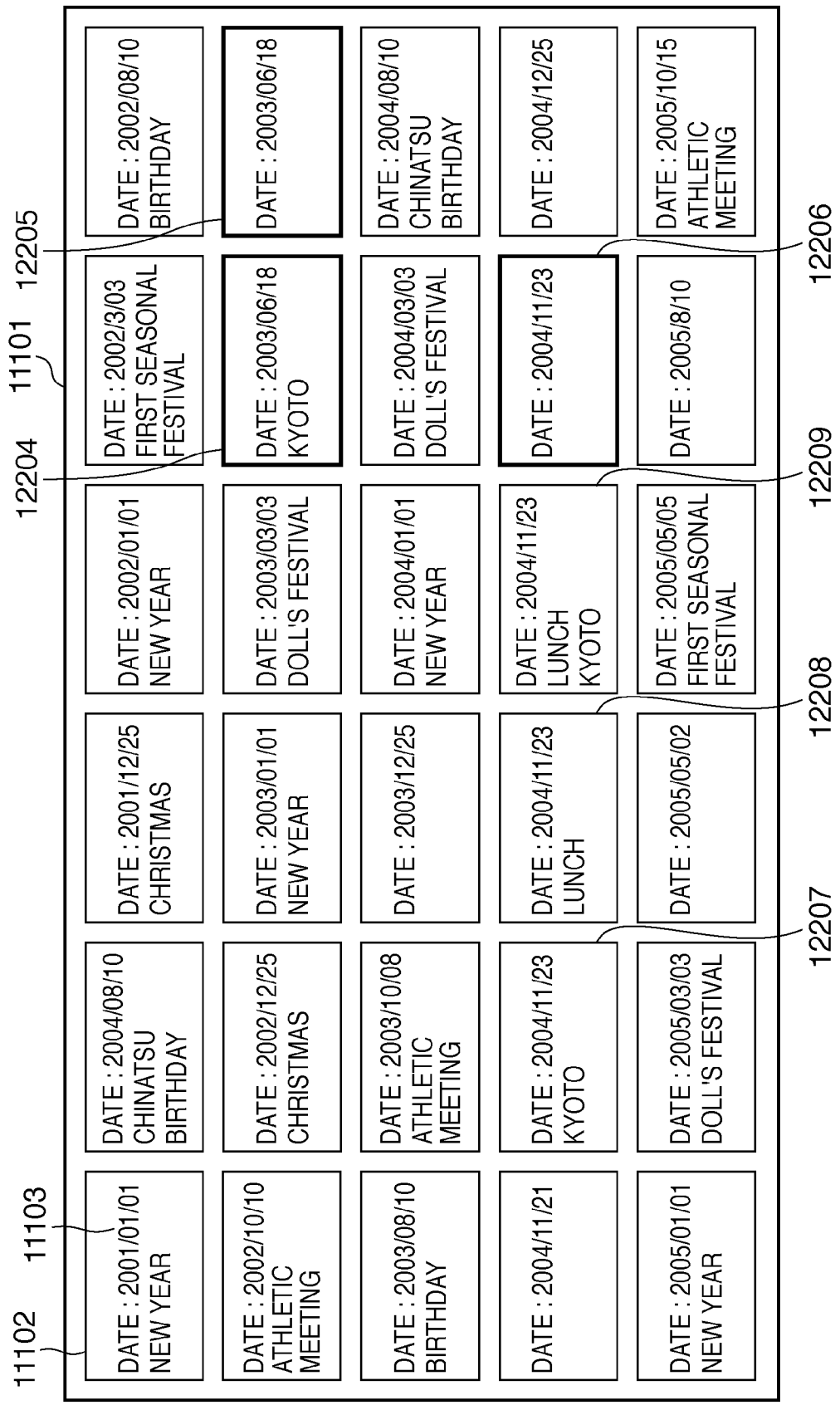
FIG. 47 is a view showing an example in which data 12204, 12205, and 12206 selected by the user in step S11005 of FIG. 36 are indicated by bold frames.

FIG. 47 is a view showing an example in which data 12204, 12205, and 12206 selected by the user in step S11005 of FIG. 36 are indicated by bold frames.

Processing shown in FIG. 36 progresses, as in the seventh embodiment. In step S11008, a search is performed using date data as a search key. In this embodiment, three data 12207, 12208, and 12209 shown in FIG. 47 are extracted as extracted data.

In step S11009, a metadata candidate specifying unit 10109 specifies metadata candidates from metadata added to the extracted data.

Figure 48:
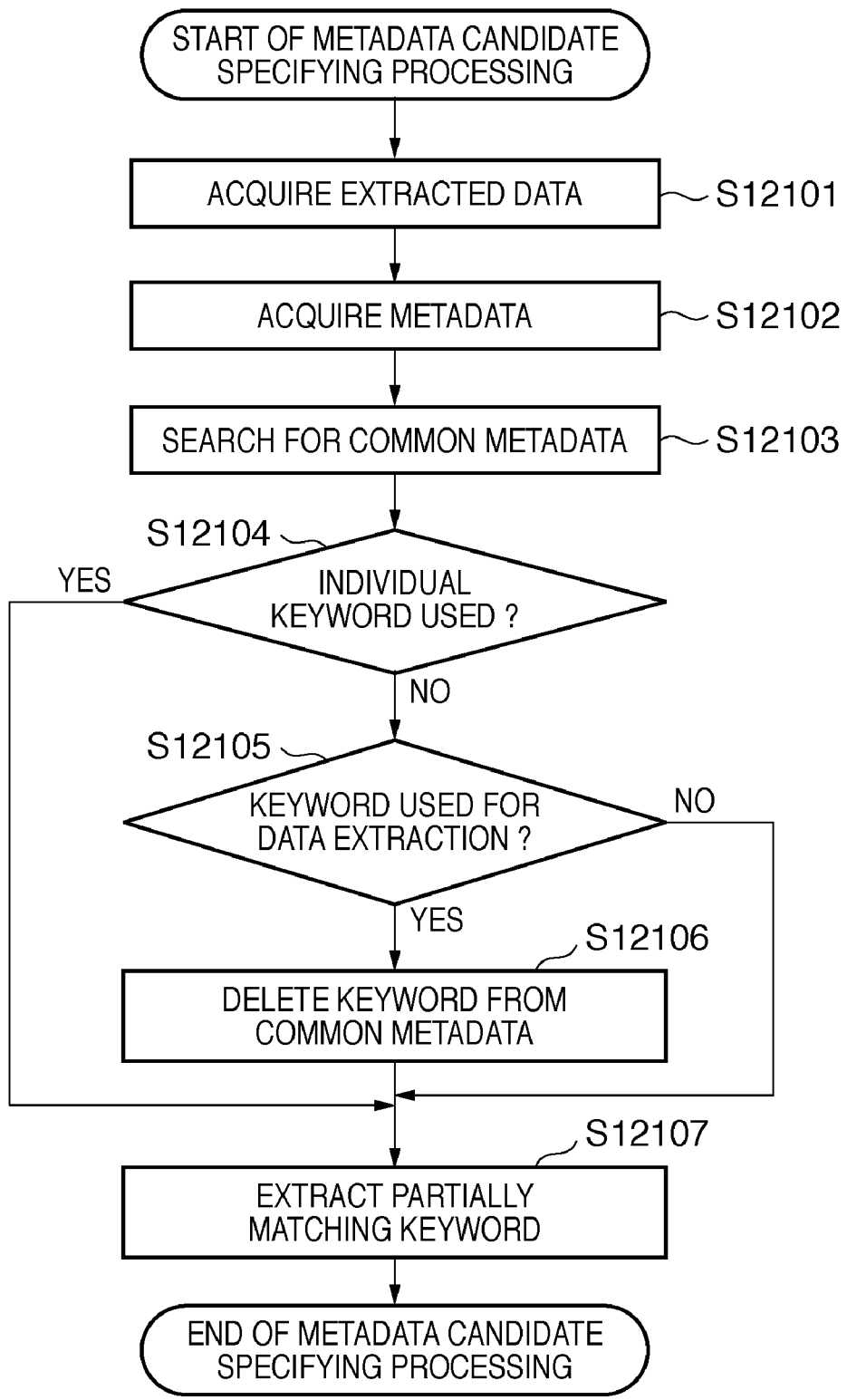
FIG. 48 is a flowchart illustrating details of metadata candidate specifying processing in step S11009 according to the ninth embodiment of the present invention.

FIG. 48 is a flowchart illustrating details of metadata candidate specifying processing in step S11009 according to the ninth embodiment.

Processing in steps S12101 to S12103 is the same as in steps S10701 to S10703 of FIG. 33 according to the sixth embodiment, and a description thereof will not be repeated.

In this embodiment, assume that two kinds of metadata, that is, "Kyoto" and "lunch" each of which is included in a plurality of data of the data 12207, 12208, and 12209 are specified as metadata candidates in the processing up to step S12103.

In step S12104, the metadata candidate specifying unit 10109 determines whether the search key used in data extraction processing in step S11008 of FIG. 36 is an individual keyword. In this example, the data selected first have no common keyword (metadata), and individual keywords are acquired in step S11013. Hence, the metadata candidate specifying unit 10109 determines that an individual keyword is used, and the process advances to step S12107.

In step S12107, the metadata candidate specifying unit 10109 specifies, of the metadata detected as common metadata in step S12103, metadata common to a plurality of associated data. The metadata candidate specifying unit 10109 also extracts, from the specified metadata, metadata common to some of the selected data as a metadata candidate (keyword). The metadata common to a plurality of associated data are "Kyoto" and "lunch". The metadata common to some of the data selected by the user first is "Kyoto".

In step S11010 of FIG. 36, a candidate presentation unit 10110 of the data management apparatus 10101 displays the metadata candidate (i.e., "Kyoto") specified by the metadata candidate specifying unit 10109 on a metadata addition assist dialogue box 12306 to be described later.

FIG. 49 is a view showing an example of the metadata addition assist dialogue box 12306.

The metadata addition assist dialogue box 12306 shown in FIG. 49 is arranged on the display screen in FIG. 47 to present metadata candidates to the user.

As described above, according to this embodiment, it is possible to complement metadata included in data selected by user by using metadata extracted from associated data.

Note that the present invention can be applied to an apparatus comprising a single device or to system constituted by a plurality of devices.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-293745 filed on Nov. 12, 2007 and 2007-317334 filed on Dec. 7, 2007, which are hereby incorporated by reference herein in their entirety.

What is claimed is:

1. An information processing apparatus comprising:
a selection unit configured to select two or more image data out of three or more image data to each of which metadata has been previously attached;
an input unit configured to input metadata to be attached to the selected two or more image data, wherein the metadata to be attached is different from the metadata previously attached to the selected two or more image data;
an extraction unit configured to extract metadata commonly attached to each of the selected two or more image data;
a specifying unit configured to specify image data to which all the extracted metadata is attached among non-selected image data included in the three or more image data; and
an attaching unit configured to attach the input metadata to the specified image data.

2. The apparatus according to claim 1, further comprising:
a recognition unit configured to recognize an object captured in each of the three or more image data and to attach object information indicating the recognized object to each image data;
wherein said extraction unit further configured to extract the object information commonly attached to the selected two or more image data,
said specifying unit further configured to specify image data to which the extracted metadata and the extracted object information are attached among non-selected image data in the three or more image data.

3. The apparatus according to claim 1, wherein the metadata previously attached to each of the three or more image includes location data, the apparatus further comprising:
  an identifying unit configured to identify an area corresponding to the location data previously attached to each of the three or more image data and to attach area information indicating the identified area to each image data,
  wherein said extraction unit further configured to extract the area information commonly attached to the selected two or more image data, and
  said specifying unit further configured to specify image data to which the extracted metadata and the extracted area information is attached among non-selected image data in the three or more image data.

4. A method of controlling an information processing apparatus, comprising:
  selecting two or more image data out of three or more image data to each of which metadata has been previously attached;
  inputting metadata to be attached to the selected two or more image data, wherein the metadata to be attached is different from the metadata previously attached to the selected two or more image data;
  extracting metadata commonly attached to each of the selected two or more image data;
  specifying image data to which all of the extracted metadata is attached among non-selected image data included in the three or more image data; and
  attaching the input data to the specified image data.

5. A computer-readable storage medium storing a computer program which causes a computer to function as an information processing apparatus comprising:
  a selection unit configured to select two or more image data out of three or more image data to each of which metadata has been previously attached;
  an input unit configured to input metadata to be attached to the selected two or more image data, wherein the metadata to be attached is different from the metadata previously attached to the selected two or more image data;
  an extraction unit configured to extract metadata commonly attached to each of the selected two or more image data;
  a specifying unit configured to specify image data to which all the extracted metadata is attached among non-selected image data included in the three or more image data; and
  an attaching unit configured to attach the input metadata to the specified image data.

* * * * *